US008216057B2

(12) United States Patent
Yoshihara

(10) Patent No.: US 8,216,057 B2

(45) Date of Patent: Jul. 10, 2012

(54) GAMING MACHINE THAT PREVENTS GAME FROM CONTINUING WITHOUT DICE POSITION AND DOTS CHANGING

(75) Inventor: Norihisa Yoshihara, Koto-ku (JP)

(73) Assignee: Aruze Gaming America, Inc., Las Vegas, NV (US)

(*) Notice: Subject to any disclaimer, the term of this patent is extended or adjusted under 35 U.S.C. 154(b) by 373 days.

(21) Appl. No.: 12/550,710

(22) Filed: Aug. 31, 2009

(65) Prior Publication Data

US 2010/0062832 A1 Mar. 11, 2010

Related U.S. Application Data

(60) Provisional application No. 61/095,833, filed on Sep. 10, 2008, provisional application No. 61/095,812, filed on Sep. 10, 2008, provisional application No. 61/095,823, filed on Sep. 10, 2008.

(51) Int. Cl.

*A63F 9/24* (2006.01)

*A63F 13/00* (2006.01)

(52) U.S. Cl. ........................................ 463/22; 463/30

(58) Field of Classification Search .................... 463/22, 463/30

See application file for complete search history.

(56) References Cited

U.S. PATENT DOCUMENTS

| | | | | |
|---|---|---|---|---|
| 5,413,351 | A | 5/1995 | Franklin | |
| 5,434,572 | A | 7/1995 | Smith | |
| 5,694,045 | A * | 12/1997 | Ikeda et al. | 324/652 |
| 6,220,594 | B1 | 4/2001 | Peng | |
| 6,331,145 | B1 * | 12/2001 | Sity et al. | 463/22 |
| 6,394,901 | B1 * | 5/2002 | Marta | 463/20 |
| 6,609,710 | B1 * | 8/2003 | Order | 273/148 R |
| 7,017,905 | B2 * | 3/2006 | Lindsey | 273/146 |
| 7,361,090 | B2 * | 4/2008 | Lin | 463/22 |
| 7,639,143 | B2 * | 12/2009 | Hughes et al. | 340/572.4 |
| 2002/0111205 | A1 * | 8/2002 | Beavers | 463/12 |
| 2002/0147042 | A1 * | 10/2002 | Vuong et al. | 463/40 |
| 2002/0169016 | A1 * | 11/2002 | Tarantino | 463/16 |
| 2002/0183106 | A1 | 12/2002 | Cole | |
| 2003/0162591 | A1 | 8/2003 | Nguyen et al. | |
| 2003/0232641 | A1 * | 12/2003 | Moon et al. | 463/17 |

(Continued)

FOREIGN PATENT DOCUMENTS

JP 8-21875 1/1996

(Continued)

OTHER PUBLICATIONS

International-Style Search Report and Office Action issued Dec. 1, 2010, in MO Patent Application No. I/000980.

*Primary Examiner* — Xuan Thai

*Assistant Examiner* — Michael Grant

(74) *Attorney, Agent, or Firm* — Lexyoume IP Meister, PLLC

(57) ABSTRACT

A gaming machine receives capturing data from an infrared camera, determines a position, classification, and number of dots of dice based on the capturing data thus received, stores the position, classification, and number of dots thus determined in RAM for each game, and compares the position, classification, and number of dots for each of the dice stored in the RAM in a previous game with a position, classification, and number of dots for each of the dice stored in the RAM in a present game.

6 Claims, 70 Drawing Sheets

U.S. PATENT DOCUMENTS

| | | | | |
|---|---|---|---|---|
| 2004/0152498 | A1 * | 8/2004 | Kaminkow et al. | 463/16 |
| 2005/0137008 | A1 * | 6/2005 | Itagaki et al. | 463/22 |
| 2005/0215312 | A1 * | 9/2005 | Tresser et al. | 463/22 |
| 2006/0022814 | A1 * | 2/2006 | Nogami et al. | 340/505 |
| 2006/0205508 | A1 * | 9/2006 | Green | 463/40 |
| 2007/0013127 | A1 * | 1/2007 | Ellis | 273/146 |
| 2007/0026947 | A1 | 2/2007 | Chun | |
| 2007/0029726 | A1 * | 2/2007 | Ohira | 273/145 R |
| 2007/0060259 | A1 * | 3/2007 | Pececnik | 463/16 |
| 2008/0048394 | A1 * | 2/2008 | C. H. | 273/144 R |
| 2008/0096641 | A1 | 4/2008 | Yoshizawa | |
| 2008/0113820 | A1 | 5/2008 | Tedsen et al. | |
| 2008/0182640 | A1 * | 7/2008 | Yoshizawa | 463/17 |
| 2008/0217851 | A1 * | 9/2008 | Colton | 273/274 |
| 2009/0264186 | A1 * | 10/2009 | Lai et al. | 463/22 |
| 2010/0048302 | A1 * | 2/2010 | Lutnick et al. | 463/42 |

FOREIGN PATENT DOCUMENTS

| | | |
|---|---|---|
| JP | 2003-79919 | 3/2003 |
| WO | WO 2007/016776 A1 | 2/2007 |

* cited by examiner

FIG. 17

INSTRUCTION IMAGE DISPLAY DETERMINATION TABLE

| DEALER' S LEVEL | BET START INSTRUCTION IMAGE | BET END INSTRUCTION IMAGE |
|---|---|---|
| HIGH LEVEL | × | × |
| INTERMEDIATE LEVEL | × | ○ |
| LOW LEVEL | ○ | ○ |

FIG. 18

BET EXISTENCE DETERMINATION TABLE

| | STATION NUMBER | | | | | | | | | |
|---|---|---|---|---|---|---|---|---|---|---|
| | 1 | 2 | 3 | 4 | 5 | 6 | 7 | 8 | 9 | 10 |
| BET | A | P | P | A | A | P | P | P | P | A |

FIG. 19

OSCILLATION MODE DATA TABLE

| OSCILLATION PATTERN | OSCILLATION MODE | | |
|---|---|---|---|
| PATTERN 1 | SMALL OSCILLATION 5 SEC. | LARGE OSCILLATION 5 SEC. | SUBTLE OSCILLATION 5 SEC. |
| PATTERN 2 | SMALL OSCILLATION 4 SEC. | LARGE OSCILLATION 5 SEC. | SUBTLE OSCILLATION 6 SEC. |
| PATTERN 3 | SMALL OSCILLATION 6 SEC. | LARGE OSCILLATION 4 SEC. | SUBTLE OSCILLATION 5 SEC. |
| PATTERN 4 | SMALL OSCILLATION 3 SEC. | LARGE OSCILLATION 8 SEC. | SUBTLE OSCILLATION 4 SEC. |
| ⋮ | ⋮ | ⋮ | ⋮ |

FIG. 17A

INSTRUCTION IMAGE DISPLAY DETERMINATION TABLE

| DEALER' S LEVEL | BET START INSTRUCTION IMAGE | BET END INSTRUCTION IMAGE |
|---|---|---|
| HIGH LEVEL | × | × |
| INTERMEDIATE LEVEL | × | ○ |
| LOW LEVEL | ○ | ○ |

FIG. 18A

BET EXISTENCE DETERMINATION TABLE

| | STATION NUMBER | | | | | | | | | |
|---|---|---|---|---|---|---|---|---|---|---|
| | 1 | 2 | 3 | 4 | 5 | 6 | 7 | 8 | 9 | 10 |
| BET | A | P | P | A | A | P | P | P | P | A |

FIG. 19A

OSCILLATION MODE DATA TABLE

| OSCILLATION PATTERN | OSCILLATION MODE | | |
|---|---|---|---|
| PATTERN 1 | SMALL OSCILLATION 5 SEC. | LARGE OSCILLATION 5 SEC. | SUBTLE OSCILLATION 5 SEC. |
| PATTERN 2 | SMALL OSCILLATION 4 SEC. | LARGE OSCILLATION 5 SEC. | SUBTLE OSCILLATION 6 SEC. |
| PATTERN 3 | SMALL OSCILLATION 6 SEC. | LARGE OSCILLATION 4 SEC. | SUBTLE OSCILLATION 5 SEC. |
| PATTERN 4 | SMALL OSCILLATION 3 SEC. | LARGE OSCILLATION 8 SEC. | SUBTLE OSCILLATION 4 SEC. |
| ⋮ | ⋮ | ⋮ | ⋮ |

FIG. 17B

INSTRUCTION IMAGE DISPLAY DETERMINATION TABLE

| DEALER'S LEVEL | BET START INSTRUCTION IMAGE | BET END INSTRUCTION IMAGE |
|---|---|---|
| HIGH LEVEL | × | × |
| INTERMEDIATE LEVEL | × | ○ |
| LOW LEVEL | ○ | ○ |

FIG. 18B

BET EXISTENCE DETERMINATION TABLE

| | STATION NUMBER | | | | | | | | | |
|---|---|---|---|---|---|---|---|---|---|---|
| | 1 | 2 | 3 | 4 | 5 | 6 | 7 | 8 | 9 | 10 |
| BET | A | P | P | A | A | P | P | P | P | A |

FIG. 19B

OSCILLATION MODE DATA TABLE

| OSCILLATION PATTERN | OSCILLATION MODE | | |
|---|---|---|---|
| PATTERN 1 | SMALL OSCILLATION 5 SEC. | LARGE OSCILLATION 5 SEC. | SUBTLE OSCILLATION 5 SEC. |
| PATTERN 2 | SMALL OSCILLATION 4 SEC. | LARGE OSCILLATION 5 SEC. | SUBTLE OSCILLATION 6 SEC. |
| PATTERN 3 | SMALL OSCILLATION 6 SEC. | LARGE OSCILLATION 4 SEC. | SUBTLE OSCILLATION 5 SEC. |
| PATTERN 4 | SMALL OSCILLATION 3 SEC. | LARGE OSCILLATION 8 SEC. | SUBTLE OSCILLATION 4 SEC. |
| ⋮ | ⋮ | ⋮ | ⋮ |

FIG. 20

RENDERED EFFECT TABLE

| OSCILLATION MODE | TYPE OF SOUND |
|---|---|
| SMALL OSCILLATION | SOUND 1 |
| LARGE OSCILLATION | SOUND 2 |
| SUBTLE OSCILLATION | SOUND 3 |

FIG. 21

IC TAG DATA TABLE

| IDENTIFICATION DATA 1 | | IDENTIFICATION DATA 2 | | IDENTIFICATION DATA 3 | |
|---|---|---|---|---|---|
| CLASSIFICATION | NUMBER OF DOTS | CLASSIFICATION | NUMBER OF DOTS | CLASSIFICATION | NUMBER OF DOTS |
| RED | 6 | WHITE | 3 | BLACK | 5 |

FIG. 22

INFRARED CAMERA CAPTURING DATA TABLE

| X | Y | 181 | 182 | 183 | 184 | 185 | 186 | 187 |
|---|---|---|---|---|---|---|---|---|
| −50 | 55 | ○ | ○ | × | ○ | × | ○ | ○ |

FIG. 20A

RENDERED EFFECT TABLE

| OSCILLATION MODE | TYPE OF SOUND |
|---|---|
| SMALL OSCILLATION | SOUND 1 |
| LARGE OSCILLATION | SOUND 2 |
| SUBTLE OSCILLATION | SOUND 3 |

FIG. 21A

IC TAG DATA TABLE

| IDENTIFICATION DATA 1 | | IDENTIFICATION DATA 2 | | IDENTIFICATION DATA 3 | |
|---|---|---|---|---|---|
| CLASSIFICATION | NUMBER OF DOTS | CLASSIFICATION | NUMBER OF DOTS | CLASSIFICATION | NUMBER OF DOTS |
| RED | 6 | WHITE | 3 | BLACK | 5 |

FIG. 22A

INFRARED CAMERA CAPTURING DATA TABLE

| X | Y | 181 | 182 | 183 | 184 | 185 | 186 | 187 |
|---|---|---|---|---|---|---|---|---|
| −50 | 55 | ○ | ○ | × | ○ | × | ○ | ○ |

FIG. 20B

RENDERED EFFECT TABLE

| OSCILLATION MODE | TYPE OF SOUND |
|---|---|
| SMALL OSCILLATION | SOUND 1 |
| LARGE OSCILLATION | SOUND 2 |
| SUBTLE OSCILLATION | SOUND 3 |

FIG. 21B

IC TAG DATA TABLE

| IDENTIFICATION DATA 1 | | IDENTIFICATION DATA 2 | | IDENTIFICATION DATA 3 | |
|---|---|---|---|---|---|
| CLASSIFICATION | NUMBER OF DOTS | CLASSIFICATION | NUMBER OF DOTS | CLASSIFICATION | NUMBER OF DOTS |
| RED | 6 | WHITE | 3 | BLACK | 5 |

FIG. 22B

INFRARED CAMERA CAPTURING DATA TABLE

| X | Y | 181 | 182 | 183 | 184 | 185 | 186 | 187 |
|---|---|---|---|---|---|---|---|---|
| −50 | 55 | ○ | ○ | × | ○ | × | ○ | ○ |

FIG. 23

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 24

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

FIG. 23A

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 24A

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

FIG. 23B

DOT PATTERN DATA CLASSIFICATION TABLE

| DOT | EXISTENCE OF INFRARED ABSORPTION INK | | | | | | | |
|---|---|---|---|---|---|---|---|---|
| 181 | × | ○ | × | × | ○ | ○ | × | ○ |
| 182 | × | × | ○ | × | ○ | × | ○ | ○ |
| 183 | × | × | × | ○ | × | ○ | ○ | ○ |
| COLOR | – | – | – | – | RED | WHITE | BLACK | – |

FIG. 24B

NUMBER OF DOTS-DOT PATTERN DATA TABLE

| DOT | EXISTENCE OF INFRARED ABSORPTION INK | | | | | | | | | | | | | | | |
|---|---|---|---|---|---|---|---|---|---|---|---|---|---|---|---|---|
| 184 | × | ○ | × | × | × | ○ | ○ | ○ | × | × | × | ○ | ○ | ○ | × | ○ |
| 185 | × | × | ○ | × | × | ○ | × | × | ○ | ○ | × | ○ | ○ | × | ○ | ○ |
| 186 | × | × | × | ○ | × | × | ○ | × | ○ | × | ○ | ○ | × | ○ | ○ | ○ |
| 187 | × | × | × | × | ○ | × | × | ○ | × | ○ | ○ | × | ○ | ○ | ○ | ○ |
| NUMBER OF DOTS | – | – | – | – | – | – | – | 1 | 2 | – | – | 3 | 4 | 5 | 6 | – |

FIG.25

POSITION, CLASSIFICATION, AND NUMBER OF DOTS DATA TABLE

| | NUMBER OF GAMES | 1 | | | 2 | | | … | 100 | | | … | 500 | | | … |
|---|---|---|---|---|---|---|---|---|---|---|---|---|---|---|---|---|
| CLASSIFICATION OF DICE | RED | NUMBER OF DOTS | X | Y | NUMBER OF DOTS | X | Y | … | NUMBER OF DOTS | X | Y | … | NUMBER OF DOTS | X | Y | … |
| | | 3 | 44 | 62 | 5 | 62 | −50 | … | 5 | −54 | −90 | … | 1 | 70 | 5 | … |
| | WHITE | NUMBER OF DOTS | X | Y | NUMBER OF DOTS | X | Y | … | NUMBER OF DOTS | X | Y | … | NUMBER OF DOTS | X | Y | … |
| | | 2 | −35 | 50 | 5 | −30 | −45 | … | 3 | 1 | 38 | … | 6 | 40 | −10 | … |
| | BLACK | NUMBER OF DOTS | X | Y | NUMBER OF DOTS | X | Y | … | NUMBER OF DOTS | X | Y | … | NUMBER OF DOTS | X | Y | … |
| | | 6 | 48 | −20 | 4 | −20 | 55 | … | 2 | 1 | −36 | … | 2 | 20 | −50 | … |

GAMING MACHINE THAT PREVENTS GAME FROM CONTINUING WITHOUT DICE POSITION AND DOTS CHANGING

CROSS REFERENCE TO RELATED APPLICATIONS

This application claims benefit of U.S. Provisional Application Nos. 61/095,823, filed Sep. 10, 2008, 61/095,812, filed Sep. 10, 2008, and 61/095,833, filed Sep. 10, 2008, the entire contents of which are incorporated herein by reference.

BACKGROUND OF THE INVENTION

1. Field of the Invention

The present invention relates to a gaming machine that prevents a game from continuing without dice position and dots changing.

2. Related Art

Conventionally, various table games are well known and, for example, among table games, there exists a game genre of so-called dice games, as disclosed in WO 07/016,776, U.S. Patent Application Publication No. 2007/0026947, and U.S. Pat. No. 5,413,351.

Among dice games, for example, as disclosed in U.S. Pat. No. 5,413,351, a game method is disclosed in which, upon a player placing a bet, a dealer throws dice and, in a case where a result thereof becomes a predetermined combination, the player is entitled to throw the dice, and has a chance to win a payout of a large amount. In addition, Sic Bo is known as an old and familiar dice game in Asia in which a player places a bet on predicted numbers of dots appearing on three thrown dice.

Sic Bo is well known as a dice game of ancient China, and is a dice game in which a player places a bet on predicted numbers of dots or a combination thereof appearing on three thrown dice. Ways of betting and odds are displayed on a player's table (these may be displayed using an image display unit). On the table are provided an area for placing a bet on a predicted number of dots appearing on a single die, an area for placing a bet on the same predicted number of dots appearing on two dice, an area for placing a bet on the same predicted number of dots appearing on three dice, an area for placing a bet on a predicted combination appearing on two dice, an area for placing a bet on a predicted total number of dots appearing on three dice, and the like. Odds cannot be uniformly determined due to regional or national conditions; however, these are typically set within a range from 1:1 to approximately 1:180 according to occurrence probabilities.

In a dice game, dice are rolled in each game. However, in a case in which a device that rolls the dice was broken, a game would continue without changing a position and dots of the dice.

It is an object of the present invention to provide a gaming machine that prevents a game from continuing without dice position and dots changing.

SUMMARY OF THE INVENTION

According to a first aspect of the present invention, a gaming machine includes: a playing unit in which a plurality of dice rolls and comes to rest; a sensor that identifies and converts to capturing data a number of dots on the dice by capturing the dice; and a controller that executes processing of: (a) driving the sensor and receiving from the sensor the capturing data converted by the sensor; and (b) determining the number of dots on the dice based on the capturing data thus received.

According to a second aspect of the present invention, a gaming machine is provided which includes: a playing unit in which a plurality of dice rolls and comes to rest; a sensor that identifies a position, classification, and number of dots for each of the plurality of dice on the playing unit by capturing the plurality of dice so as to convert to capturing data; memory that stores the position, classification, and number of dots for each of the plurality of dice for each game; and a controller that executes processing of: (a) driving the sensor and receiving from the sensor the capturing data converted by the sensor; (b) determining the position, classification, and number of dots for each of the plurality of dice based on the capturing data thus received; (c) storing the position, classification, and number of dots for each of the plurality of dice thus determined for each game in the memory; and (d) comparing the position, classification, and number of dots for each of the plurality of dice stored in the memory in a previous game with a position, classification, and number of dots for each of the plurality of dice stored in the memory in a present game.

According to the second aspect of the present invention, since the positions, classifications, and number of dots of each of the plurality of dice on the playing unit are compared between the previous game and the present game, for example, in a case in which a position, classification, and number of dots of all of the plurality of dice in the previous game match those in the present game, which means that all three dice in the previous game have not moved at all and the numbers of dots thereof are not changed, it is understood that a device that rolls the dice is broken.

According to a third aspect of the present invention, in the gaming machine according to the second aspect, the controller executes processing of interrupting a game in a case in which the position, classification, and number of dots for each of the plurality of dice in the previous game matches those in the present game as a result of comparison in the processing (d).

According to the third aspect of the present invention, in a case in which a position, classification, and number of dots of all of the plurality of dice in the previous game match those in the present game, which means that all three dice in the previous game have not moved at all and the numbers of dots thereof have not changed, it is understood that a device that rolls the dice is broken. In this case, a game can be interrupted, which prevents a game from continuing while a device that rolls the dice is broken.

According to a fourth aspect of the present invention, the gaming machine according to the second aspect further includes a display for displaying an image relating to a game, in which, the controller executes processing of displaying, in a case in which the position, classification, and number of dots for each of the plurality of dice in the previous game matches those in the present game as a result of comparison in the processing (d), an indication thereof on the display.

According to the fourth aspect of the present invention, in a case in which a position, classification, and number of dots of all of the plurality of dice in the previous game match those in the present game, which means that all three dice in the previous game have not moved at all and the numbers of dots thereof have not changed, it is understood that a device that rolls the dice is broken. In this case, by displaying on a display an indication that the position, classification, and number of dots have all not changed for all of the plurality of dice, it is possible for a dealer to interrupt a game, and thus it is possible to prevent a game from continuing while a device that rolls the dice is broken.

According to a fifth aspect of the present invention, a gaming machine is provided which includes: a playing unit in which a plurality of dice rolls and comes to rest; a first sensor (for example, an IC tag reader 16 and the like) that receives identification data a number of dots on the dice by performing communication with the dice; a second sensor (for example, an infrared camera 15 and the like) that recognizes an identification pattern of dots by imaging the dice, and converts thereof to imaging data; and a controller that executes processing of: (a) driving the first sensor and receiving from the first sensor the identification data received by the first sensor; (b) driving the second sensor and receiving from the second sensor the imaging data converted by the second sensor; and (c) determining the number of dots on the dice based on the identification data and the imaging data thus received.

According to the fifth aspect of the present invention, since detection and identification of a number of dots are performed using the first and second sensors, even in a case in which one sensor is broken, the other sensor can detect and identify the number of dots on dice, and thus it is possible to improve the accuracy of detection and identification of a number of dots.

According to a sixth aspect of the present invention, in the gaming machine according to the fifth aspect, the dice have a memory unit in each of a plurality of faces thereof; the first sensor is disposed in the playing unit which is substantially level, and receives identification data of the number of dots from the memory unit which is present in a range communicable by the first sensor; and when a single face among a plurality of faces of one of the dice is in contact with the playing unit, only one of the memory units thereof is present in a range communicable by the first sensor.

According to the sixth aspect of the present invention, since a single memory unit is present in a range communicable by the first sensor when one face of a die is in contact with a playing unit which is substantially level, the first sensor can specify a unique number of dots on the dice.

According to a seventh aspect of the present invention, a gaming machine is provided which includes: a playing unit that is substantially level and on which a plurality of dice rolls and comes to rest; a sensor that recognizes, by imaging the dice in a substantially vertical direction with respect to the playing unit, and converts an identification pattern of a number of dots on the dice to imaging data, in which the sensor recognizes and converts the identification pattern, which corresponds to a face thereof having the largest area imaged among a plurality of faces thus imaged, to imaging data, in a case in which a plurality of faces of the dice is imaged; and a controller that executes processing of: (a) driving the sensor and receiving from the sensor the imaging data converted by the sensor; and (b) determining the number of dots on the dice based on the imaging data thus received.

According to the seventh aspect of the present invention, in a case in which the dice come to rest leaning and the number of dots on the dice cannot be determined distinctly by imaging a plurality of faces of the dice using a sensor, the number of dots of a face having the largest area is specified as the number of dots on the dice. Therefore, even if the dice come to rest leaning, the number of dots can be specified distinctly.

According to an eighth aspect of the present invention, in the gaming machine according to the seventh aspect, the dice include a region with identical area on each of the plurality of faces, and the sensor calculates an imaged area of the region corresponding to each of a plurality of faces thus imaged, and recognizes and converts the identification pattern, which corresponds to a face having an imaged area thus calculated that is the largest, to imaging data.

According to the eighth aspect of the present invention, an imaged area of the region included on the dice is calculated, and a number of dots can be determined based on the imaged area thus calculated.

According to a ninth aspect of the present invention, a gaming machine includes: dice having a dot pattern on each of a plurality of faces; a sensor that identifies a position, classification, and number of dots of the dice by capturing a dot pattern of the dice, and converts thereof to capturing data; memory that stores the position, classification, and number of dots of the dice for each game; and a controller that executes processing of: (a) driving the sensor and receiving from sensor the capturing data by the sensor; (b) determining the position, classification, and number of dots of the dice based on the capturing data thus received; (c) storing the position, classification, and number of dots of the dice thus determined for each game in the memory; and (d) calculating a frequency at which each number of dots appears over a predetermined number of games for each classification of the dice.

According to the ninth aspect of the present invention, since dice are configured so as to have a dot pattern on each face and so as to distinguish a classification and number of dots of the dice by a combination of dot patterns, the number of dots can be identified by an easier method. Furthermore, since a frequency at which each number of dots appears over a predetermined number of games for each classification of the dice is calculated, it is possible to detect damage to dice or fraudulence related to dice for a case in which a particular number of dots appears very frequently on a specific classification of dice.

According to a tenth aspect of the present invention, a gaming machine includes: a playing unit in which a plurality of dice rolls and comes to rest; a first sensor that receives identification data of dots on the dice by performing communication with the dice; a second sensor that recognizes an identification pattern of a number of dots on the dice by imaging the dice, and converts thereof to imaging data; and a controller that executes processing of: (a) driving the first sensor and determining whether identification data received by the first sensor has been received from the first sensor; (b) determining the number of dots on the dice based on the identification data thus received, in a case of a YES determination in the processing (a); (c) driving the second sensor and receiving the imaging data converted by the second sensor from the second sensor, in a case of a NO determination in the processing (b); and (d) determining the number of dots on the dice based on the imaging data thus received.

According to the tenth aspect of the present invention, in a case in which the identification data could be received by the first sensor, the number of dots on the dice is determined based on the identification data thus received, and then, in a case in which the identification data could not be received by the first sensor, the number of dots on the dice is determined based on the imaging data using the second sensor. Thus, in a case where, for example, a die is inclined and the number of dots thereof cannot be identified by the first sensor, since the number of dots can be determined based on the imaging data using the second sensor, it is possible to improve the accuracy of the detection and identification of the number of dots.

According to an eleventh aspect of the present invention, in the gaming machine according to the tenth aspect, the dice have a memory unit in each of a plurality of faces thereof; and the first sensor is disposed in the playing unit which is substantially level, and receives identification data of the number of dots from the memory unit which is present in a range communicable by the first sensor.

According to the eleventh aspect of the present invention, a case in which identification data cannot be received by the first sensor indicates a case in which not even one memory unit is present in a range communicable by the first sensor. Therefore, this case indicates that a face of the die is not in contact with the playing unit which is substantially level, and is inclined at an angle of at least a predetermined degree. Thus, in a case in which the dice is inclined at an angle of at least a predetermined degree with respect to the playing unit, although the number of dots on the dice cannot be identified, number of dots on the dice can be identified using the second sensor.

BRIEF DESCRIPTION OF THE DRAWINGS

FIG. 17 is a diagram showing an instruction image display determination table according to the embodiment of the present invention;

FIG. 18 is a diagram showing a bet existence determination table according to the embodiment of the present invention;

FIG. 19 is a diagram showing an oscillation mode data table according to the embodiment of the present invention;

FIG. 20 is a diagram showing a rendered effect table according to the embodiment of the present invention;

FIG. 21 is a diagram showing an IC tag data table according to the embodiment of the present invention;

FIG. 22 is an infrared camera capturing data table according to the embodiment of the present invention;

FIG. 23 is a dot pattern data classification table according to the embodiment of the present invention;

FIG. 24 is a number of dots-dot pattern data table according to the embodiment of the present invention;

FIG. 25 is a position, classification, and dot data table according to the embodiment of the present invention;

FIGS. 6A to 9A show IC tag readable areas by IC tag readers according to the embodiment of the present invention;

FIG. 17A is a diagram showing an instruction image display determination table according to the embodiment of the present invention;

FIG. 18A is a diagram showing a bet existence determination table according to the embodiment of the present invention;

FIG. 19A is a diagram showing an oscillation mode data table according to the embodiment of the present invention;

FIG. 20A is a diagram showing a rendered effect table according to the embodiment of the present invention;

FIG. 21A is a diagram showing an IC tag data table according to the embodiment of the present invention;

FIG. 22A is an infrared camera imaging data table according to the embodiment of the present invention;

FIG. 23A is a dot pattern data classification table according to the embodiment of the present invention;

FIG. 24A is a number of dots-dot pattern data table according to the embodiment of the present invention;

FIGS. 25A to 29A show examples of display screens according to the embodiment of the present invention;

FIGS. 6B to 9B show IC tag readable areas by IC tag readers according to the embodiment of the present invention;

FIG. 17B is a diagram showing an instruction image display determination table according to the embodiment of the present invention;

FIG. 18B is a diagram showing a bet existence determination table according to the embodiment of the present invention;

FIG. 19B is a diagram showing an oscillation mode data table according to the embodiment of the present invention;

FIG. 20B is a diagram showing a rendered effect table according to the embodiment of the present invention;

FIG. 21B is a diagram showing an IC tag data table according to the embodiment of the present invention;

FIG. 22B is an infrared camera imaging data table according to the embodiment of the present invention;

FIG. 23B is a dot pattern data classification table according to the embodiment of the present invention;

FIG. 24B is a number of dots-dot pattern data table according to the embodiment of the present invention;

FIGS. 25B to 29B show examples of display screens according to the embodiment of the present invention;

DETAILED DESCRIPTION OF THE INVENTION

Embodiments of the present invention will be described below with reference to the accompanying drawings.

Figure 1:
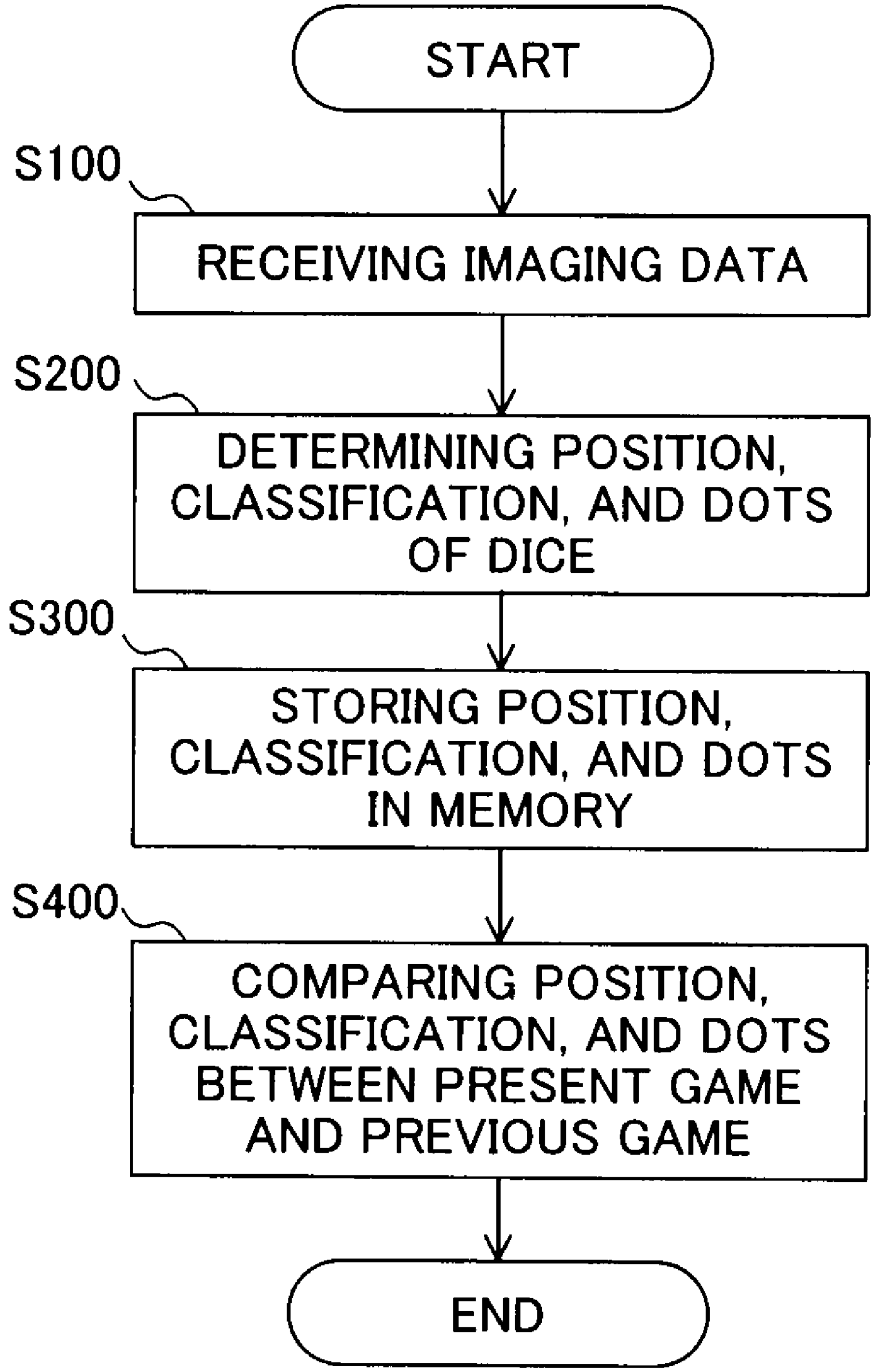
FIG. 1 is a flowchart schematically showing a processing sequence of a gaming machine according to an embodiment of the present invention.

Although described in detail later, as shown in FIG. 1, the CPU 81 receives capturing data from an infrared camera (Step S100), determines a position, classification, and dots of dice based on the capturing data thus received (Step S200), stores the position, classification, and dots of the dice thus determined for each game in the RAM 83 (Step S300), and compares the position, classification, and dots of the dice 70*a*, 70*b*, and 70*c* of the previous game stored in the RAM 83 with the position, classification, and dots of the dice 70*a*, 70*b*, and 70*c* of the present game stored in the RAM 83, respectively (Step S400).

Figure 2:
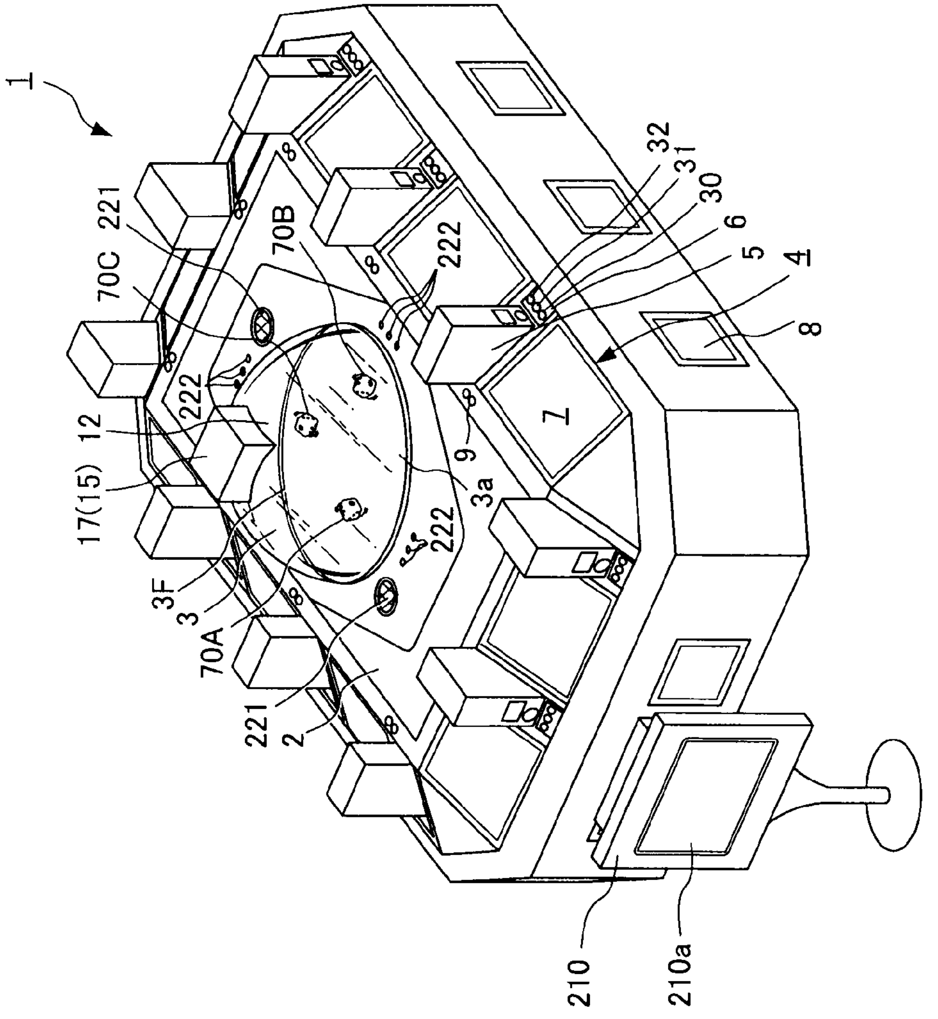
FIG. 2 is a perspective view of a gaming machine according to the embodiment of the present invention.
Figure 3:
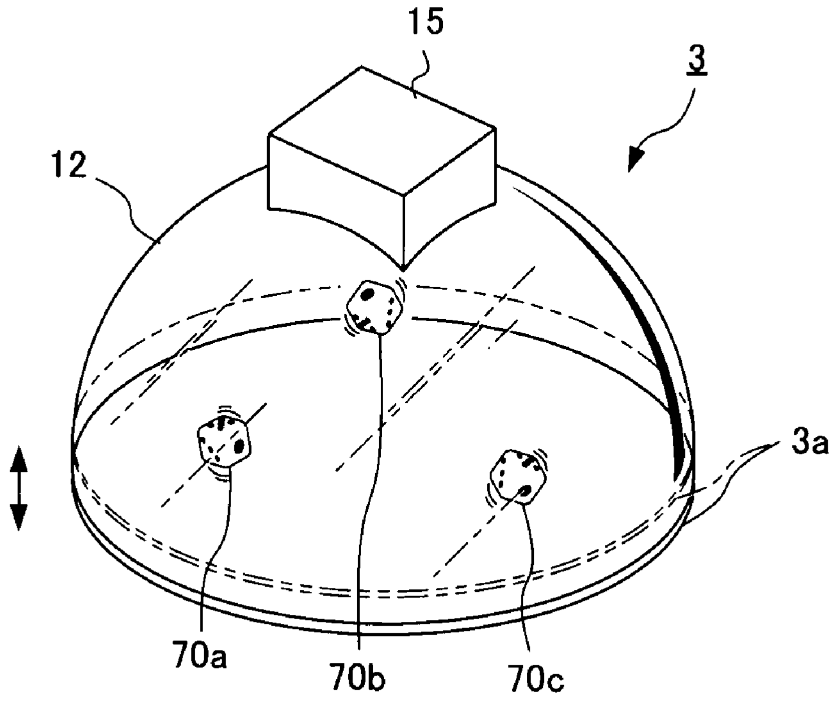
FIG. 3 is an enlarged view of a playing unit of the gaming machine shown in FIG. 2.

FIG. 2 is a perspective view schematically showing an example of a gaming machine according to the embodiment of this invention. FIG. 3 is an enlarged view of a playing unit of the gaming machine shown in FIG. 2. As shown in FIG. 2, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the top face of the housing 2 and in which a plurality of dice 70 are rolled and stopped, and a plurality of stations 4 (ten in this embodiment) disposed so as to surround the playing unit 3.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70*a*, 70*b*, and 70*c*) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

The playing unit 3 includes a playing board 3*a*, which is formed to be a circular shape, to roll and then stop the dice 70. An IC tag reader 16, which is described later in FIGS. 6 to 9, are provided below the playing board 3*a*.

Since the playing board 3*a* is formed to be substantially planar, as shown in FIG. 3, the dice 70 are rolled by oscillating the playing board 3*a* substantially in the vertical direction with respect to the horizontal direction of the playing board 3*a*. Then, the dice 70 are stopped after the oscillation of the playing board 3*a* ceases. The playing board 3*a* is oscillated by a CPU 81 (described later) driving an oscillating motor 300.

Furthermore, as shown in FIG. 3, the playing unit 3 is covered with a cover member 12 of which the entire upper area is made of a transparent acrylic material formed in a hemispherical shape, and regulates the rolling area of the dice 70. In the present embodiment, an infrared camera 15 is provided at the top of the cover member 12 to detect numbers of dots and the like (such as positions of the dice 70 on the playing board 3*a*, classifications of the dice 70, and numbers of dots of the dice 70) of the dice 70. Furthermore, the cover member 12 is covered with a special film (not shown) which blocks infrared radiation. In this way when the numbers of dots of the dice 70 on which an infrared absorption ink has been applied is detected with the infrared camera 15, false detection can be prevented that arises, for example, in a case where a blink rate of a light irradiated from a circumference of the playing unit 3 is fast.

Figure 4:
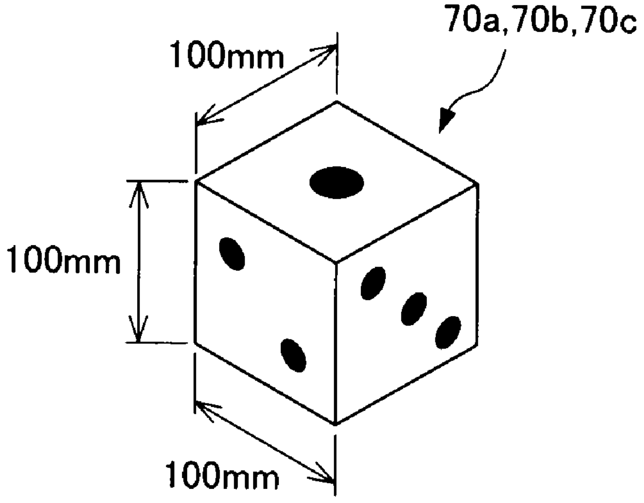
FIG. 4 is an external perspective view of a die according to the embodiment of the present invention.

FIG. 4 is an external perspective view of a die 70. As shown in FIG. 4, the die 70 is a cube of which the length of a side is 100 mm.

Figure 5:
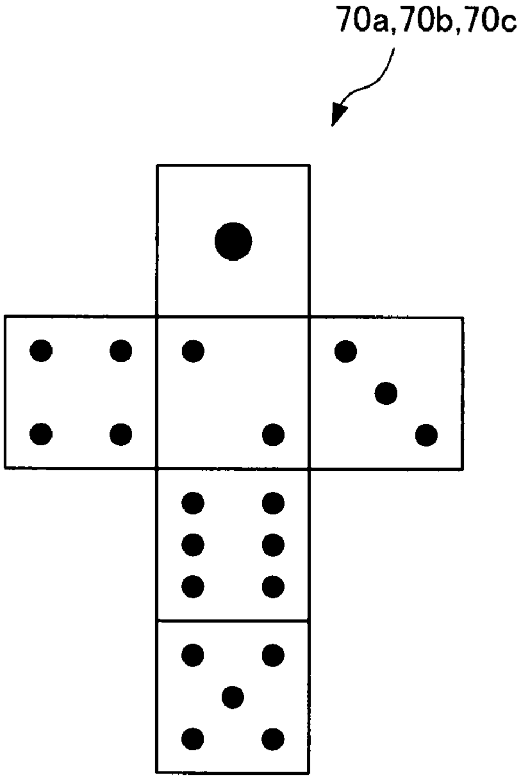
FIG. 5 is a development view of a die according to the embodiment of the present invention.

FIG. 5 is a development view of the die 70. As shown in FIG. 5, the combinations of two faces opposing each other are “1 and 6”, “2 and 5”, and “3 and 4”.

FIGS. 6 to 9 show IC tag readable areas by an IC tag reader 16 disposed below the playing board 3*a*.

Here, a way of reading information stored in the IC tag by the IC tag reader 16 is described below.

The IC tag reader 16 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 16. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader. In addition, reading the IC tags may not only be done by the non-contact type, but also a contact type. In addition, the IC tag reader is not limited thereto, and anything that is appropriately designed with the object of being read may be employed.

In the present embodiment, a readable area of the IC tag reader 16 is 10 mm in substantially a vertical direction from substantially an entire horizontal face on the playing board 3*a*.

Figure 6:
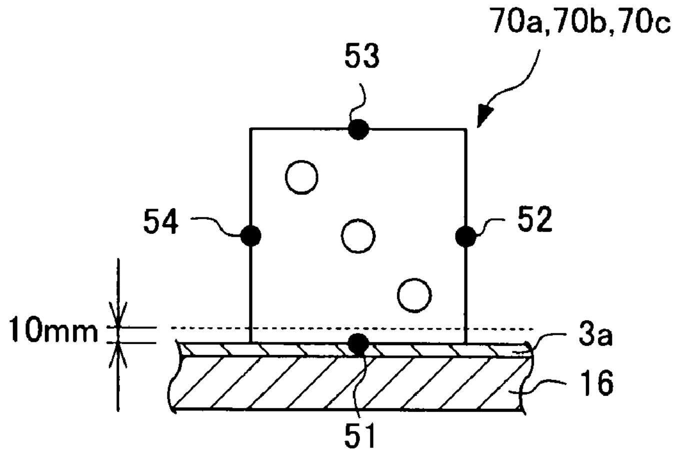
FIGS. 6 to 9 show IC tag readable areas by IC tag readers according to the embodiment of the present invention.

With reference to FIG. 6, a face of the die 70 (for example, a face of which the number of dots is six) is in contact with the playing board 3*a*. Furthermore, the IC tag is embedded substantially at the center of each face of the die 70 (the IC tags for the faces on which the numbers of dots are “3” and “4” are not shown). An IC tag 51 is embedded substantially at the center of a face on which the number of dots is six. An IC tag 52 is embedded substantially at the center of a face on which the number of dots are five. An IC tag 53 is embedded substantially at the center of a face on which the number of dots is one. An IC tag 54 is embedded substantially at the center of a face on which the number of dots is two.

Here, only the IC tag 51 exists in the readable area of the IC tag reader 16. Therefore, the number of dots (in this case, “one”) of a face, opposing the face on which the IC tag 51 is embedded, is determined as the number of dots of the die 70.

Furthermore, since the number of dots of a face, opposing a face on which an IC tag is embedded, is determined as the number of dots of the die 70, “one” is stored, as data of the number of dots, in the IC tag 51 on the face of which the number of dots is “six”. “Two” is stored, as data of the number of dots, in the IC tag 52 on the face of which the number of dots is “five”. “Six” is stored, as data of the number of dots, in the IC tag 53 on the face of which the number of dots is “one”. “Five” is stored, as data of the number of dots, in the IC tag 54 on the face of which the number of dots is “two”. “Three” is stored, as data of the number of dots, in the IC tag (not shown) on the face of which the number of dots is “four”. Finally, “four” is stored, as data of the number of dots, in the IC tag (not shown) on the face of which the number of dots is “three”.

Furthermore, as described above, since a side of the die 70 is 10 mm, it is not physically possible for an IC tag reader 16 to detect more than one IC tag with respect to one die.

Figure 7:
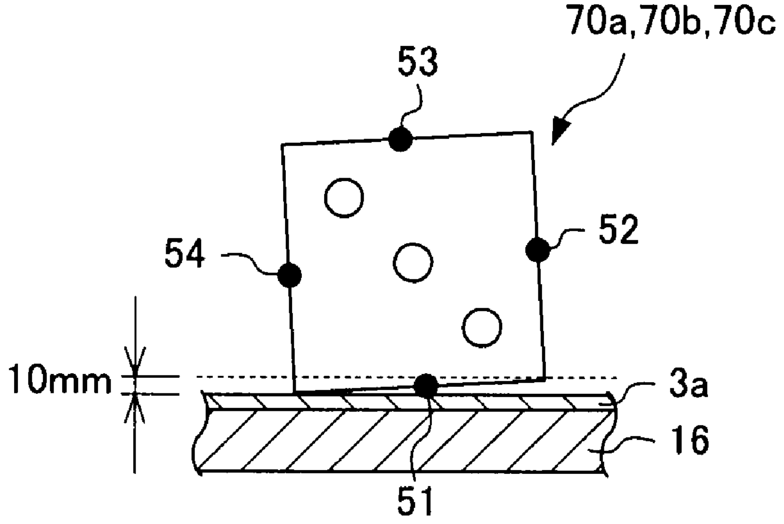

With reference to FIG. 7, a die 70 is inclined. However, since the IC tag 51 still exists in the readable area of the IC tag reader 16, the number of dots of the die 70 is determined as "one".

Figure 8:
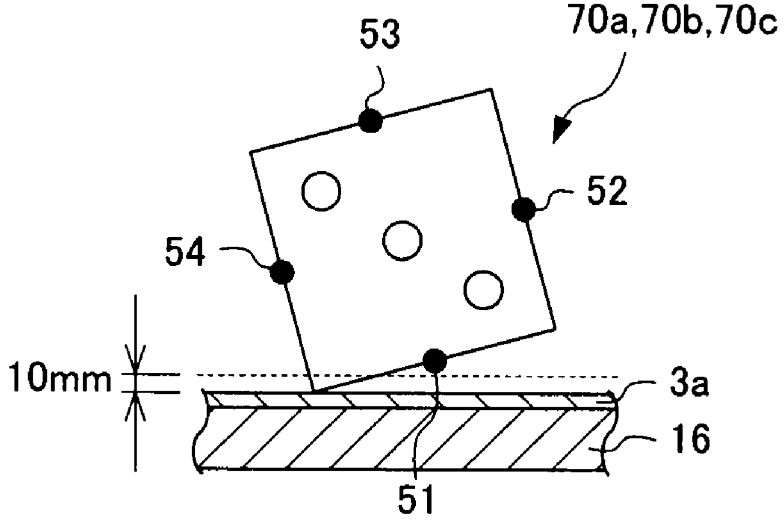

With respect to FIG. 8, the die 70 is inclined at a greater angle than the case shown in FIG. 7. Then, since there is no IC tag which exists in the readable area of the IC tag reader 16, the IC tag reader 16 cannot detect the number of dots of the die 70.

Figure 9:
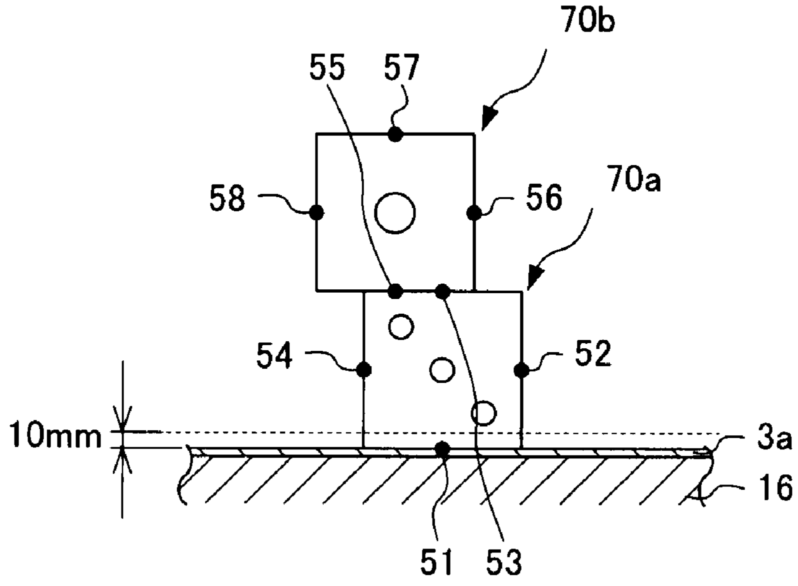

With reference to FIG. 9, the die 70*b* is superimposed on the die 70*a*. In this case, neither of the IC tags 55, 56, 57, and 58, which are embedded in the die 70*b*, exists in the readable area of the IC tag reader 16. Therefore, in this case, the IC tag reader 16 cannot detect the number of dots of the die 70*b*.

Figure 10:
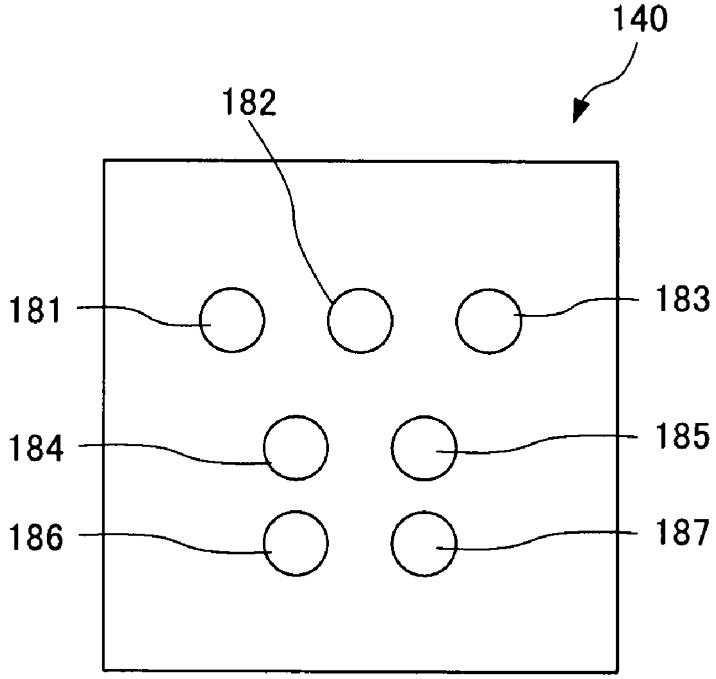
FIG. 10 shows a sheet attached to each face of a die according the embodiment of the present invention.

FIG. 10 shows a sheet 140 attached to each face of the die 70.

As shown in FIG. 10, on each face of the die 70, the sheet 140, to which infrared absorption ink is applied to identify the number of dots and the classification of the die 70, is provided so as to be covered by a sheet on which the number of dots is printed. According to FIG. 10, the infrared absorption ink can be applied to dots 181, 182, 183, 184, 185, 186, and 187.

The number of dots of the die 70 can be identified by a combination of the dots to which the infrared absorption ink is applied among the dots 184, 185, 186, and 187. In addition, the classification of the die 70 can be identified by a combination of the dots to which the infrared absorption ink is applied among the dots 181, 182, and 183.

Figure 11:
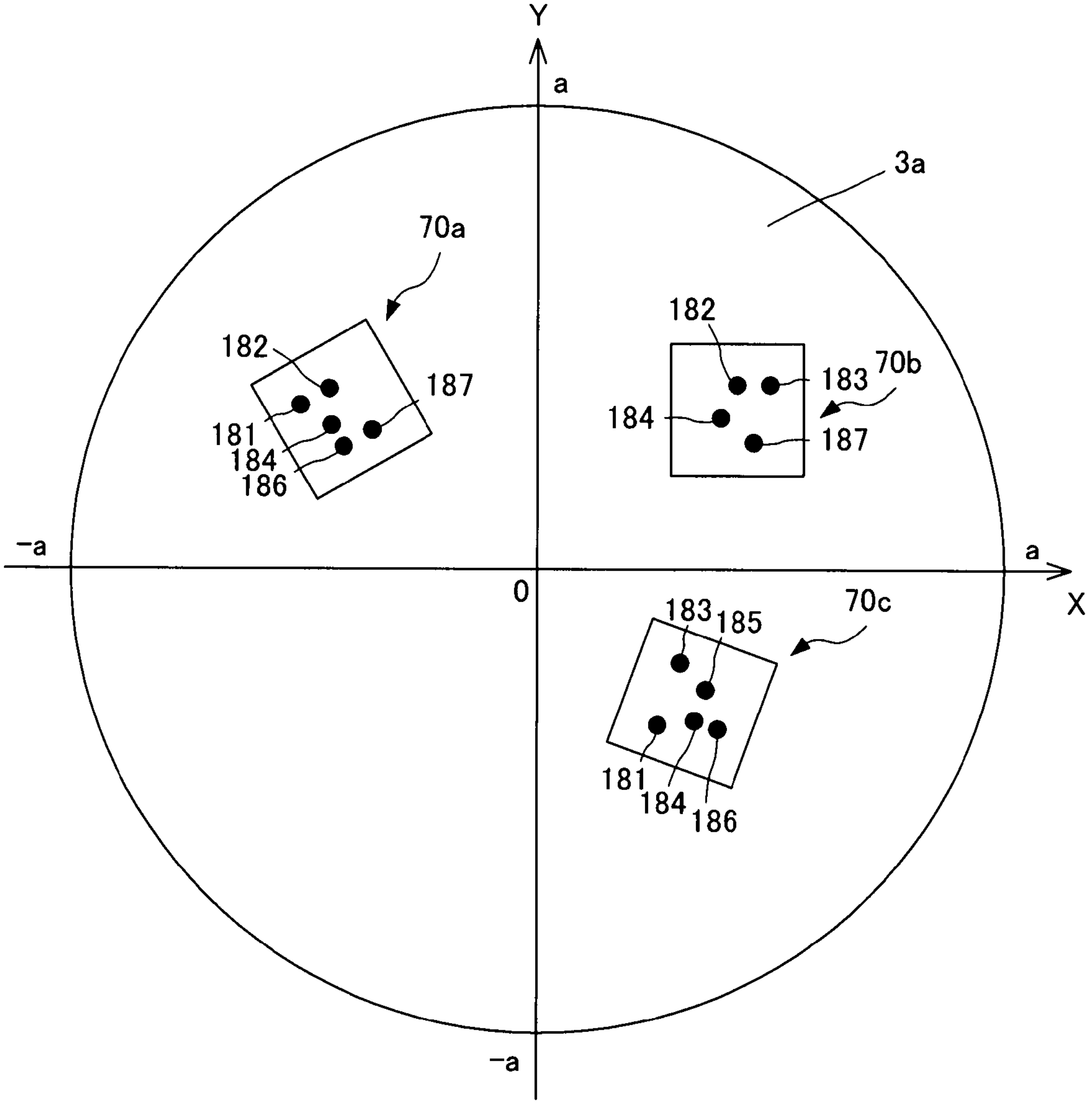
FIG. 11 is an image showing a state in which a die according to the embodiment of the present invention is captured substantially in the vertically upward direction by an infrared camera.

FIG. 11 shows an image in which the dice 70, which comes to rest on the playing board 3*a*, are captured substantially in the vertically upward direction using an infrared camera 15.

With reference to FIG. 11, dots to which the infrared absorption ink is applied on each of the dice 70*a*, 70*b*, and 70*c* are captured in black. The classification and the number of dots for each of the dice 70*a*, 70*b*, and 70*c* are determined based on a combination of the dots to which the ink is applied. In addition, the playing board 3*a* is formed in a disc shape having a radius a, and each position of the dice 70*a*, 70*b*, and 70*c* is detected as an x component and y component on an x-y coordinate.

Figure 12:
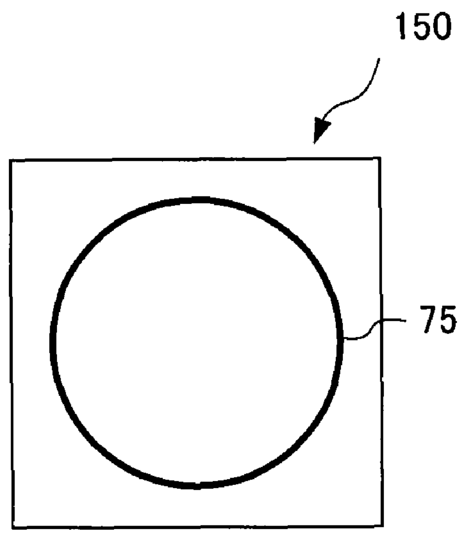
FIG. 12 shows a sheet attached to each face of a die according the embodiment of the present invention.

FIG. 12 shows a sheet 150 which is attached to each face of the dice 70.

As shown in FIG. 12, a circular profile 75 having a certain area on each face of the dice 70 in common is depicted by way of applying the infrared absorption ink on each face of the dice 70. The sheet 150 on which the circular profile 75 is depicted is provided so as to be covered by the above-mentioned sheet 140.

Figure 13:
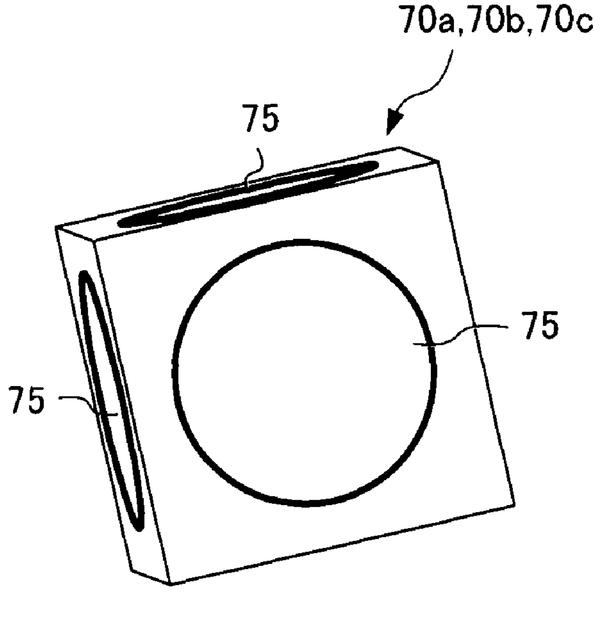
FIG. 13 shows an image in which a die according to the embodiment of the present invention that has come to rest at a tilt on a playing board, is captured substantially in the vertically upward direction by an infrared camera.

FIG. 13 shows an image in which the die 70, which comes to rest at a tilt on a playing board 3*a*, is captured substantially in the vertically upward direction using the infrared camera 15.

With reference to FIG. 13, three faces of the die 70 are captured. Therefore, it is necessary to distinguish the number of dots of which face is correct. Consequently, the number of dots having the largest area among the three faces is determined as the face that should be read. In a case of this distinction, the CPU (not shown) in the infrared camera 15 calculates the areas of the circular profiles 75 thus captured, and distinguishes the number of dots of the face on which the circular profile 75 having the largest area among the areas thus calculated is printed as the correct number of dots.

Figure 14:
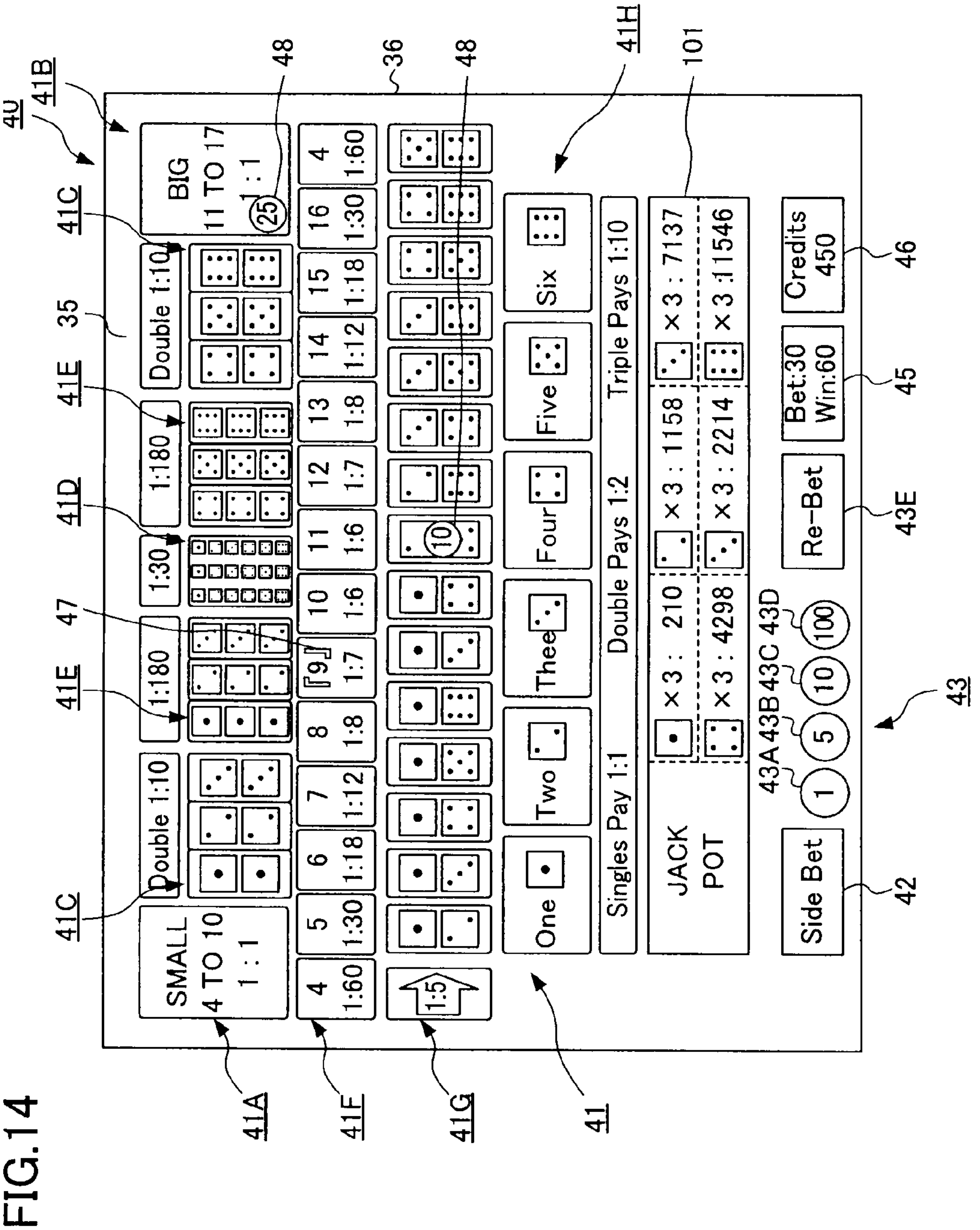
FIG. 14 shows an example of a display screen according to the embodiment of the present invention.

FIG. 14 shows an example of a display screen displayed on an image display unit. As shown in FIG. 14, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1 bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300, . . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots appearing on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots appearing commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots appearing on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots appearing on the two dice selected from the three, and the odds are set to 1:5.

The normal bet area 41H is a region where the player places a bet on the number of dots appearing on the dice 70, and the odds are set according to the number of dots of the dice 70 matching the predicted number of dots.

Figure 15:
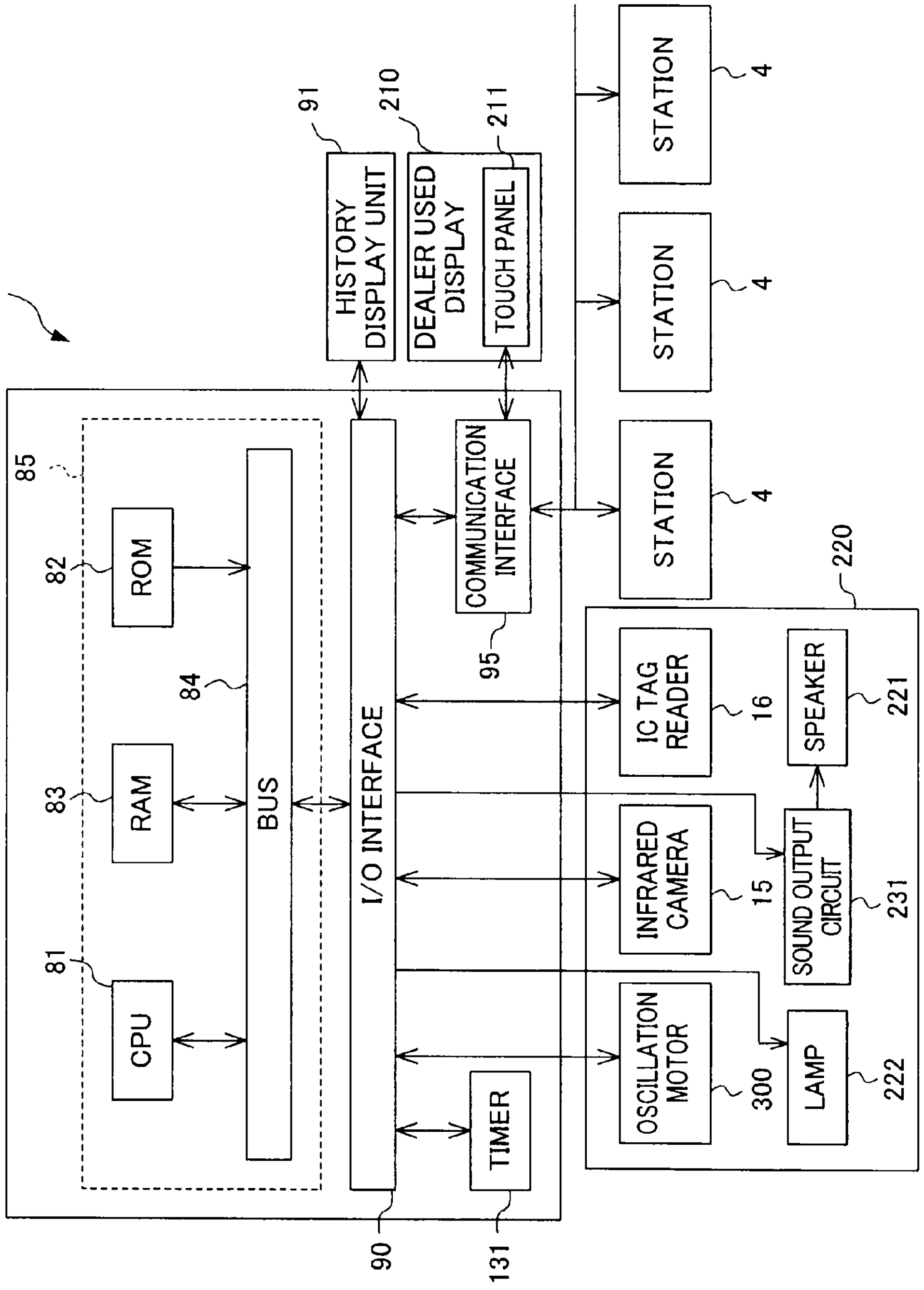
FIG. 15 is a block diagram showing the internal configuration of the gaming machine shown in FIG. 2.

FIG. 15 is a block diagram showing the internal configuration of the gaming machine shown in FIG. 2. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an I/O interface 90. Furthermore, the CPU 81 is connected with a timer 131, which can measure time via the I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the IC tag reader 16, thereby transmitting and receiving information in relation to the number of dots of the three dice 70, which comes to rest on the playing board 3*a*, between the infrared camera 15 and/or the IC tag reader 16.

Here, the oscillating motor 300, the infrared camera 15, the IC tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, payout information, and the like to and from each station 4, as well as data such as bet start instruction images, bet start instruction signals, and the like to and from the dealer used display 210.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the infrared camera 15 and/or the IC tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed.

The CPU 81 controls the oscillating motor 300, which oscillates the playing unit 3, based on data and a program stored in the ROM 82 and the RAM 83, and oscillates the playing board 3*a* of the playing unit 3. Furthermore, after oscillation of the playing board 3*a* ceases, a control processing associated with game progression, such as confirmation processing for confirming the number of dots on each of the dice 70 resting on the playing board 3*a*.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 16:
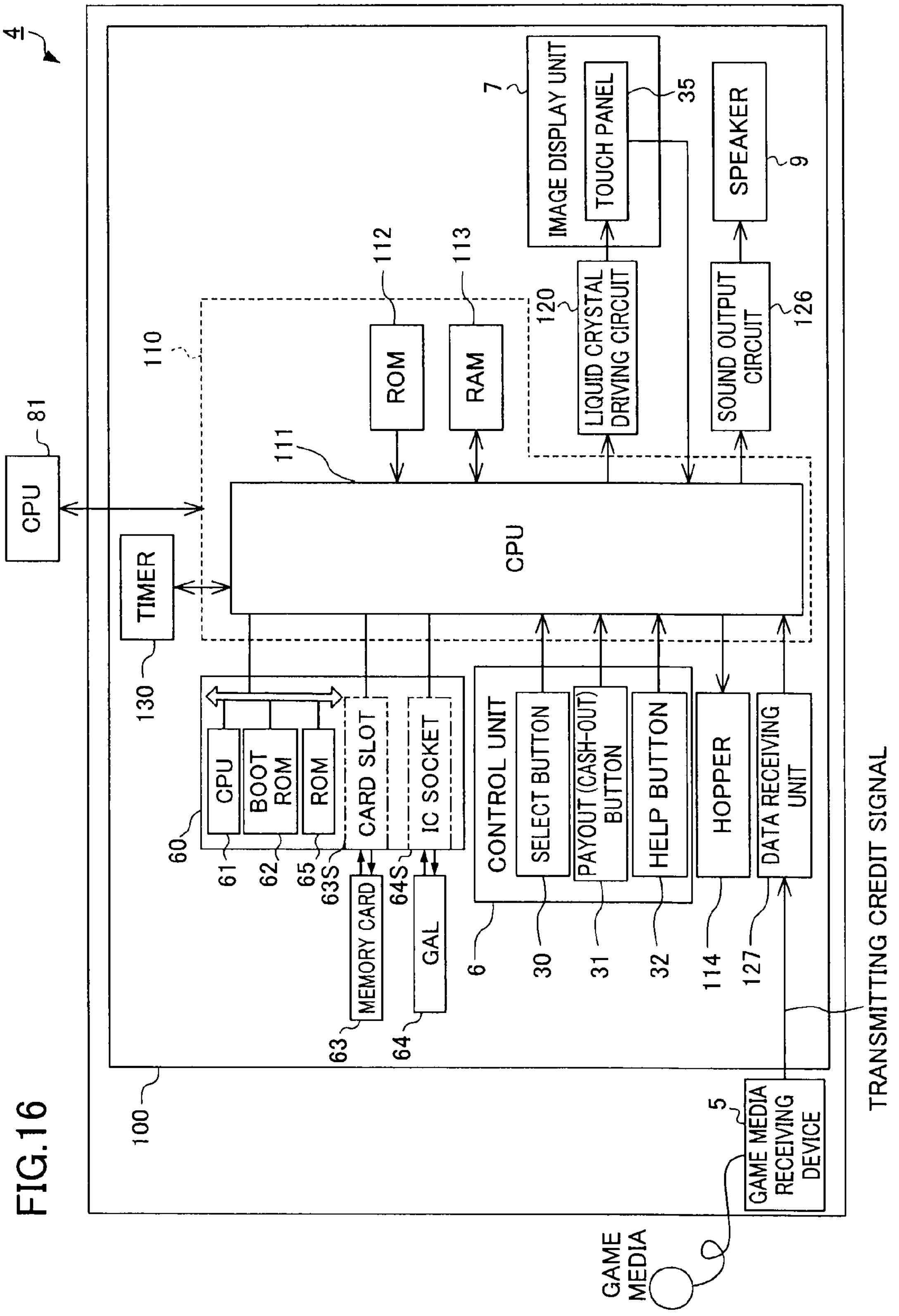
FIG. 16 is a block diagram showing the internal configuration of the station shown in FIG. 2.

FIG. 16 is a block diagram showing the internal configuration of the station shown in FIG. 2. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots appearing on the dice, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like. More specifically, selection of the normal bet area 41 and the side bet area 42 in the bet screen 40, manipulation of the bet button unit 43 and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

An instruction image display determination table is described with reference to FIG. 17.

Figure 33:
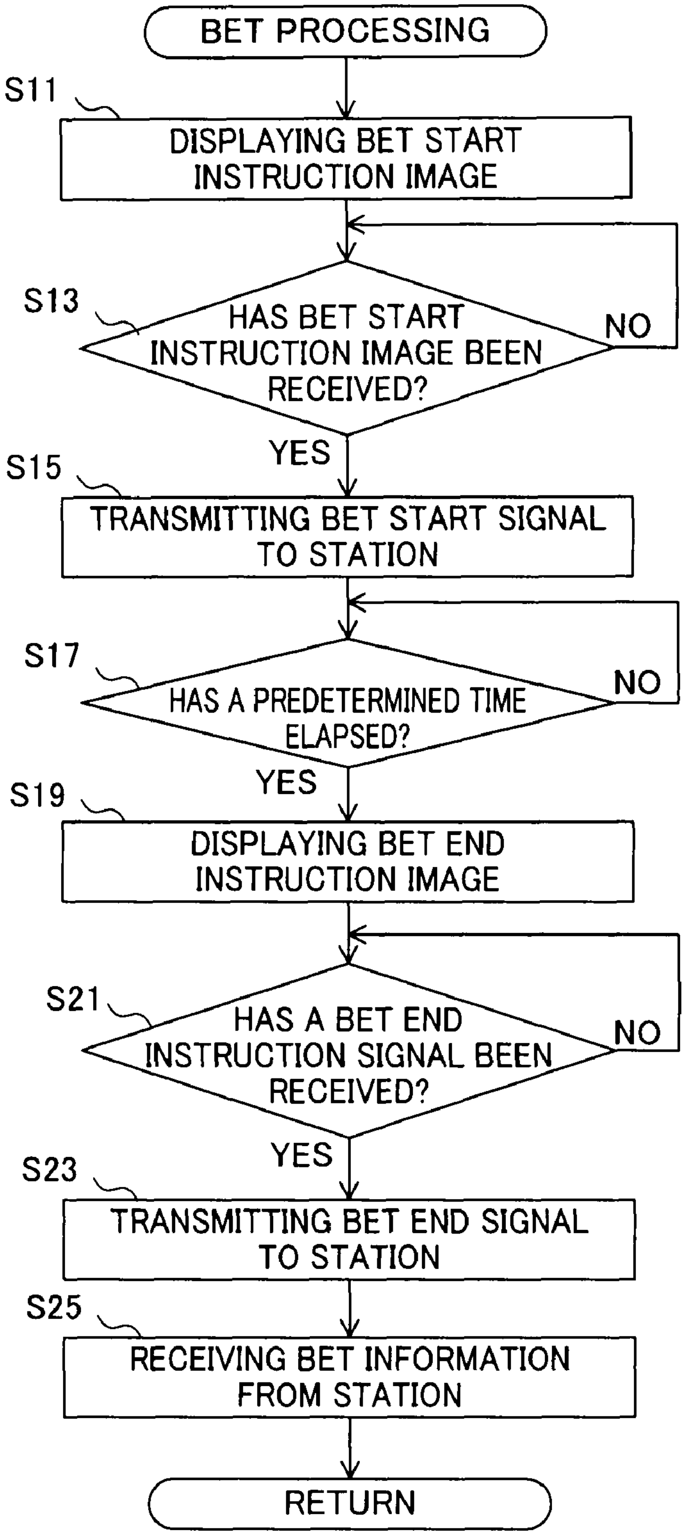
FIG. 33 is a flowchart showing bet processing executed in a gaming machine according to the embodiment of the present invention.

In Steps S11 and S19 of FIG. 33, the instruction image display determination table is referred to by the CPU 81 upon determining whether a bet start instruction image or a bet end instruction image is displayed on the display screen 210*a* of the dealer used display 210.

According to this table, "X" is data for indicating that the bet start instruction image and the like is not displayed on the display screen 210*a*, and "O" is data for indicating that the bet start instruction image and the like is displayed on the display screen 210*a*. For example, in a case in which a dealer belongs to an intermediate level, the bet start instruction image is not displayed on the display screen 210*a*, but the bet end instruction image is displayed on the display screen 210*a*. In addition, this table is stored in the ROM 82.

The bet existence determination table is described with reference to FIG. 18.

Figure 34:
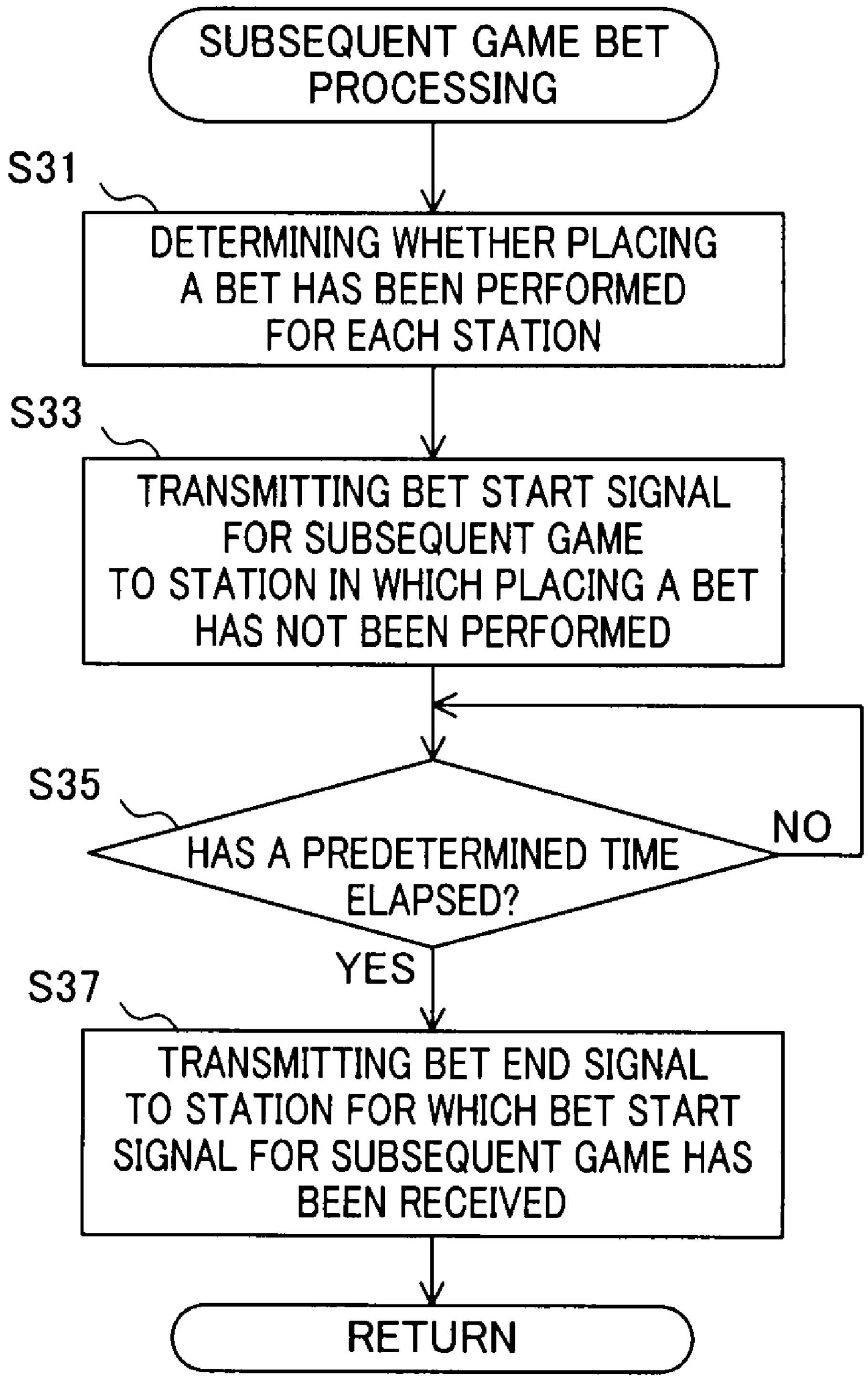
FIG. 34 is a flowchart showing subsequent game bet processing executed in a gaming machine according to the embodiment of the present invention.

The CPU 81 refers to this bet existence determination table upon determining for each station 4 whether a bet operation is performed at each station 4 in Step S31 of FIG. 34.

Data indicating whether the bet operation has been performed or not at each station number is stored in this table. "P" is data indicating that a bet operation was performed, and "A" is data indicating that a bet operation was not performed. In addition, this table is updated in every game, and stored in the RAM 83.

An oscillation mode data table is described with reference to FIG. 19.

Figure 35:
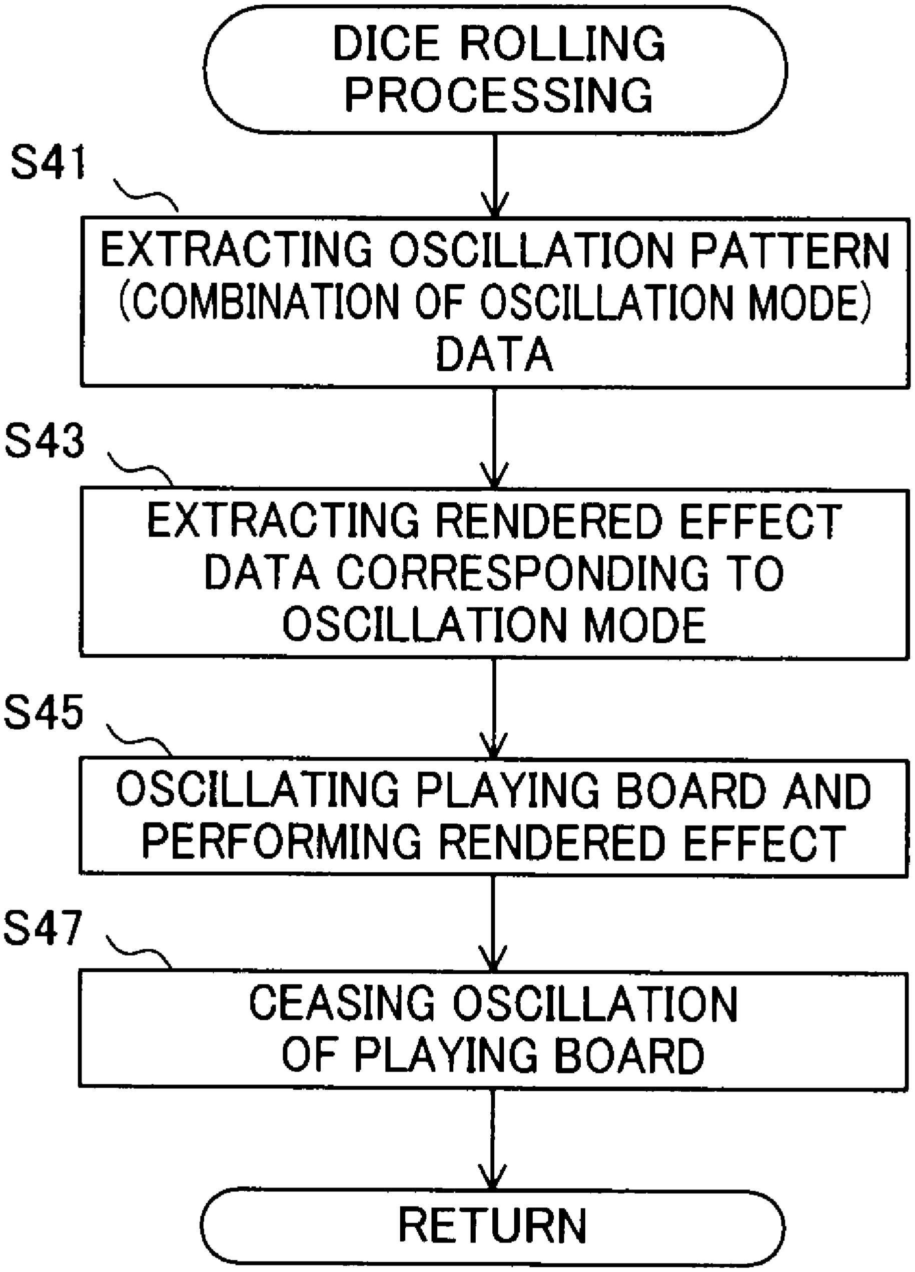
FIG. 35 is a flowchart showing dice rolling processing executed in a gaming machine according to the embodiment of the present invention.

The CPU 81 refers to this oscillation mode data table upon determining combination patterns of the oscillation modes of the playing board 3*a* in Step S41 of FIG. 35. In addition, this table is stored in the ROM 82.

According to this table, in a case of a pattern 3, the roll of dice 70 is performed in the order of a small oscillation for six seconds, a large oscillation for four seconds, and a subtle oscillation for five seconds. Here, the order of oscillation amplitude of the playing board 3*a* is equal to large oscillation>small oscillation>subtle oscillation. It should be noted that the oscillation speed for the large oscillation, the small oscillation, and the subtle oscillation are all the same speed. Furthermore, the small oscillation is enough to be able to roll a die, the large oscillation is enough to jump a die, and the subtle oscillation is enough to level off a die that comes to rest at a tilt.

A rendered effect table is described with reference to FIG. 20.

The CPU 81 refers to this rendered effect table upon determining rendered effect data in response to an oscillation pattern of the playing board 3*a* in Step S43 of FIG. 35. In addition, this table is stored in the ROM 82.

According to this table, oscillation modes correspond to sound types and, for example, in the case of a large oscillation, "sound 2" is determined. For example, in the case of "sound 2", the sound indicating that a die jumps is outputted from the speaker 221.

It should be noted that, by way of associating an oscillation mode with a certain type of emitted light, rendered effects with a light emitting mode associated with an oscillation mode may be performed by lighting or flashing of the lamp 222.

An IC tag data table is described with reference to FIG. 21.

The IC tag data table is a table showing data as identification data 1 to 3 which is created by the CPU 81 based on the results of the classification of dice and the number of dots on the dice, when information stored in IC tags embedded in the dice 70*a*, 70*b*, and 70*c* is detected by the IC tag reader 16.

According to this table, for example, when an IC tag embedded in each die is detected in the order of 70*c*, 70*a*, and 70*b*, by the IC tag reader 16, the die 70*c* is associated with identification data 1 of which the classification is "red" and the number of dots is "six", the die 70*a* is associated with identification data 2 of which the classification is "white" and the number of dots is "three", and the die 70*b* is associated with identification data 3 of which the classification is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 16 to the CPU 81, and then the CPU 81 receives it to analyze the number of dots on a die and the like.

An infrared camera capturing data table is described with reference to FIG. 22.

The infrared camera capturing data table is a data table showing dot patterns of the infrared absorption inks applied to the dice 70 and location data of the dice 70 on the playing board 3*a*.

For example, regarding the die 70*a* shown in FIG. 11, in the infrared camera capturing data table, the CPU (not shown) inside the infrared camera 15 stores −50 for X and 55 for Y as location data, stores "O" for 181, 182, 184, 186, and 187, to which the infrared absorption inks are being applied, and stores "X" for 183 and 185, which are not being applied. The same is true of the dice 70*b* and 70*c*.

On the other hand, as shown in FIG. 13, in a case where a plurality of faces of the dice 70 is captured, the number of dots cannot be specified uniquely. In this case, the CPU (not shown) inside the infrared camera 15 calculates the area of the profiles 75 on the plurality of faces thus captured, and generates the infrared camera capturing data table based on the dot patterns on the face that has a maximum area.

Therefore, even if the dice 70 come to rest at a tilt and a plurality of faces of the dice 70 is captured, the number of dots can be specified uniquely.

In addition, this data table is transmitted from the infrared camera 15 to the CPU 81, and then the CPU 81 receives it to analyze the number of dots on a die and the like.

A dot pattern data classification table is described with reference to FIG. 23.

According to this table, colors as the classification for the dice 70 are set so as to correspond to dot combinations to which the infrared absorption ink is applied, among the abovementioned dots 181 to 183 in FIG. 10. "O" indicates that the infrared absorption ink is applied to the dot, and "X" indicates that the infrared absorption ink is not applied to the dot.

For example, in a case where the infrared camera capturing data table described in FIG. 22 is transmitted to the CPU 81, the CPU 81 determines the classification of the dice 70 as "red" by comparing the infrared camera capturing data table with the dot pattern data classification table.

A number of dots-dot pattern data table is described with reference to FIG. 24.

According to this table, numbers as the number of dots on the dice 70 are set so as to correspond to dot combinations to which the infrared absorption ink is applied, among the abovementioned dots 184 to 187 in FIG. 10. "O" indicates that the infrared absorption ink is applied to the dot, and "X" indicates that the infrared absorption ink is not applied to the dot.

For example, in a case where the infrared camera capturing data table shown in FIG. 22 is transmitted from the infrared camera 15 to the CPU 81, the CPU 81 determines the number of dots on the dice 70 as "five" by comparing the infrared camera capturing data table thus received with the dot pattern data classification table.

A position, classification, and dot data table is described with reference to FIG. 25.

This table stores a position and the number of dots of the dice 70 on the playing board 3*a* for each classification of dice and further stores the position and the number of dots of the dice 70 on the playing board 3*a* for each game. It should be noted that this table is stored in the RAM 83.

Furthermore, a position and the number of dots of the dice 70 captured by the infrared camera for each game is stored by the CPU 81 in this table.

Figure 26A:
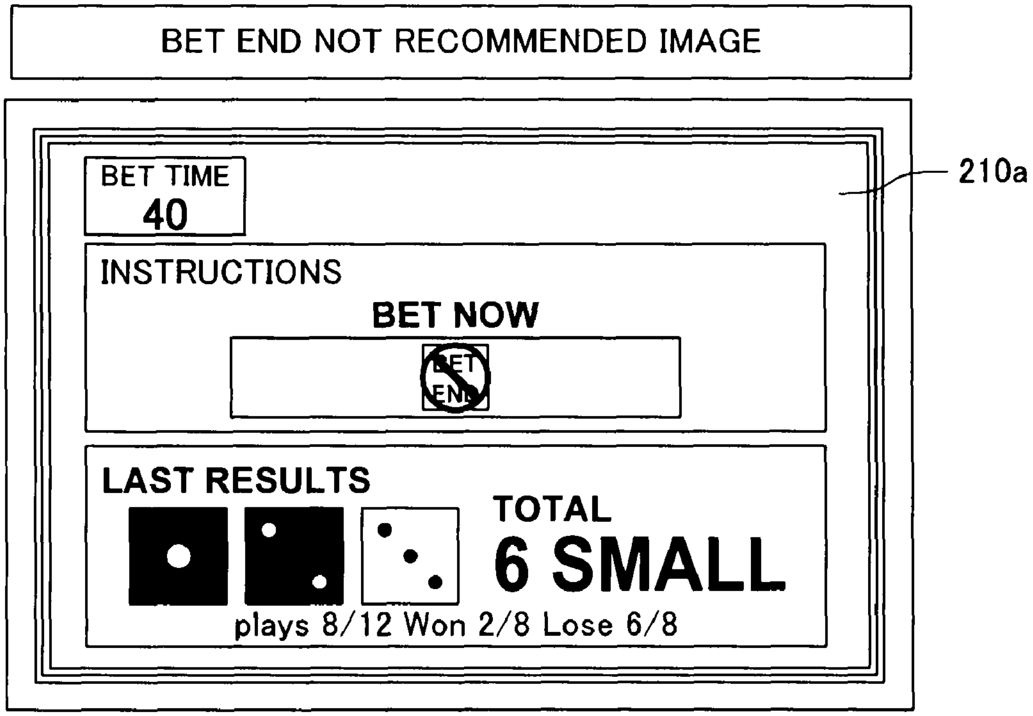
FIGS. 26 to 30 show examples of display screens according to the embodiment of the present invention.
Figure 26B:
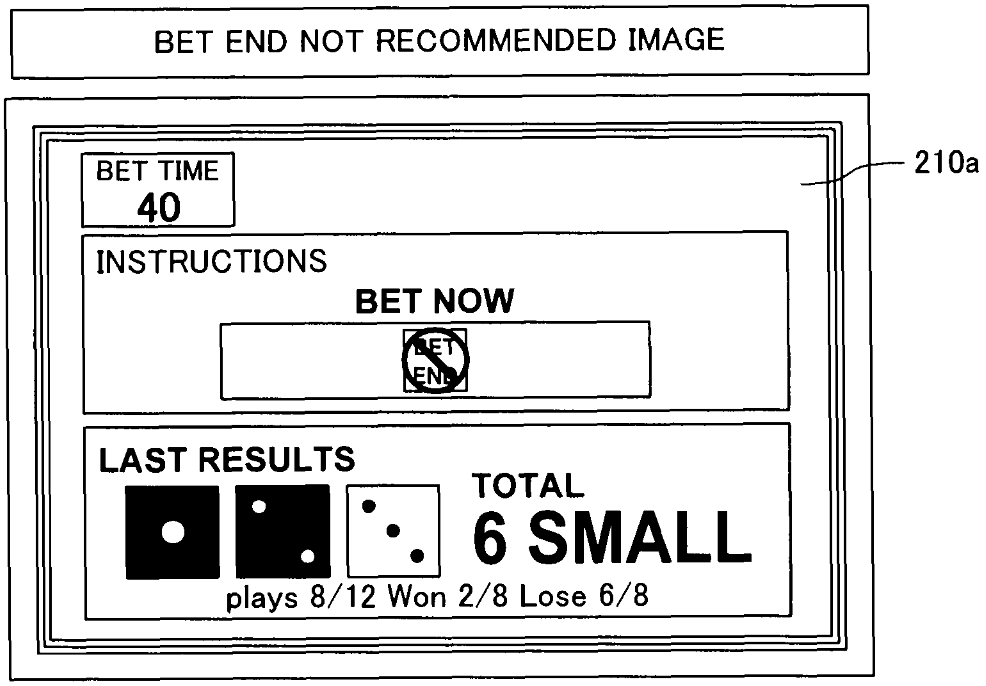
Figure 26:
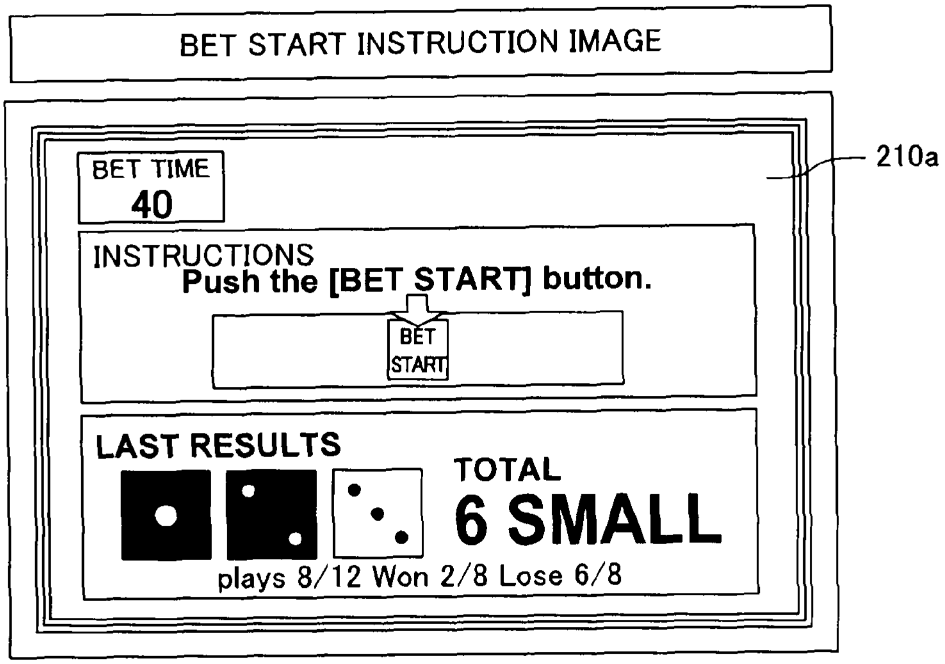

A bet start instruction image is described with reference to FIG. 26.

The bet start instruction image is displayed by the CPU 81 on the display screen 210*a* of the dealer used display 210 before the CPU 81 accepts a bet from each station 4.

This bet start instruction image instructs a dealer to touch a "bet start" button. When a touch panel 211 detects that the dealer has touched the "bet start" button, the touch panel 211 transmits a bet start instruction signal to the CPU 81 via a communication interface 95.

Figure 27:
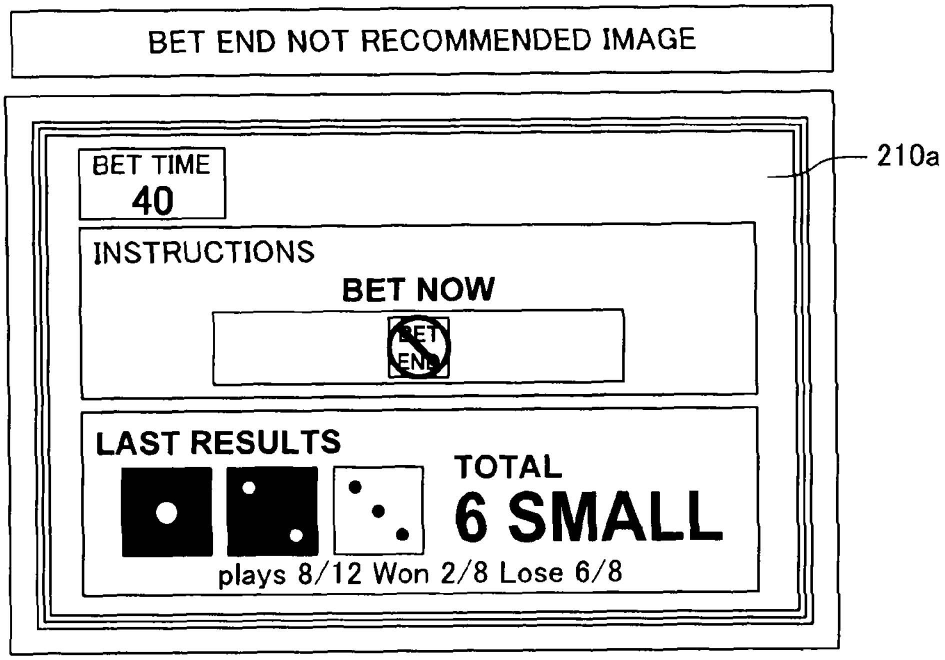

A bet end not recommended image is described with reference to FIG. 27.

This bet end not recommended image is displayed by the CPU 81 on the display screen 210*a* of the dealer used display 210 while the CPU 81 accepts a bet from each station 4.

This bet end not recommended image instructs the dealer not to touch a "bet end" button.

Figure 28:
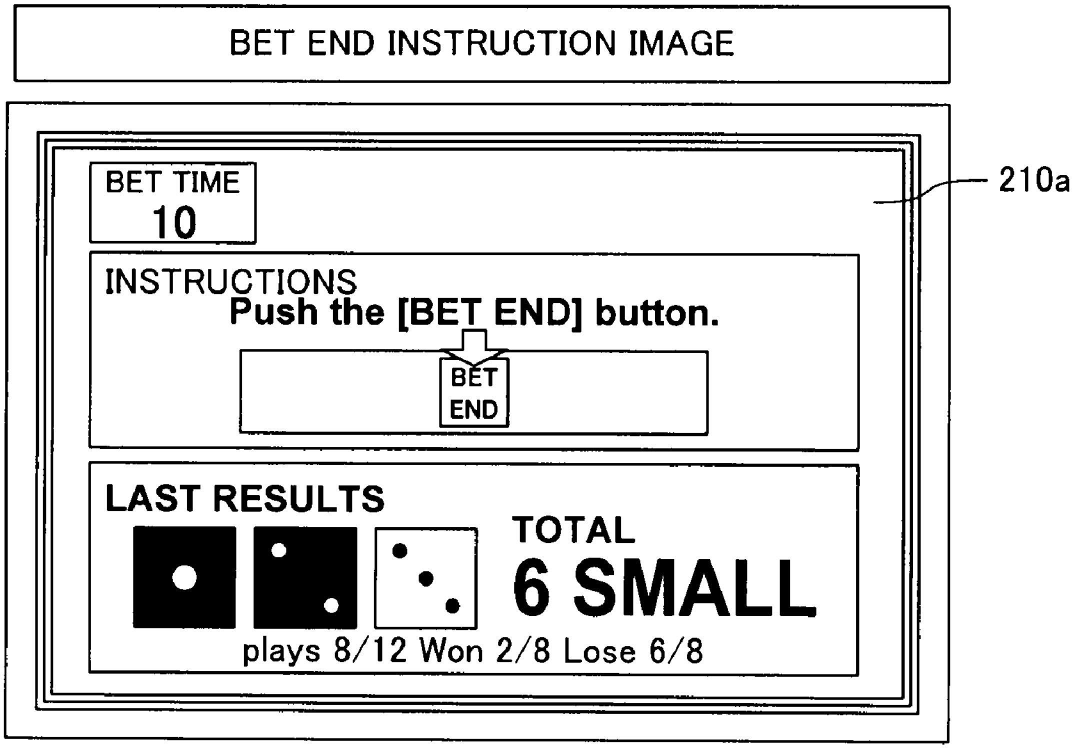

A bet end instruction image is described with reference to FIG. 28.

The bet end instruction image is displayed by the CPU 81 on the display screen 210*a* of the dealer used display 210 after elapse of a predetermined time from when the CPU 81 starts accepting a bet from each station 4.

This bet end instruction image instructs the dealer to touch the "bet end" button. When the touch panel 211 detects that the dealer has touched the "bet end" button, the touch panel 211 transmits a bet end instruction signal to the CPU 81 via the communication interface 95.

A display example on the image display unit 7 of each station 4 is described with reference to FIG. 29.

Figure 29:
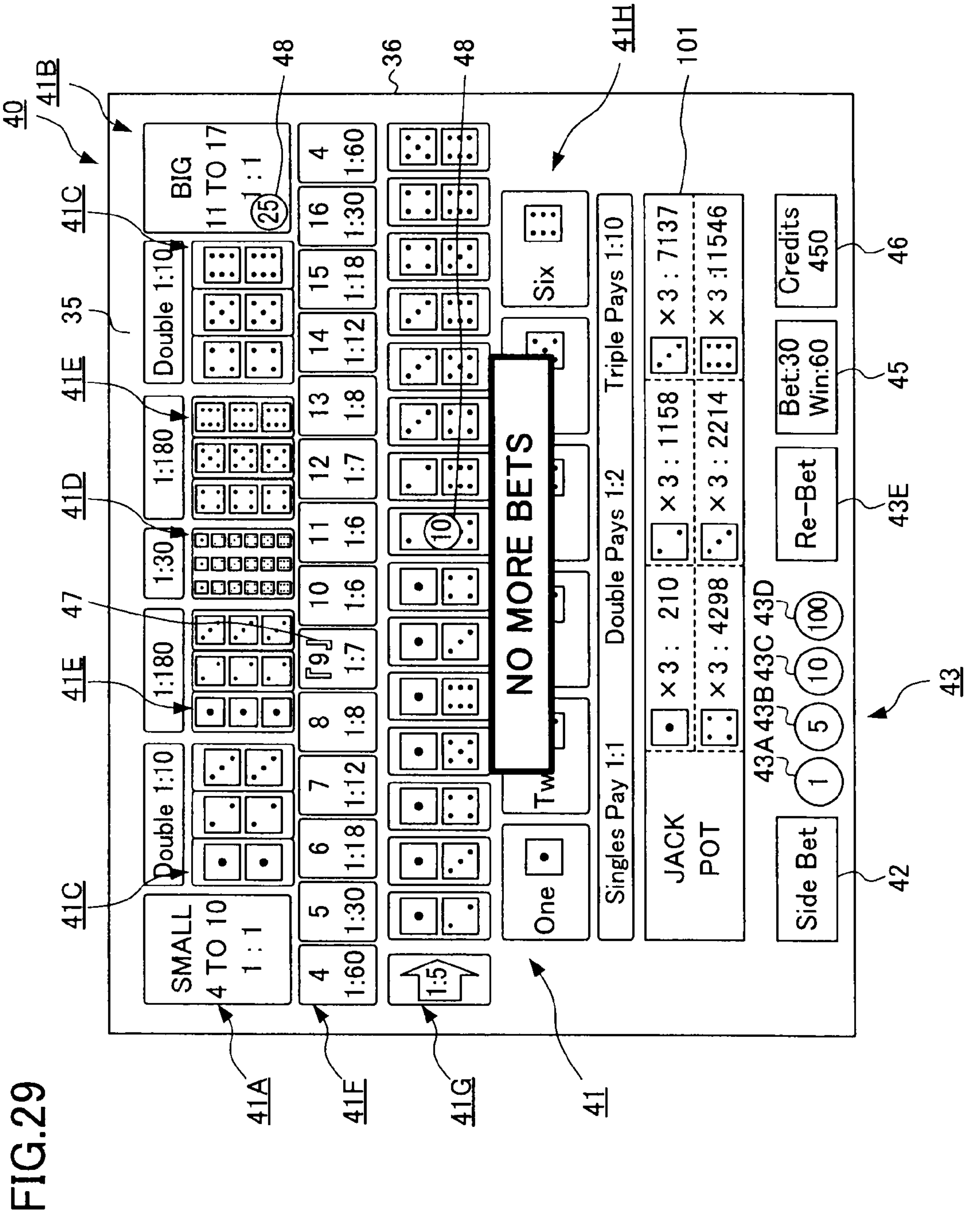

An image shown in FIG. 29 is configured to report to each station 4 that accepting of bets has ended. A player can recognize that the accepting of bets has ended by confirming that a message "NO MORE BETS" is displayed.

A display example on the image display unit 7 of each station 4 is described with reference to FIG. 30.

Figure 30:
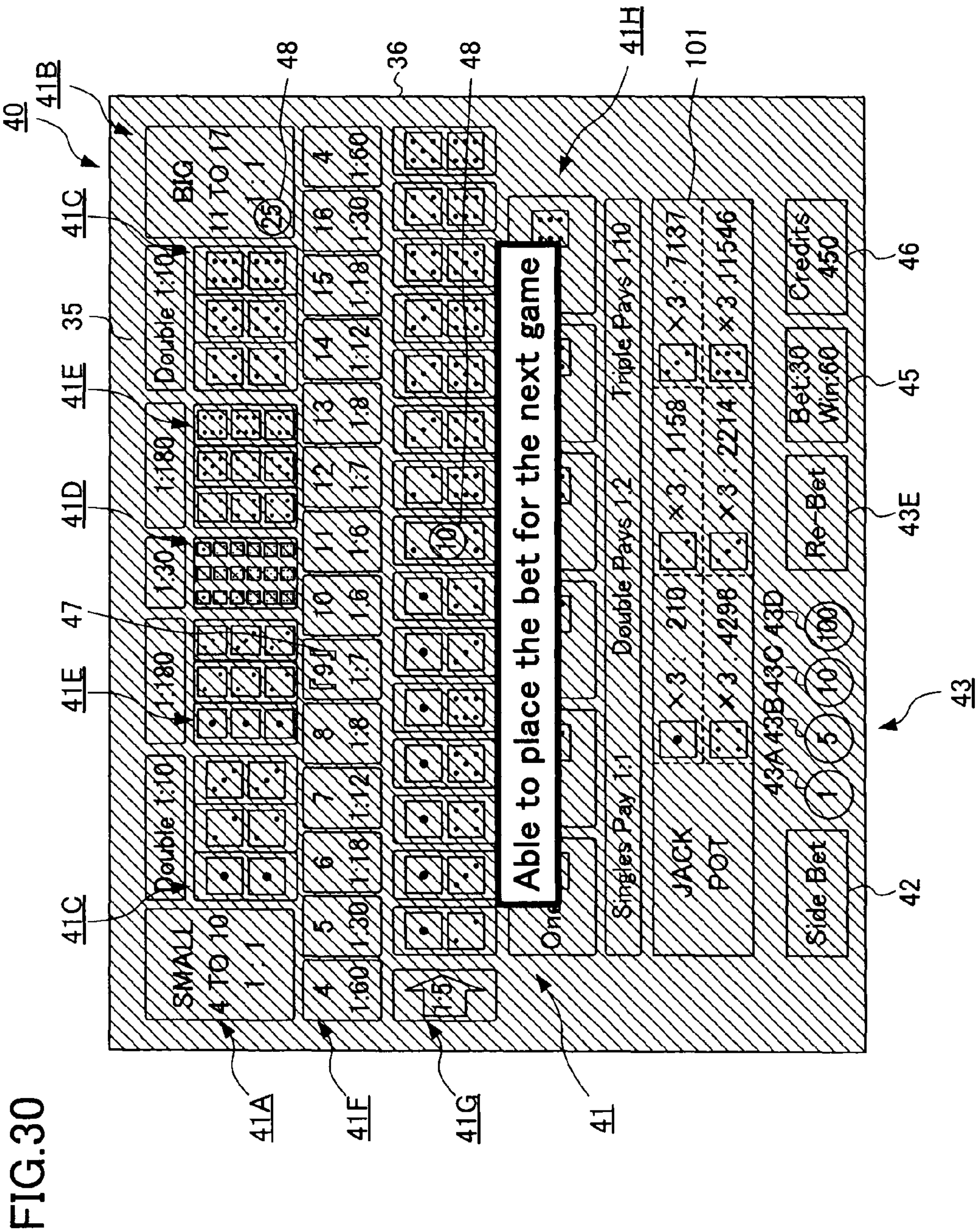

The image shown in FIG. 30 is configured to report to the station 4 in which a bet was not placed that a bet can be placed on a subsequent game. A player can recognize that a bet on the subsequent game is possible by confirming that a message "ABLE TO PLACE THE BET FOR THE NEXT GAME" is displayed.

Figure 31:
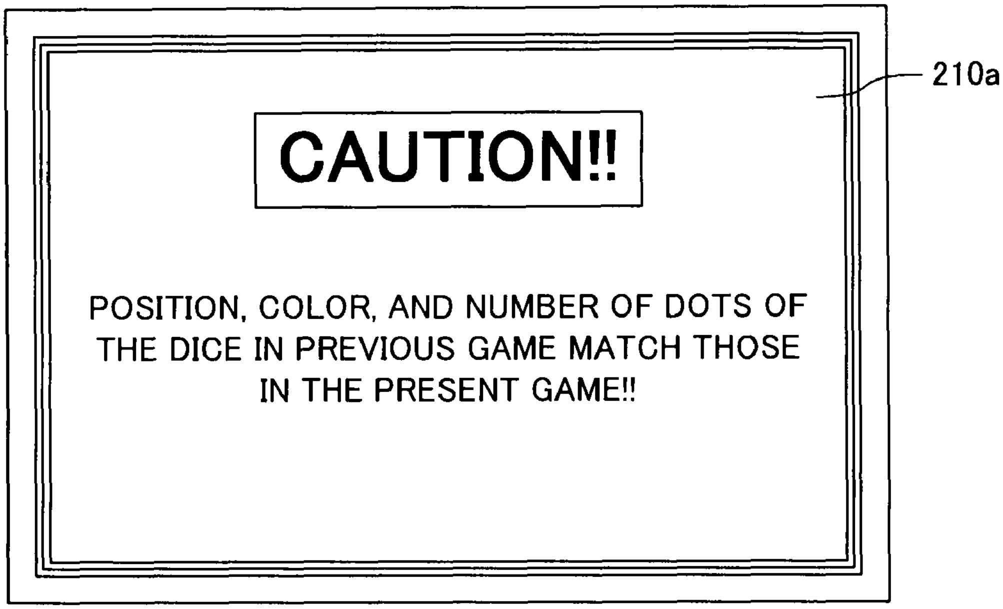
FIG. 31 shows an example of a display screen according to the embodiment of the present invention.

The image shown in FIG. 31 is displayed on the display screen 210*a* of the dealer used display in a case in which a position, classification (color), and dots of the three dice (the dice 70*a*, 70*b*, and 70*c*) in the previous game match those in the present game.

FIG. 31 shows a message "POSITION, COLOR, AND DOTS OF THE DICE IN PREVIOUS GAME MATCH THOSE IN THE PRESENT GAME!!".

Thus, since all of the three dice in the previous game are not moved at all and the numbers of dots thereof are not changed, it is understood that a device that rolls the dice (the oscillation motor 300) is broken.

Subsequently, with reference to FIGS. 32 to 36, processing performed in the main control unit of a gaming machine according to the present embodiment is described.

Figure 32:
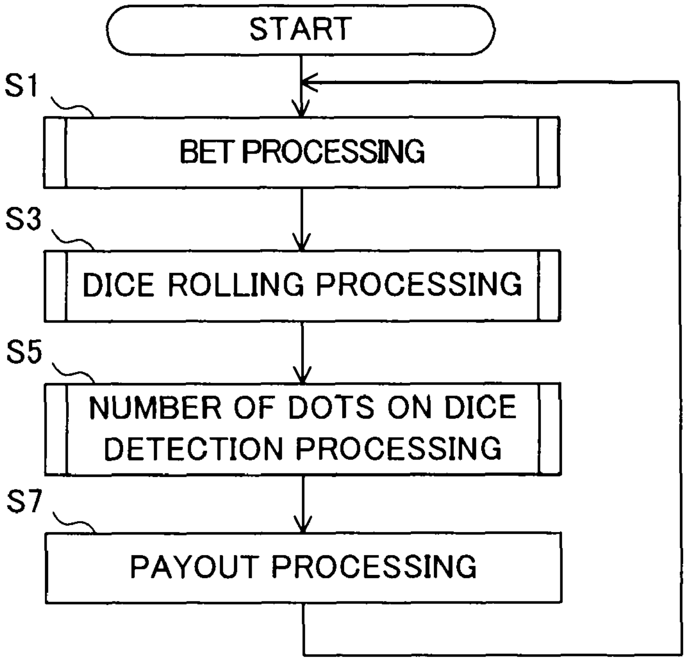
FIG. 32 is a flowchart showing dice game processing executed in a gaming machine according to the embodiment of the present invention.

FIG. 32 is a flowchart showing dice game execution processing. Initially, in Step S1, the CPU 81 executes bet processing, which is described later in FIG. 33, and in Step S3, the CPU 81 executes dice rolling processing, which is described later in FIG. 35. In Step S5, the CPU 81 executes number of dots on dice detection processing, which is described later in FIG. 36 and, in Step 7, executes payout processing corresponding to the number of dots, and then the flow returns to Step 1.

FIG. 33 is a flowchart showing bet processing.

In Step S11, the CPU 81 displays the bet start instruction image (see FIG. 25) on the display screen 210*a* of the dealer used display 210. It should be noted that, whether or not the bet start instruction image is displayed may be determined according to a dealer's level with reference to the instruction image display determination (see FIG. 17).

Thus, according to the dealer's level, it becomes possible to determine whether the bet start instruction image is displayed on the display screen 210*a* of the dealer used display 210.

In Step S13, the CPU 81 determines whether the bet start instruction signal has been received from the touch panel 211 disposed on the dealer used display 210. In the case of a NO determination, the CPU 81 returns the processing to Step S13, and in the case of a YES determination, the CPU 81 advances the processing to Step S15.

In Step S15, the CPU 81 transmits the bet start signal to each of the stations 4. When the bet start signal is received, bet placement can be performed at each station 4.

In Step S17, the CPU 106 determines whether or not a predetermined time has elapsed. More specifically, the CPU 81 starts to measure a predetermined lapse of time t by the timer 131, compares the predetermined lapse of time t with a predetermined time T1 stored in the ROM 82, and determines whether the predetermined lapse of time t measured by the timer 131 has reached the predetermined time T1. In the case of a NO determination, the CPU 81 returns the processing to Step S17, and in the case of a YES determination, the CPU 81 advances the processing to Step S19.

In Step S19, the CPU 81 displays the bet end instruction image (see FIG. 27) on the display screen 210*a* of the dealer used display 210. It should be noted that, whether or not the bet end instruction image is displayed may be determined according to a dealer's level with reference to the instruction image display determination (see FIG. 17).

In Step S21, the CPU 81 determines whether the bet end instruction signal has been received from the touch panel 211 disposed on the dealer used display 210. In the case of a NO determination, the CPU 81 returns the processing to Step S21, and in the case of a YES determination, the CPU 81 advances the processing to Step S23.

In Step S23, the CPU 81 transmits the bet end signal to each station 4. When the bet end signal is received, bet placement cannot be accepted at each station 4, and then the CPU 111 inside the station control unit 110 displays an image which reports on the image display unit 7 that an accepting of bet placement has been terminated (FIG. 28).

In Step S25, the CPU 81 receives bet information from each station 4. The bet information relates to a normal bet input and a side bet input performed at each station 4. In addition, the bet information includes information indicating whether bet placement has been performed or not which is included in the bet existence determination table (FIG. 18). Upon terminating the processing of Step S25, the CPU 81 terminates the bet processing.

With the bet processing of the present embodiment, even an inexperienced dealer can perform start operations for bet placement and end operations according to instructional images.

FIG. 34 is a flowchart showing subsequent game bet processing.

The subsequent game bet processing is started by the CPU 81 and executed parallel to the dice rolling processing in FIG. 32 when the bet processing described in FIG. 33 is terminated. Therefore, placing a bet on the subsequent game becomes possible even during the dice rolling after termination of the bet processing.

In Step S31, the CPU 81 determines whether bet placement has been performed for each station 4. More specifically, the CPU 81 distinguishes stations at which bet placement has been performed from stations at which bet placement has not been performed with reference to the bet existence determination table (FIG. 18).

In Step S33, the CPU 81 transmits a bet start signal for a subsequent game to the stations 4 at which bet placement has not been performed. When the station 4 receives the bet start signal for a subsequent game, the CPU 111 inside the station control unit 110 displays an image which reports that bet placement for a subsequent game is possible (FIG. 29) on the image display unit 7.

Thus, even during a game, a player who has not participated in the game can place a bet on a subsequent game.

In Step S35, the CPU 81 determines whether or not a predetermined time has elapsed. More specifically, the CPU 81 starts to measure a predetermined lapse of time t by the timer 131, compares the predetermined lapse of time t with a predetermined time T2 stored in the ROM 82, and determines whether the predetermined lapse of time t measured by the timer 131 has reached the predetermined time T2. In the case of a NO determination, the CPU 81 returns the processing to Step S35, and in the case of a YES determination, the CPU 81 advances the processing to Step S37.

In Step S37, the CPU 81 transmits a bet end signal to the station 4 at which the bet start signal for a subsequent game has been received. When the station 4 receives the bet end signal, the player cannot place a bet on a subsequent game, and the CPU 81 terminates acceptance of bet placement for a subsequent game. Upon terminating the process in Step S37, the CPU 81 terminates the subsequent game bet processing.

FIG. 35 is a flowchart showing dice rolling processing.

In Step S41, the CPU 81 extracts an oscillation pattern (combinations of oscillation modes) data from the ROM 82. More specifically, the CPU 81 refers to an oscillation mode data table (see FIG. 19) and extracts the oscillation pattern data at random.

In Step S43, the CPU 81 extracts a rendered effect corresponding to an oscillation mode from the ROM 82. More specifically, the CPU 81 refers to the rendered effect table (see FIG. 20) and extracts rendered effect data corresponding to an oscillation mode based on an oscillation pattern data thus extracted in Step S41.

In Step S45, the CPU 81 oscillates the playing board 3*a* and performs a rendered effect. More specifically, the CPU 81 oscillates the playing board 3*a* by controlling the oscillation motor 300 based on the oscillation pattern data thus extracted in Step S41, and performs a rendered effect with sounds and/or lights based on rendered effect data corresponding to an oscillation mode.

Thus, since a rendered effect corresponding to an oscillation mode of the playing board 3*a* is performed, games do not become monotonous and interest therein can be improved. Furthermore, since an oscillation pattern is randomly determined, games do not become monotonous and interest therein can be improved.

In Step S47, the CPU 81 ceases oscillation of the playing board 3*a*. More specifically, the CPU 81 ceases the oscillation of the playing board 3*a* by stopping the oscillation motor 300. Upon terminating the processing in Step S47, the CPU 81 terminates the dice rolling processing.

Figure 36:
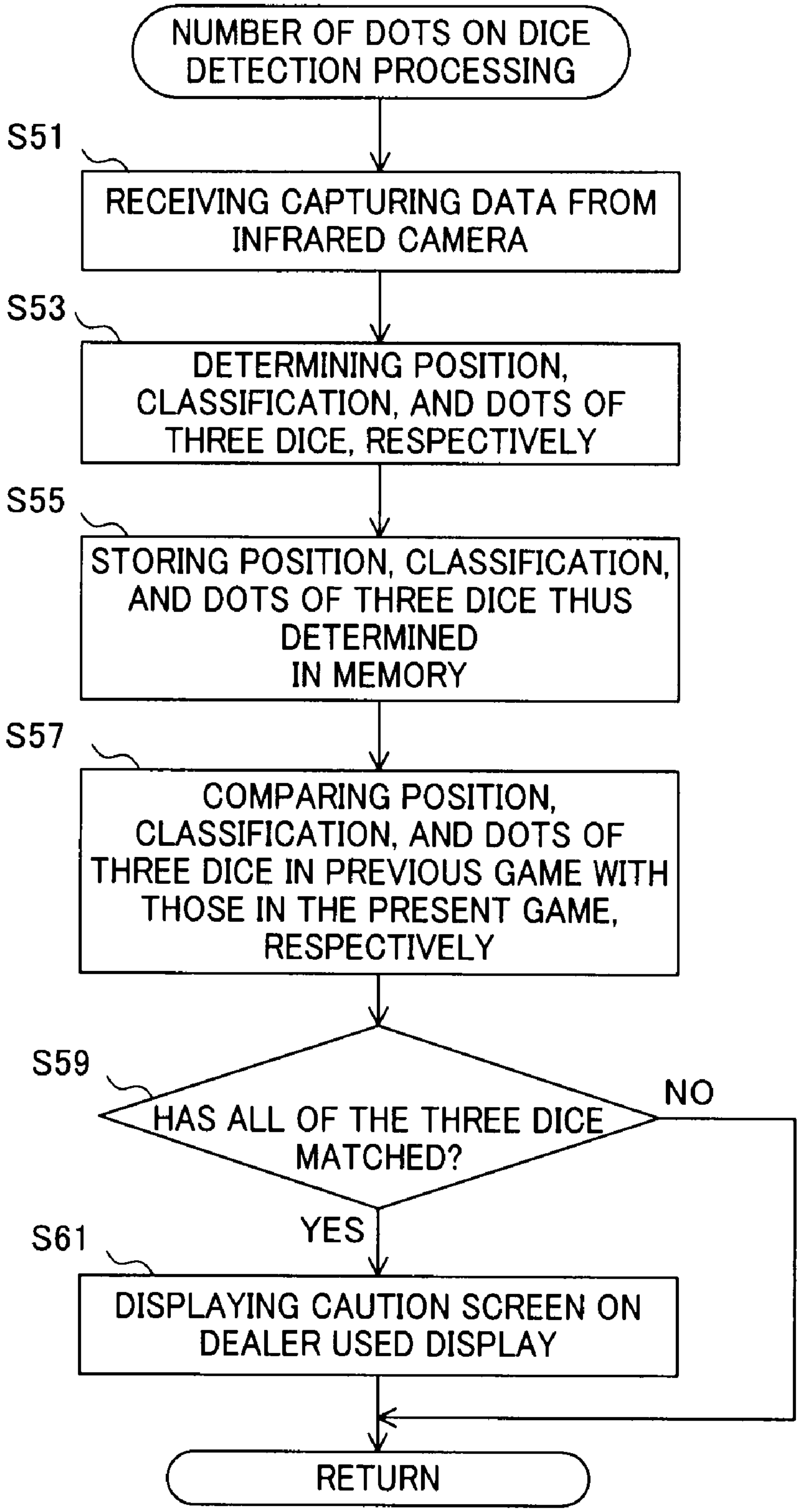
FIG. 36 is a flowchart showing dot detection processing executed in a gaming machine according to the embodiment of the present invention.

FIG. 36 is a flowchart showing number of dots on dice detection processing.

In Step S51, the CPU 81 receives capturing data from the infrared camera. More specifically, the CPU 81 receives the infrared camera capturing data table (see FIG. 22) for each of the dice 70*a*, 70*b*, and 70*c*, from the infrared camera 15.

In Step S53, the CPU 81 determines the number of dots on the three dice. More specifically, the CPU 81 determines positions of the dice on the playing board 3*a* based on the infrared camera capturing data table (see FIG. 22), determines classifications (colors) of the dice based on the infrared camera capturing data table (see FIG. 22) and the dot pattern data classification table (see FIG. 23), and determines numbers of the dice based on the infrared camera capturing data table (see FIG. 22) and the number of dots-dot pattern data table (see FIG. 24). This processing is executed for the three dice 70*a*, 70*b*, and 70*c*.

In Step S55, the CPU 81 stores the positions, classifications, and dots of all of the three dice thus determined in memory. More specifically, the CPU 81 stores the position, classification, and dots thus determined in Step S53 in the position, classification, dots data table (see FIG. 25) stored in the RAM 83.

In Step S57, the CPU 81 compares the position, classification, and dots of the three dice (the dice 70*a*, 70*b*, and 70*c*), respectively, in the previous game with those in the present game. More specifically, with reference to the position, classification, and dots data table (see FIG. 25), for example, in a case in which the present game is the hundredth game, the position, classification, and dots of all of the three dice (the dice 70*a*, 70*b*, and 70*c*) in the hundredth game is compared with those in the ninety-ninth game, respectively.

In Step S59, the CPU 81 determines whether the position, classification, and dots of all of the three dice in the previous game match those in the present game. In the case of a YES determination, the CPU 81 advances the processing to Step S61, and in the case of a NO determination, ends the number of dots on dice detection processing.

In Step S61, the CPU 81 displays a caution screen on the dealer used display. More specifically, the CPU 81 displays the image shown in FIG. 31 on the display screen 210*a*. Upon terminating the processing in Step S61, the CPU 81 terminates the number of dots detection processing.

Thus, in a case in which all of the three dice in the previous game are not moved at all and the numbers of dots thereof are not changed, it is understood that a device that rolls the dice (the oscillation motor 300, the playing board 3*a*, and the like) is broken. Therefore, a dealer can interrupt a game, which prevents a game from continuing while the device that rolls the dice is broken.

Furthermore, in Step S61, it is not limited to displaying the caution screen and the CPU 81 may perform so as to interrupt the game. Thus, in a case in which all of the three dice in the previous game are not moved at all and the numbers of dots thereof are not changed, it can prevent a game from continuing.

Descriptions regarding the present embodiment have been provided above. Although a case has been described in which the number of dice 70 is three according to the present embodiment, the number of in the present invention is not limited to three and, for example, the number of the dice may be five. In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can modified appropriately. Moreover, it should be understood that the advantages described in association with the embodiments are merely a listing of most preferred advantages, and that the advantages of the present invention are by no means restricted to those described in connection with the embodiments.

Embodiments of the present invention will be described below with reference to the accompanying drawings.

Figure 1A:
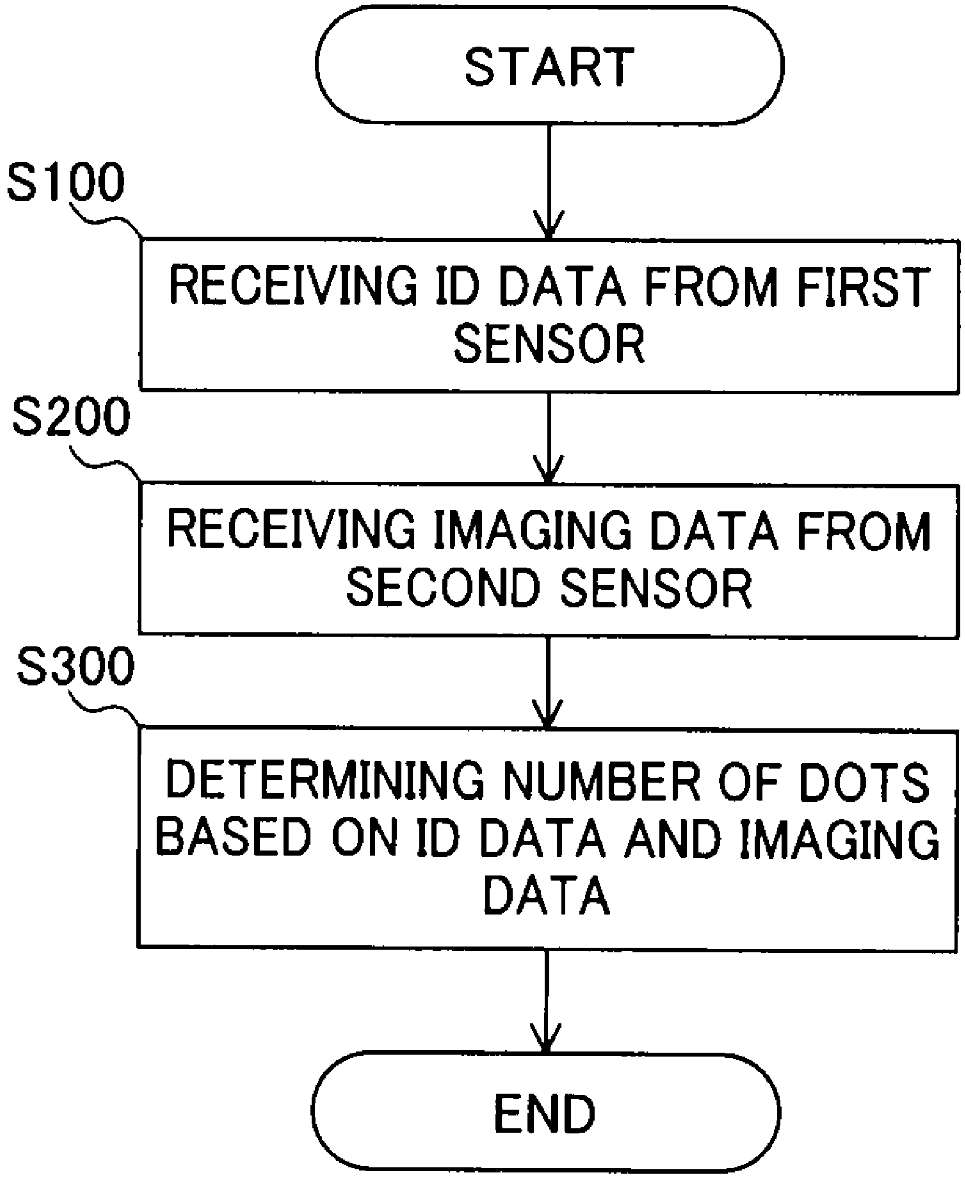
FIG. 1A is a flowchart schematically showing a processing sequence of a gaming machine according to an embodiment of the present invention.

Although described in detail later, as shown in FIG. 1A, the CPU 81 receives identification data from an IC tag reader 16 (Step S100), receives imaging data from an infrared camera 15 (Step S200), and determines the number of dots appearing on dice based on the identification data and the imaging data thus received (Step S300).

Figure 2A:
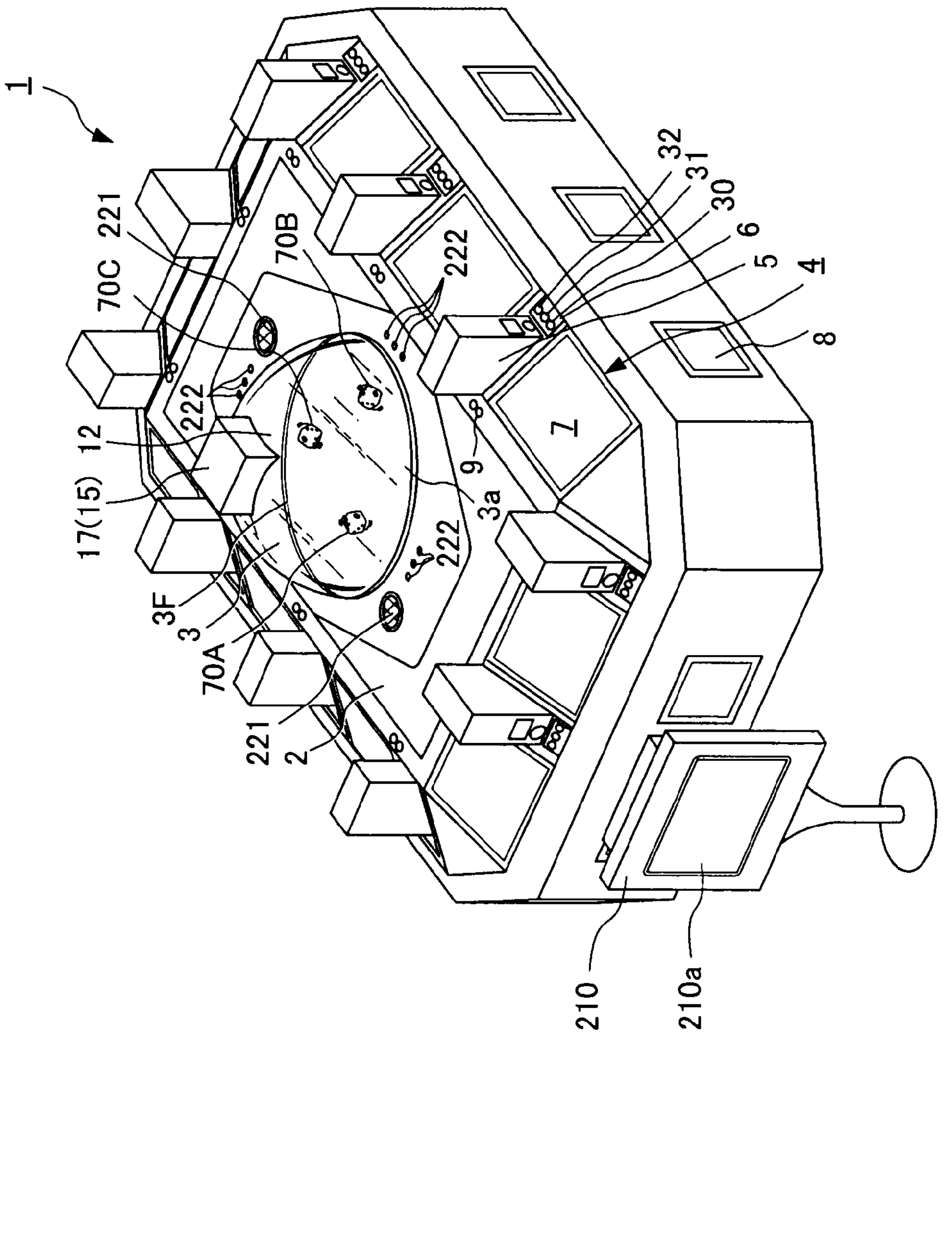
FIG. 2A is a perspective view of a gaming machine according to the embodiment of the present invention.
Figure 3A:
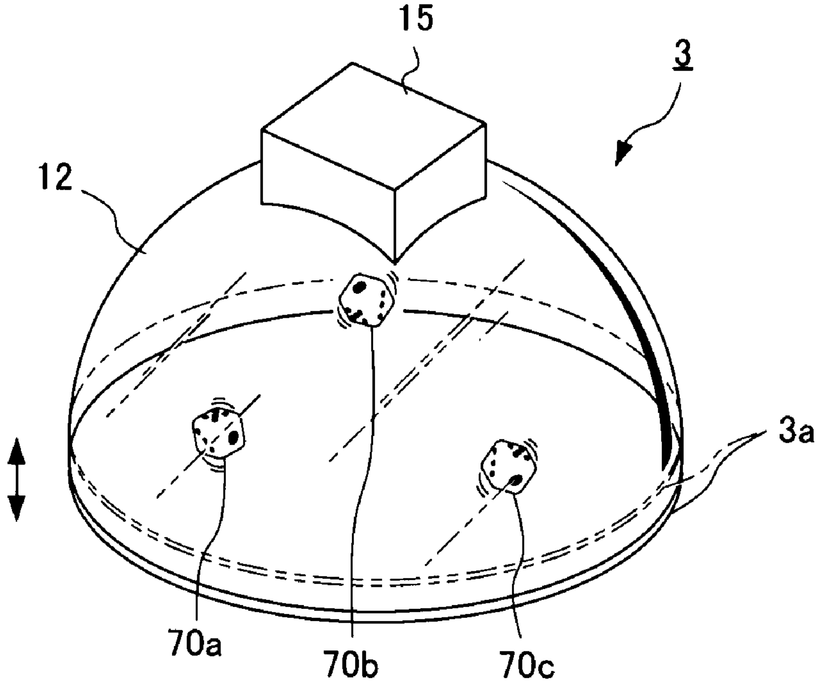
FIG. 3A is an enlarged view of a playing unit of the gaming machine shown in FIG. 2A.

FIG. 2A is a perspective view schematically showing an example of a gaming machine according to the embodiment of this invention. FIG. 3A is an enlarged view of a playing unit of the gaming machine shown in FIG. 2A. As shown in FIG. 2A, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the top face of the housing 2 and in which a plurality of dice 70 are rolled and stopped, and a plurality of stations 4 (ten in this embodiment) disposed so as to surround the playing unit 3.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70*a*, 70*b*, and 70*c*) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

The playing unit 3 includes a playing board 3*a*, which is formed to be a circular shape, to roll and then stop the dice 70. An IC tag reader 16, which is described later in FIGS. 6A to 9A, are provided below the playing board 3*a*.

Since the playing board 3*a* is formed to be substantially planar, as shown in FIG. 3A, the dice 70 are rolled by oscillating the playing board 3*a* substantially in the vertical direction with respect to the horizontal direction of the playing board 3*a*. Then, the dice 70 are stopped after the oscillation of the playing board 3*a* ceases. The playing board 3*a* is oscillated by a CPU 81 (described later) driving an oscillating motor 300.

Furthermore, as shown in FIG. 3A, the playing unit 3 is covered with a cover member 12 of which the entire upper area is made of a transparent acrylic material formed in a hemispherical shape, and regulates the rolling area of the dice 70. In the present embodiment, an infrared camera 15 is provided at the top of the cover member 12 to detect numbers of dots and the like (such as positions of the dice 70 on the playing board 3*a*, types of the dice 70, and numbers of dots of the dice 70) of the dice 70. Furthermore, the cover member 12 is covered with a special film (not shown) which blocks infrared radiation. In this way when the numbers of dots of the dice 70 on which an infrared absorption ink has been applied is detected with the infrared camera 15, false detection can be prevented that arises, for example, in a case where a blink rate of a light irradiated from a circumference of the playing unit 3 is fast.

Figure 4A:
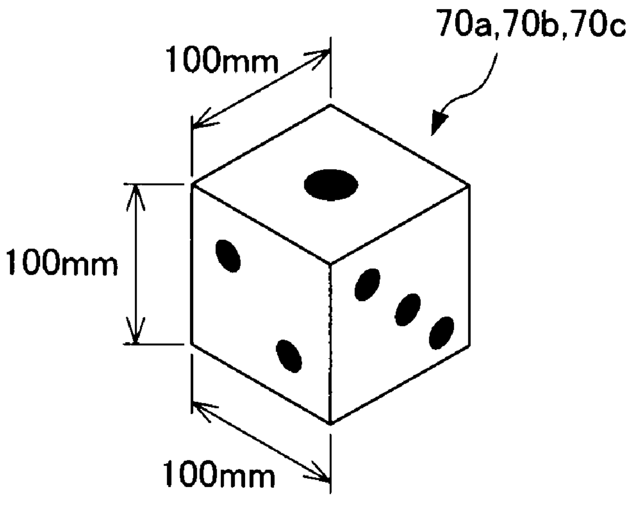
FIG. 4A is an external perspective view of a die according to the embodiment of the present invention.

FIG. 4A is an external perspective view of a die 70. As shown in FIG. 4A, the die 70 is a cube of which the length of a side is 100 mm.

Figure 5A:
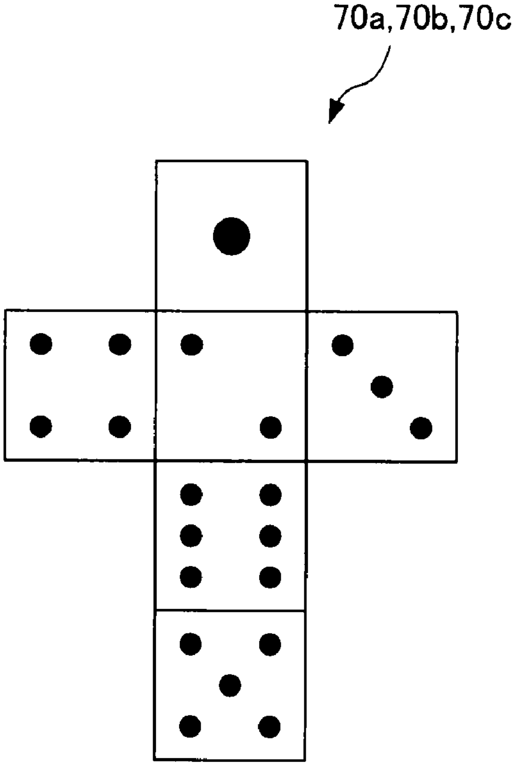
FIG. 5A is a development view of a die according to the embodiment of the present invention.

FIG. 5A is a development view of the die 70. As shown in FIG. 5A, the combinations of two faces opposing each other are "1 and 6", "2 and 5", and "3 and 4".

FIGS. 6A to 9A show IC tag readable areas by an IC tag reader 16 disposed below the playing board 3*a*.

Here, a way of reading information stored in the IC tag by the IC tag reader 16 is described below.

The IC tag reader 16 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 16. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader. In addition, reading the IC tags may not only be done by the non-contact type, but also a contact type. In addition, the IC tag reader is not limited thereto, and anything that is appropriately designed with the object of being read may be employed.

In the present embodiment, a readable area of the IC tag reader 16 is 10 mm in substantially a vertical direction from substantially an entire horizontal face on the playing board 3*a*.

Figure 6A:
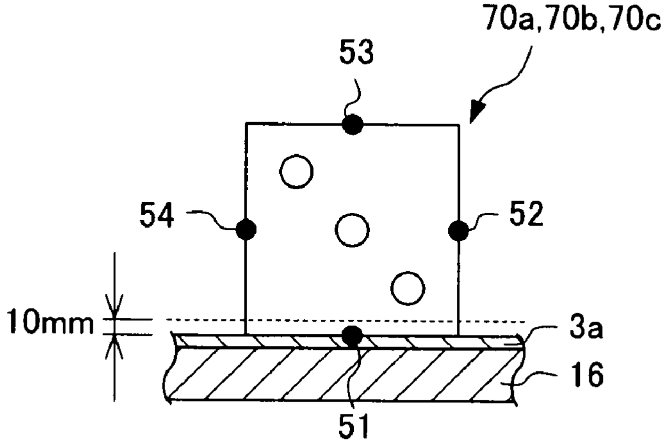

With reference to FIG. 6A, a face of the die 70 (for example, a face of which the number of dots is six) is in contact with the playing board 3*a*. Furthermore, the IC tag is embedded substantially at the center of each face of the die 70 (the IC tags for the faces on which the numbers of dots are "3" and "4" are not shown). An IC tag 51 is embedded substantially at the center of a face on which the number of dots is six. An IC tag 52 is embedded substantially at the center of a face on which the number of dots are five. An IC tag 53 is embedded substantially at the center of a face on which the number of dots is one. An IC tag 54 is embedded substantially at the center of a face on which the number of dots is two.

Here, only the IC tag 51 exists in the readable area of the IC tag reader 16. Therefore, the number of dots (in this case, "one") of a face, opposing the face on which the IC tag 51 is embedded, is determined as the number of dots of the die 70.

Furthermore, since the number of dots of a face, opposing a face on which an IC tag is embedded, is determined as the number of dots of the die 70, "one" is stored, as data of the number of dots, in the IC tag 51 on the face of which the number of dots is "six". "Two" is stored, as data of the number of dots, in the IC tag 52 on the face of which the number of dots is "five". "Six" is stored, as data of the number of dots, in the IC tag 53 on the face of which the number of dots is "one". "Five" is stored, as data of the number of dots, in the IC tag 54 on the face of which the number of dots is "two". "Three" is stored, as data of the number of dots, in the IC tag (not shown) on the face of which the number of dots is "four". Finally, "four" is stored, as data of the number of dots, in the IC tag (not shown) on the face of which the number of dots is "three".

Furthermore, as described above, since a side of the die 70 is 10 mm, it is not physically possible for an IC tag reader 16 to detect more than one IC tag with respect to one die.

Figure 7A:
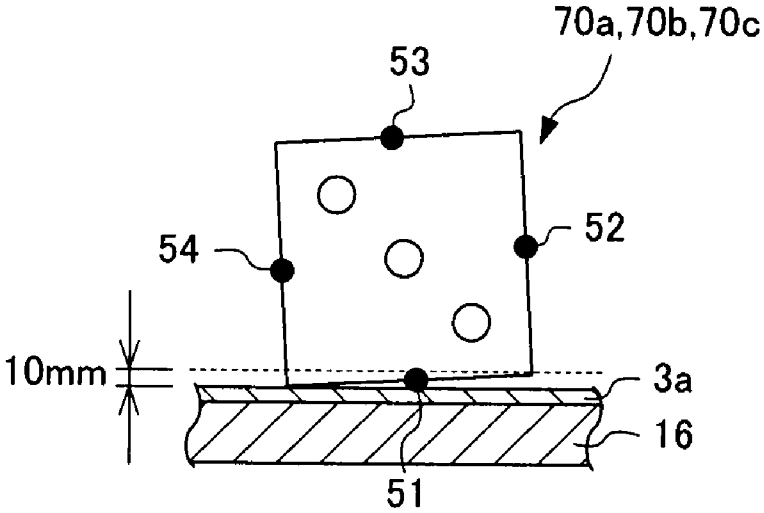

With reference to FIG. 7A, a die 70 is inclined. However, since the IC tag 51 still exists in the readable area of the IC tag reader 16, the number of dots of the die 70 is determined as "one".

Figure 8A:
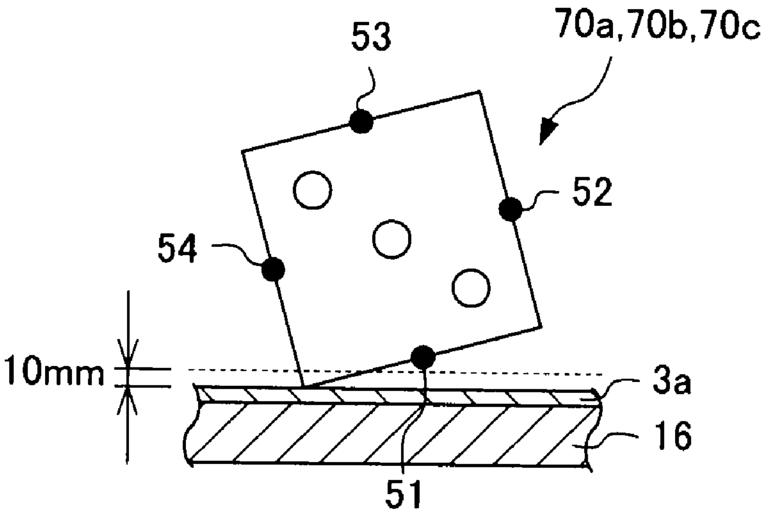

With respect to FIG. 8A, the die 70 is inclined at a greater angle than the case shown in FIG. 7A. Then, since there is no IC tag which exists in the readable area of the IC tag reader 16, the IC tag reader 16 cannot detect the number of dots of the die 70.

Figure 9A:
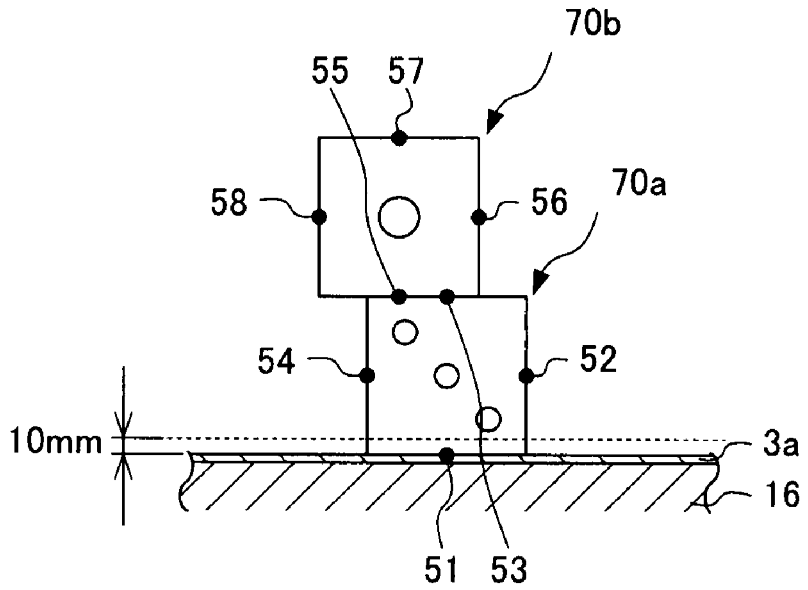

With reference to FIG. 9A, the die 70*b* is superimposed on the die 70*a*. In this case, neither of the IC tags 55, 56, 57, and 58, which are embedded in the die 70*b*, exists in the readable area of the IC tag reader 16. Therefore, in this case, the IC tag reader 16 cannot detect the number of dots of the die 70*b*.

Figure 10A:
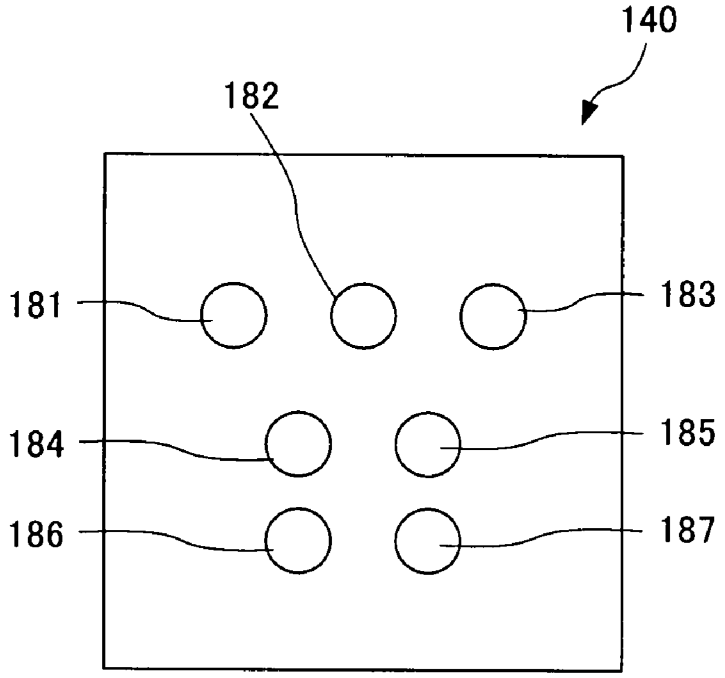
FIG. 10A shows a sheet attached to each face of a die according the embodiment of the present invention.

FIG. 10A shows a sheet 140 attached to each face of the die 70.

As shown in FIG. 10A, on each face of the die 70, the sheet 140, to which infrared absorption ink is applied to identify the number of dots and the type of the die 70, is provided so as to be covered by a sheet on which the number of dots is printed. According to FIG. 10A, the infrared absorption ink can be applied to dots 181, 182, 183, 184, 185, 186, and 187.

The number of dots of the die 70 can be identified by a combination of the dots to which the infrared absorption ink is applied among the dots 184, 185, 186, and 187. In addition, the type of the die 70 can be identified by a combination of the dots to which the infrared absorption ink is applied among the dots 181, 182, and 183.

Figure 11A:
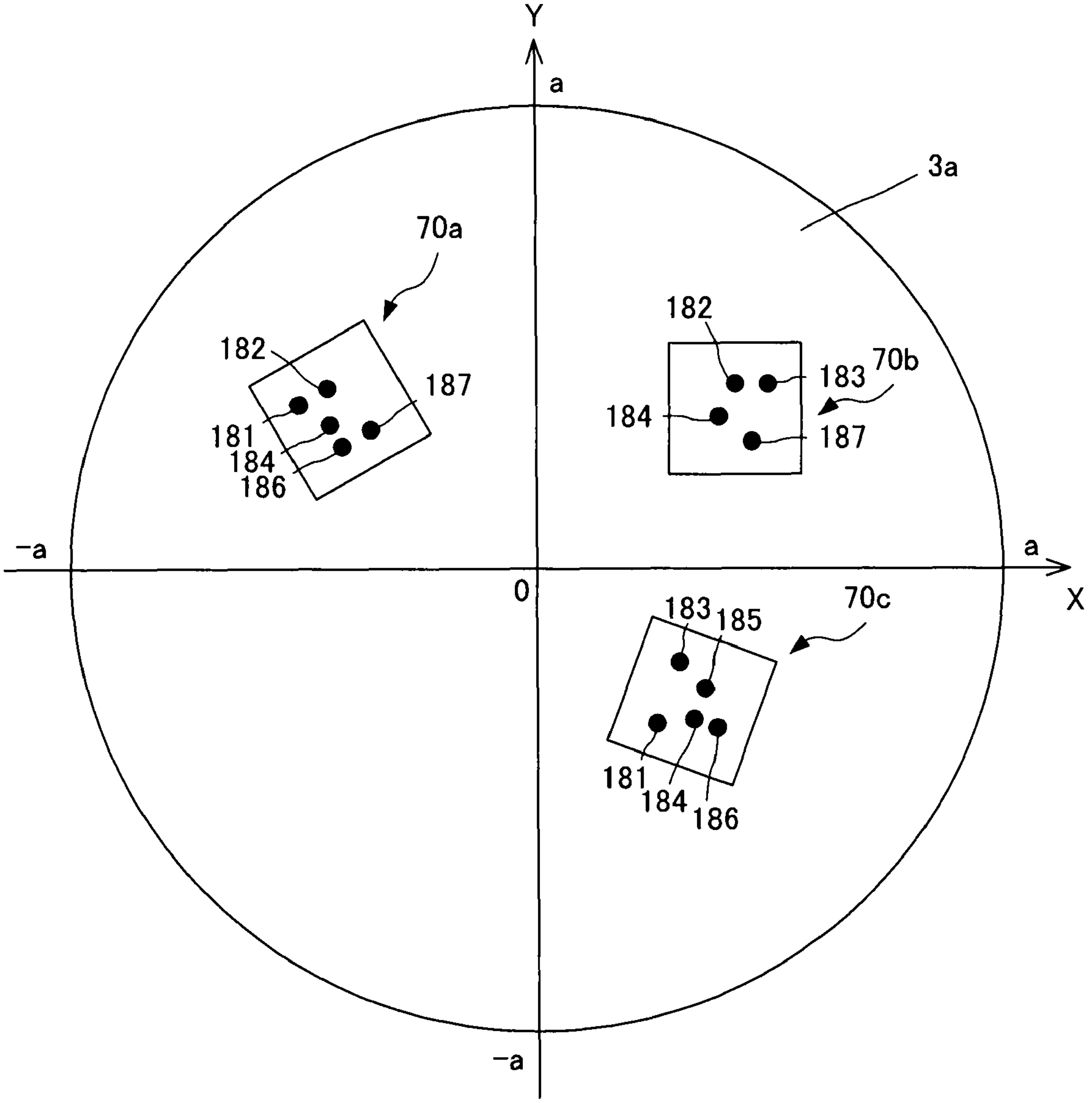
FIG. 11A is an image showing a state in which a die according to the embodiment of the present invention is captured substantially in the vertically upward direction by an infrared camera.

FIG. 11A shows an image in which the dice 70, which comes to rest on the playing board 3*a*, are captured substantially in the vertically upward direction using an infrared camera 15.

With reference to FIG. 11A, dots to which the infrared absorption ink is applied on each of the dice 70*a*, 70*b*, and 70*c* are captured in black. The type and the number of dots for each of the dice 70*a*, 70*b*, and 70*c* are determined based on a combination of the dots to which the ink is applied. In addition, the playing board 3*a* is formed in a disc shape having a radius a, and each position of the dice 70*a*, 70*b*, and 70*c* is detected as an x component and y component on an x-y coordinate.

Figure 12A:
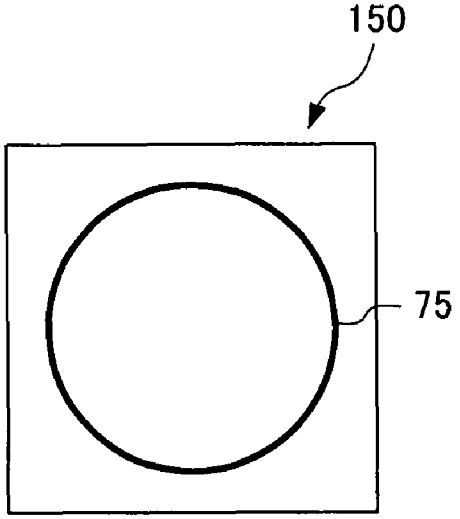
FIG. 12A shows a sheet attached to each face of a die according the embodiment of the present invention.

FIG. 12A shows a sheet 150 which is attached to each face of the dice 70.

As shown in FIG. 12A, a circular profile 75 having a certain area on each face of the dice 70 in common is depicted by way of applying the infrared absorption ink on each face of the dice 70. The sheet 150 on which the circular profile 75 is depicted is provided so as to be covered by the above-mentioned sheet 140.

Figure 13A:
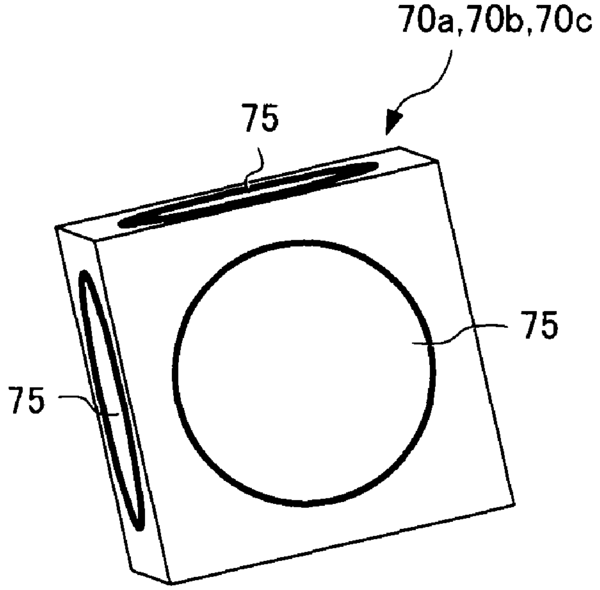
FIG. 13A shows an image in which a die according to the embodiment of the present invention that has come to rest at a tilt on a playing board, is captured substantially in the vertically upward direction by an infrared camera.

FIG. 13A shows an image in which the die 70, which comes to rest at a tilt on a playing board 3*a*, is captured substantially in the vertically upward direction using the infrared camera 15.

With reference to FIG. 13A, three faces of the die 70 are captured. Therefore, it is necessary to distinguish the number of dots of which face is correct. Consequently, the number of dots having the largest area among the three faces is determined as the face that should be read. In a case of this distinction, the CPU (not shown) in the infrared camera 15 calculates the areas of the circular profiles 75 thus captured, and distinguishes the number of dots of the face on which the circular profile 75 having the largest area among the areas thus calculated is printed as the correct number of dots.

Figure 14A:
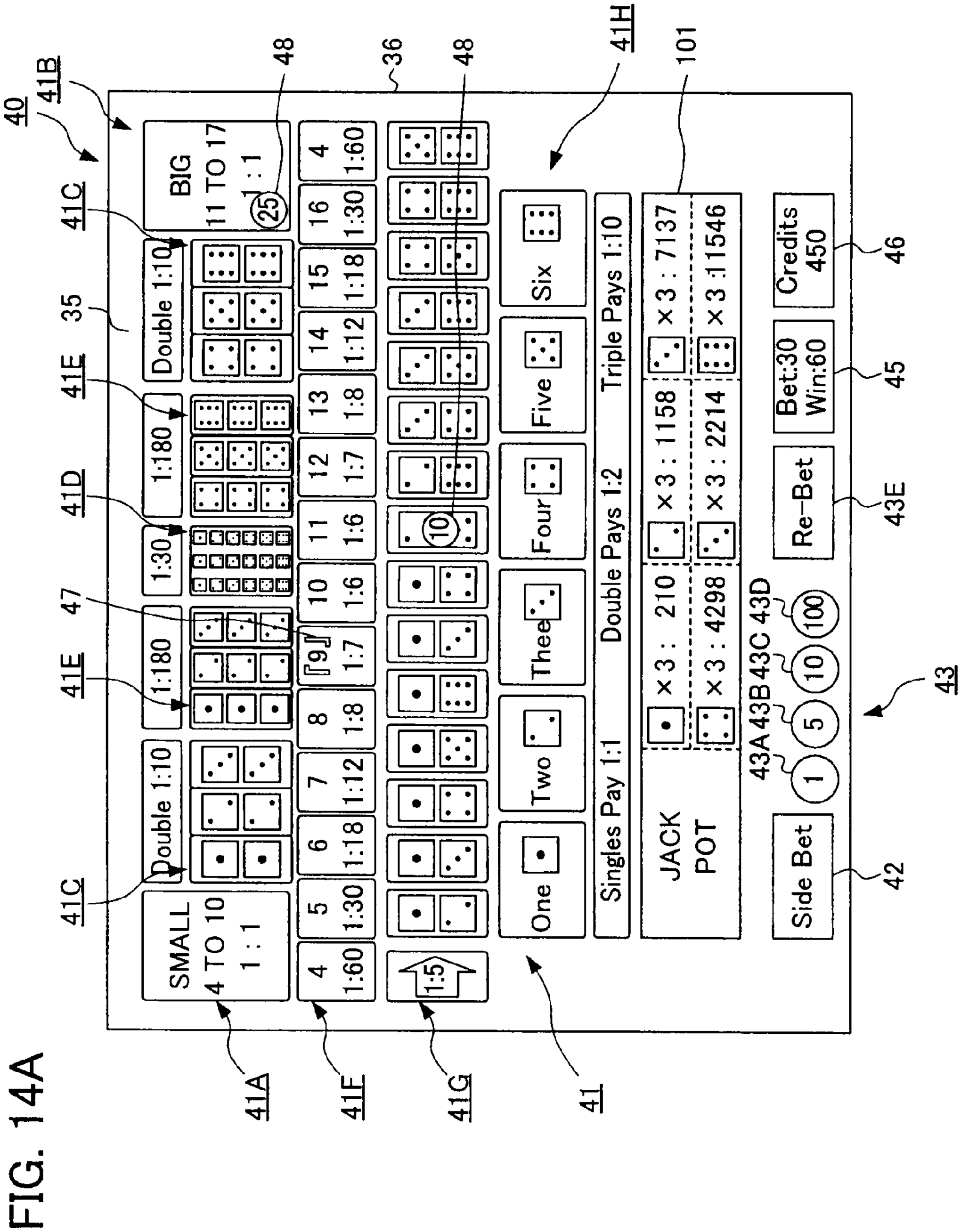
FIG. 14A shows an example of a display screen according to the embodiment of the present invention.

FIG. 14A shows an example of a display screen displayed on an image display unit. As shown in FIG. 14A, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1 bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300, . . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots to appear on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots to appear commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots to appear on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots to appear on the two dice selected from the three, and the odds are set to 1:5.

The normal bet area 41H is a region where the player places a bet on the number of dots to appear on the dice 70, and the odds are set according to the number of dots of the dice 70 matching the predicted number of dots.

Figure 15A:
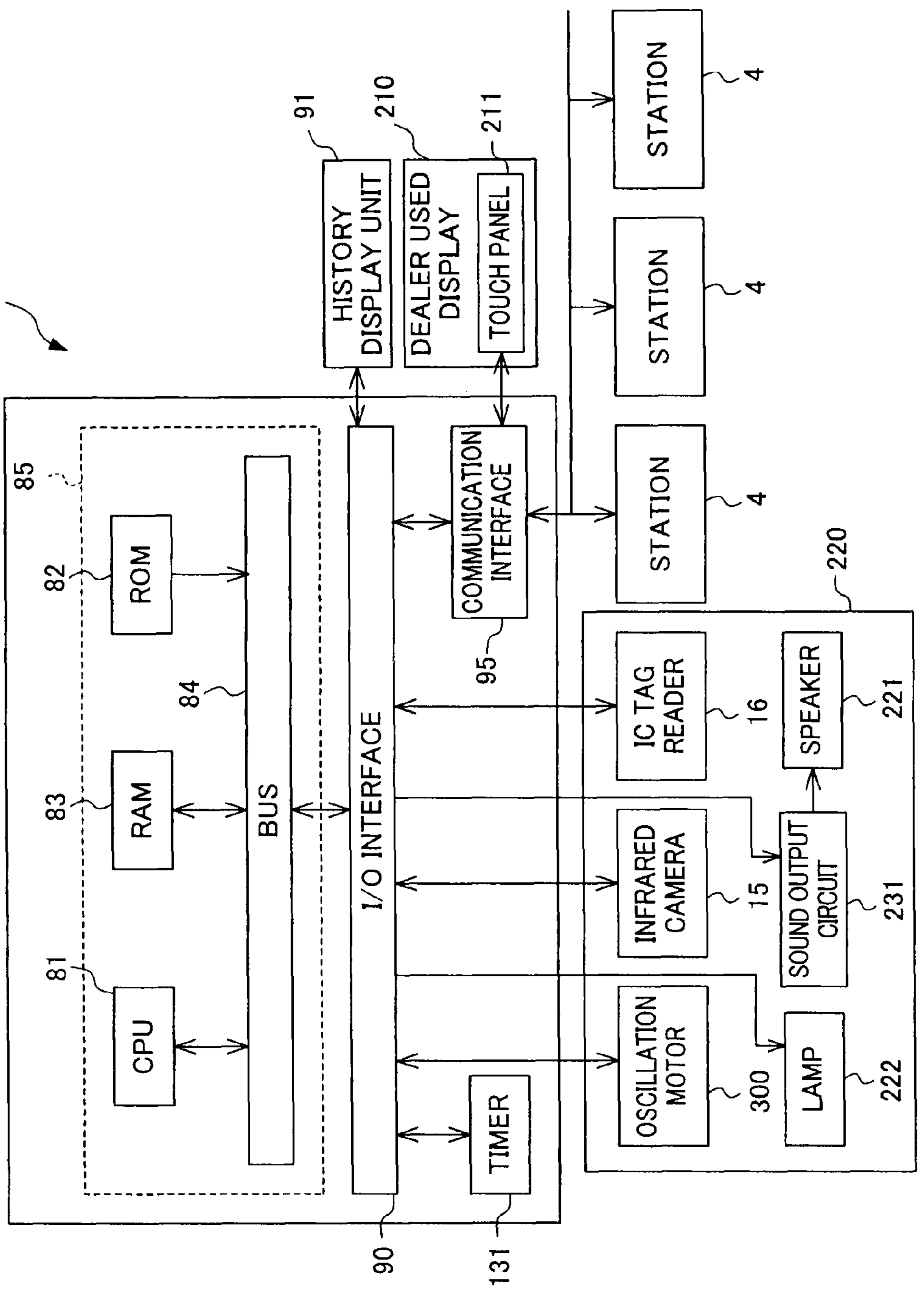
FIG. 15A is a block diagram showing the internal configuration of the gaming machine shown in FIG. 2A.

FIG. 15A is a block diagram showing the internal configuration of the gaming machine shown in FIG. 2A. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an I/O interface 90. Furthermore, the CPU 81 is connected with a timer 131, which can measure time via the I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the IC tag reader 16, thereby transmitting and receiving information in relation to the number of dots of the three dice 70, which comes to rest on the playing board 3*a*, between the infrared camera 15 and/or the IC tag reader 16.

Here, the oscillating motor 300, the infrared camera 15, the IC tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, payout information, and the like to and from each station 4, as well as data such as bet start instruction images, bet start instruction signals, and the like to and from the dealer used display 210.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the infrared camera 15 and/or the IC tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed.

The CPU 81 controls the oscillating motor 300, which oscillates the playing unit 3, based on data and a program stored in the ROM 82 and the RAM 83, and oscillates the playing board 3*a* of the playing unit 3. Furthermore, after oscillation of the playing board 3*a* ceases, a control processing associated with game progression, such as confirmation processing for confirming the number of dots on each of the dice 70 resting on the playing board 3*a*.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 16A:
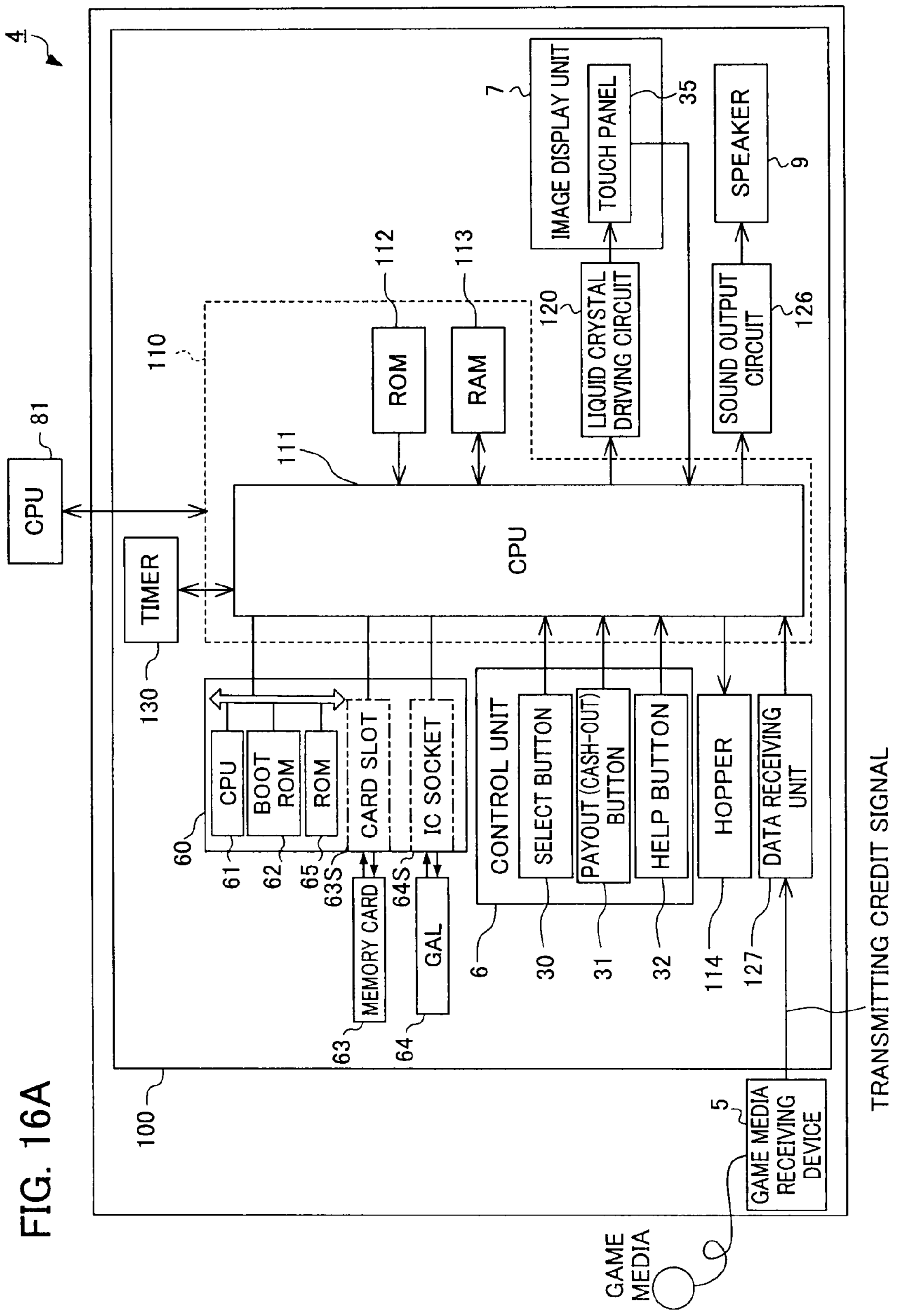
FIG. 16A is a block diagram showing the internal configuration of the station shown in FIG. 2A.

FIG. 16A is a block diagram showing the internal configuration of the station shown in FIG. 2A. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots to appear on the dice, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like. More specifically, selection of the normal bet area 41 and the side bet area 42 in the bet screen 40, manipulation of the bet button unit 43 and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

An instruction image display determination table is described with reference to FIG. 17A.

Figure 31A:
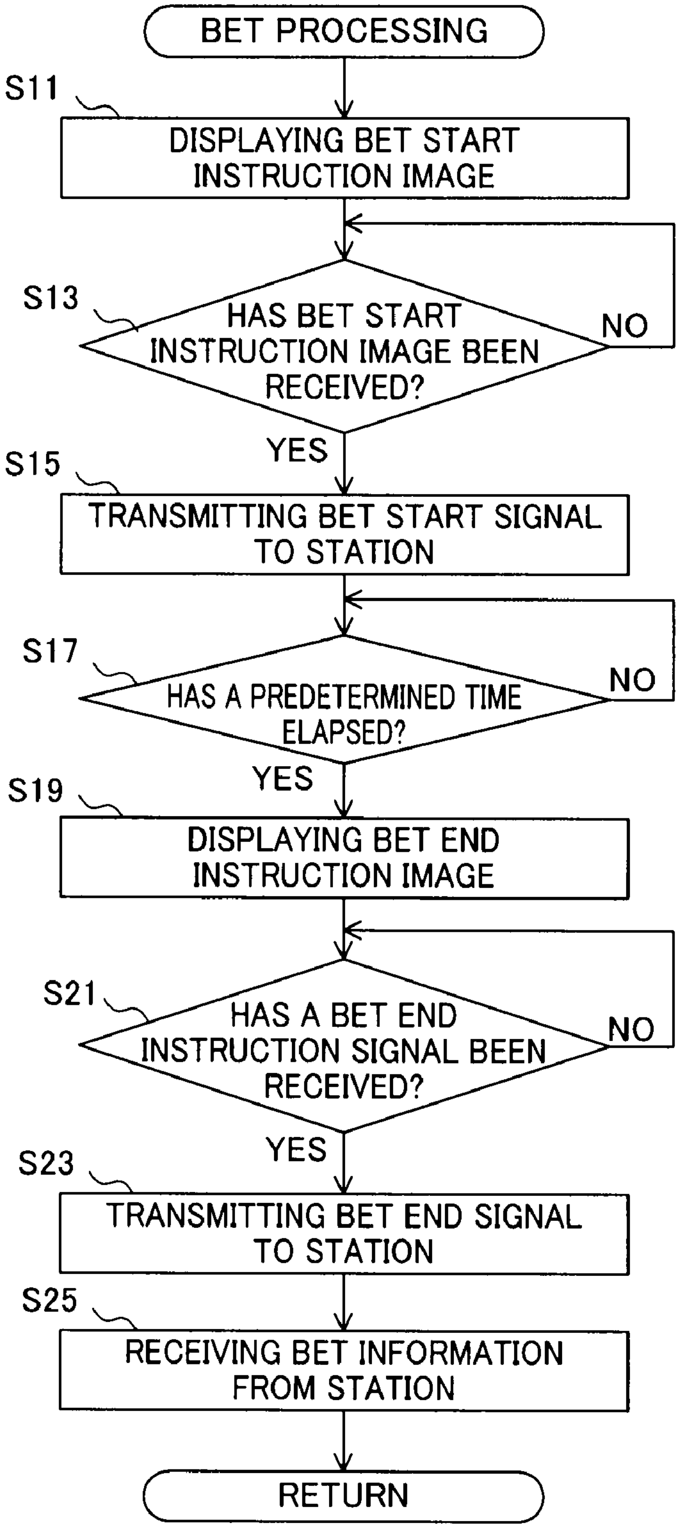
FIG. 31A is a flowchart showing bet processing executed in a gaming machine according to the embodiment of the present invention.

In Steps S11 and S19 of FIG. 31A, the instruction image display determination table is referred to by the CPU 81 upon determining whether a bet start instruction image or a bet end instruction image is displayed on the display screen 210*a* of the dealer used display 210.

According to this table, "X" is data for indicating that the bet start instruction image and the like is not displayed on the display screen 210*a*, and "O" is data for indicating that the bet start instruction image and the like is displayed on the display screen 210*a*. For example, in a case in which a dealer belongs to an intermediate level, the bet start instruction image is not displayed on the display screen 210*a*, but the bet end instruction image is displayed on the display screen 210*a*. In addition, this table is stored in the ROM 82.

The bet existence determination table is described with reference to FIG. 18A.

Figure 32A:
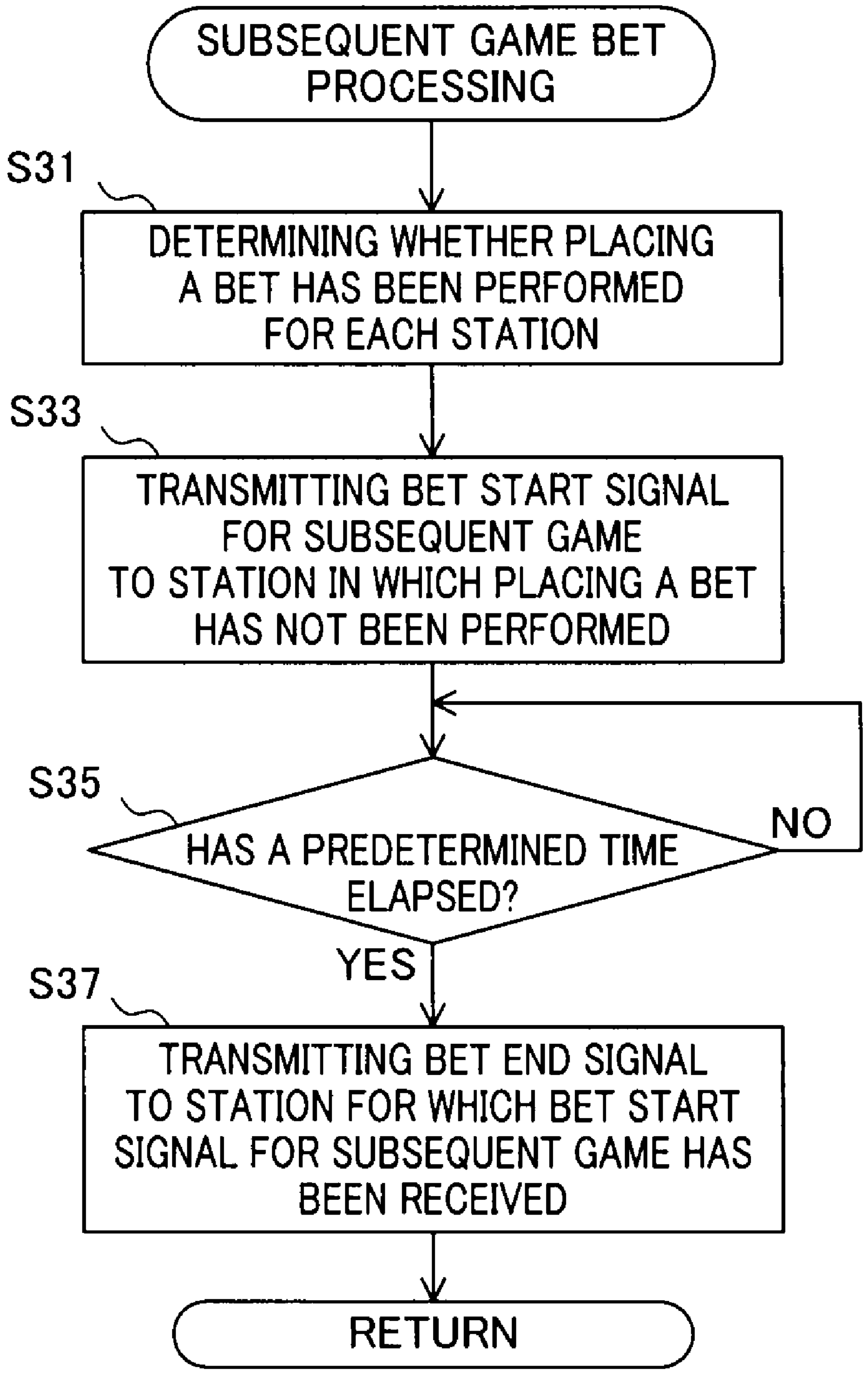
FIG. 32A is a flowchart showing subsequent game bet processing executed in a gaming machine according to the embodiment of the present invention.

The CPU 81 refers to this bet existence determination table upon determining for each station 4 whether a bet operation is performed at each station 4 in Step S31 of FIG. 32A.

Data indicating whether the bet operation has been performed or not at each station number is stored in this table. "P" is data indicating that a bet operation was performed, and "A" is data indicating that a bet operation was not performed. In addition, this table is updated in every game, and stored in the RAM 83.

An oscillation mode data table is described with reference to FIG. 19A.

The CPU 81 refers to this oscillation mode data table upon determining combination patterns of the oscillation modes of the playing board 3*a*. In addition, this table is stored in the ROM 82.

According to this table, in a case of a pattern 3, the roll of dice 70 is performed in the order of a small oscillation for six seconds, a large oscillation for four seconds, and a subtle oscillation for five seconds. Here, the order of oscillation amplitude of the playing board 3*a* is equal to large oscillation>small oscillation>subtle oscillation. It should be noted that the oscillation speed for the large oscillation, the small oscillation, and the subtle oscillation are all the same speed. Furthermore, the small oscillation is enough to be able to roll a die, the large oscillation is enough to jump a die, and the subtle oscillation is enough to level off a die that comes to rest at a tilt.

A rendered effect table is described with reference to FIG. 20A.

Figure 33A:
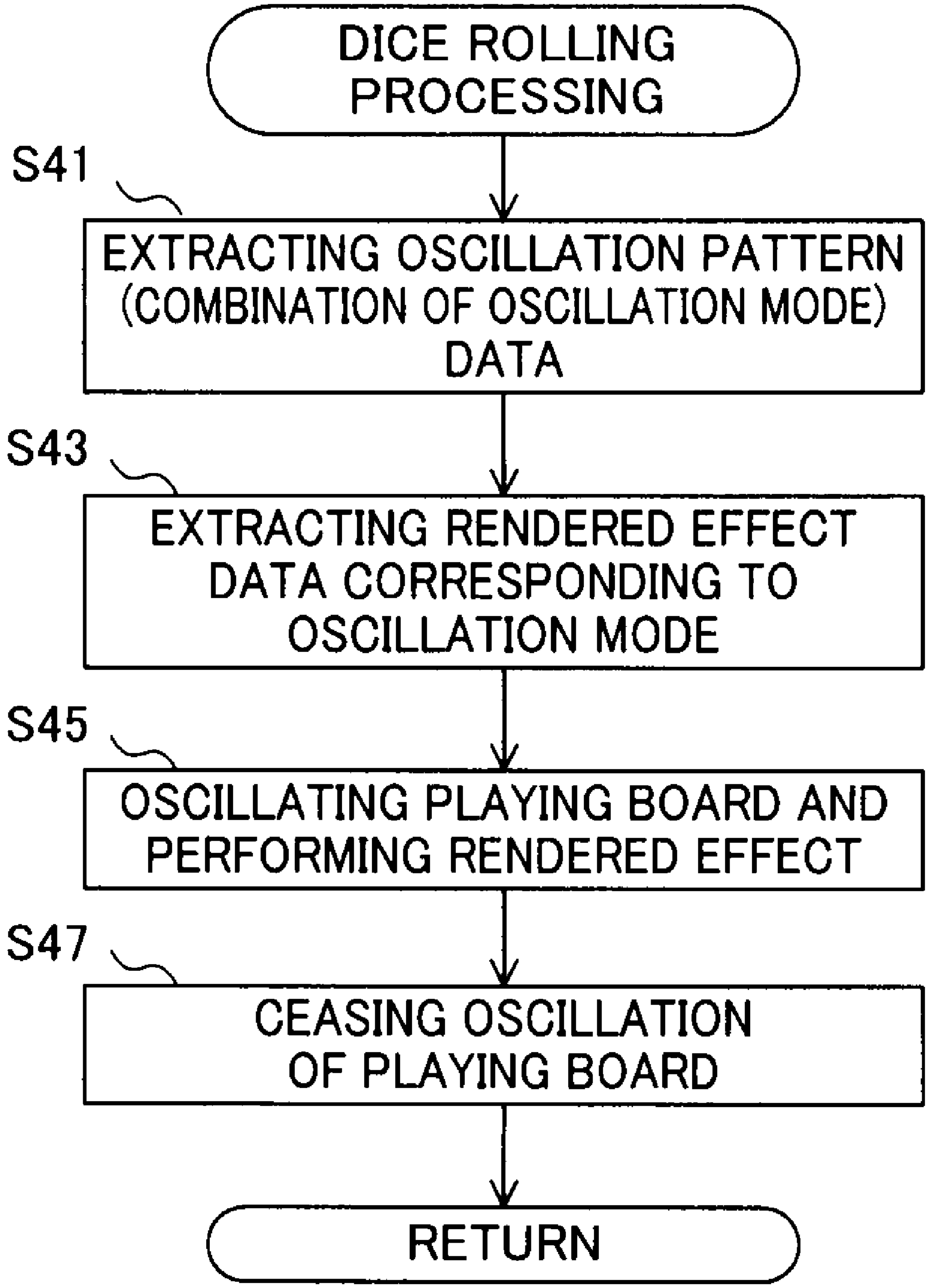
FIG. 33A is a flowchart showing dice rolling processing executed in a gaming machine according to the embodiment of the present invention.

The CPU 81 refers to this rendered effect table upon determining rendered effect data in response to an oscillation pattern of the playing board 3*a* in Step S43 of FIG. 33A. In addition, this table is stored in the ROM 82.

According to this table, oscillation modes correspond to sound types and, for example, in the case of a large oscillation, "sound 2" is determined. For example, in the case of "sound 2", the sound indicating that a die jumps is outputted from the speaker 221.

It should be noted that, by way of associating an oscillation mode with a certain type of emitted light, rendered effects with a light emitting mode associated with an oscillation mode may be performed by lighting or flashing of the lamp 222.

An IC tag data table is described with reference to FIG. 21A.

The IC tag data table is a table showing data as identification data 1 to 3 which is created by the CPU 81 based on the results of the type of dice and the number of dots on the dice, when information stored in IC tags embedded in the dice 70*a*, 70*b*, and 70*c* is detected by the IC tag reader 16.

According to this table, for example, when an IC tag embedded in each die is detected in the order of 70*c*, 70*a*, and 70*b*, by the IC tag reader 16, the die 70*c* is associated with identification data 1 of which the type is "red" and the number of dots is "six", the die 70*a* is associated with identification data 2 of which the type is "white" and the number of dots is "three", and the die 70*b* is associated with identification data 3 of which the type is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 16 to the CPU 81, and then the CPU 81 receives it to analyze the number of dots on a die and the like.

An infrared camera imaging data table is described with reference to FIG. 22A.

The infrared camera imaging data table is a data table showing dot patterns of the infrared absorption inks applied to the dice 70 and location data of the dice 70 on the playing board 3*a*.

For example, regarding the die 70*a* shown in FIG. 11A, in the infrared camera imaging data table, the CPU (not shown) inside the infrared camera 15 stores −50 for X and 55 for Y as location data, stores “O” for 181, 182, 184, 186, and 187, to which the infrared absorption inks are being applied, and stores “X” for 183 and 185, which are not being applied. The same is true of the dice 70*b* and 70*c*.

On the other hand, as shown in FIG. 13A, in a case where a plurality of faces of the dice 70 is captured, the number of dots cannot be specified uniquely. In this case, the CPU (not shown) inside the infrared camera 15 calculates the area of the profiles 75 on the plurality of faces thus captured, and generates the infrared camera imaging data table based on the dot patterns on the face that has a maximum area.

Therefore, even if the dice 70 come to rest at a tilt and a plurality of faces of the dice 70 is captured, the number of dots can be specified uniquely.

In addition, this data table is transmitted from the infrared camera 15 to the CPU 81, and then the CPU 81 receives it to analyze the number of dots on a die and the like.

A dot pattern data classification table is described with reference to FIG. 23A.

According to this table, colors as the classification for the dice 70 are set so as to correspond to dot combinations to which the infrared absorption ink is applied, among the abovementioned dots 181 to 183 in FIG. 10A. “O” indicates that the infrared absorption ink is applied to the dot, and “X” indicates that the infrared absorption ink is not applied to the dot.

For example, in a case where the infrared camera imaging data table described in FIG. 22A is transmitted to the CPU 81, the CPU 81 determines the classification of the dice 70 as “red” by comparing the infrared camera imaging data table with the dot pattern data classification table.

A number of dots-dot pattern data table is described with reference to FIG. 24A.

According to this table, numbers as the number of dots on the dice 70 are set so as to correspond to dot combinations to which the infrared absorption ink is applied, among the abovementioned dots 184 to 187 in FIG. 10A. “O” indicates that the infrared absorption ink is applied to the dot, and “X” indicates that the infrared absorption ink is not applied to the dot.

For example, in a case where the infrared camera imaging data table shown in FIG. 22A is transmitted from the infrared camera 15 to the CPU 81, the CPU 81 determines the number of dots on the dice 70 as “five” by comparing the infrared camera imaging data table thus received with the dot pattern data classification table.

Figure 25A:
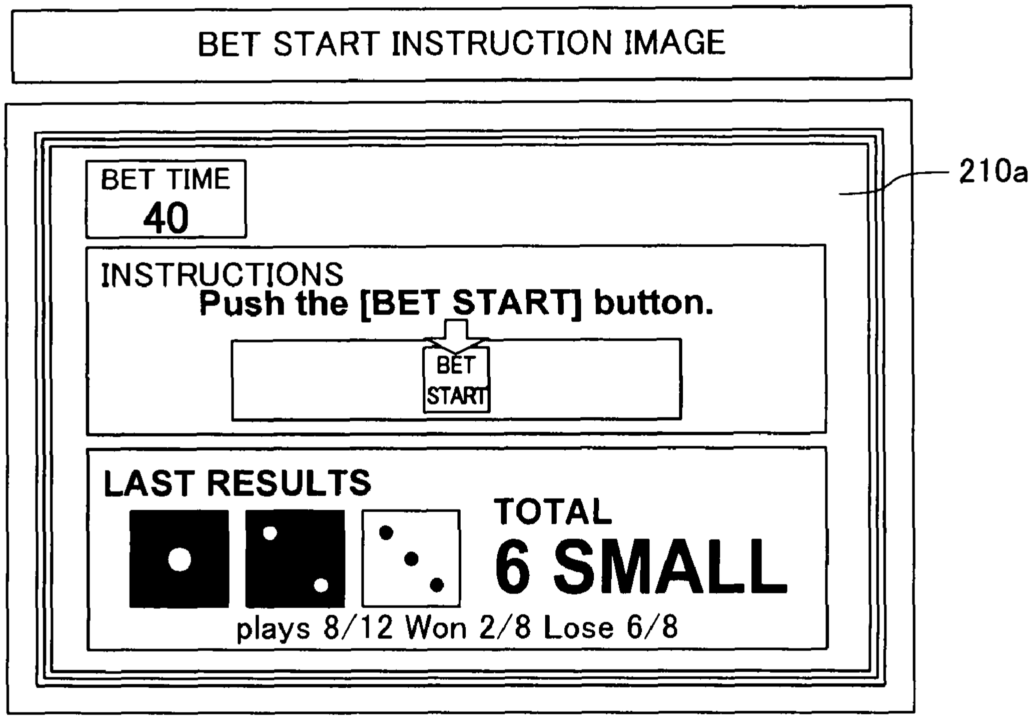

A bet start instruction image is described with reference to FIG. 25A.

The bet start instruction image is displayed by the CPU 81 on the display screen 210*a* of the dealer used display 210 before the CPU 81 accepts a bet from each station 4.

This bet start instruction image instructs a dealer to touch a “bet start” button. When a touch panel 211 detects that the dealer has touched the “bet start” button, the touch panel 211 transmits a bet start instruction signal to the CPU 81 via a communication interface 95.

A bet end not recommended image is described with reference to FIG. 26A.

This bet end not recommended image is displayed by the CPU 81 on the display screen 210*a* of the dealer used display 210 while the CPU 81 accepts a bet from each station 4.

This bet end not recommended image instructs the dealer not to touch a “bet end” button.

Figure 27A:
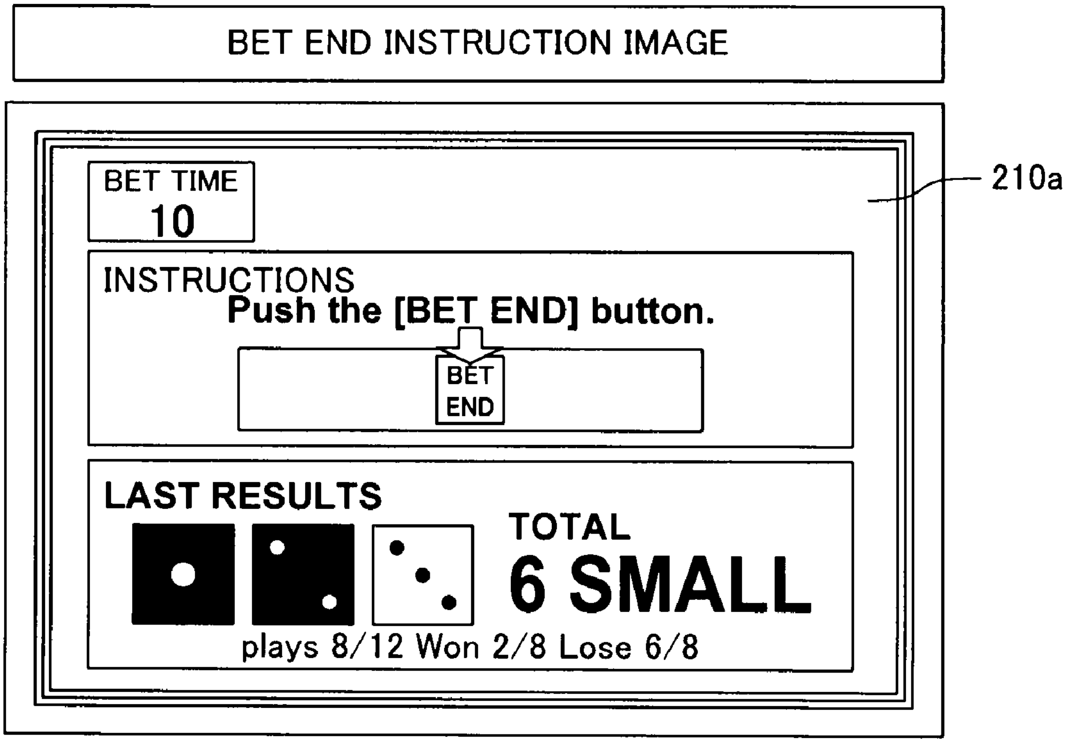

A bet end instruction image is described with reference to FIG. 27A.

The bet end instruction image is displayed by the CPU 81 on the display screen 210*a* of the dealer used display 210 after elapse of a predetermined time from when the CPU 81 starts accepting a bet from each station 4.

This bet end instruction image instructs the dealer to touch the “bet end” button. When the touch panel 211 detects that the dealer has touched the “bet end” button, the touch panel 211 transmits a bet end instruction signal to the CPU 81 via the communication interface 95.

A display example on the image display unit 7 of each station 4 is described with reference to FIG. 28A.

Figure 28A:
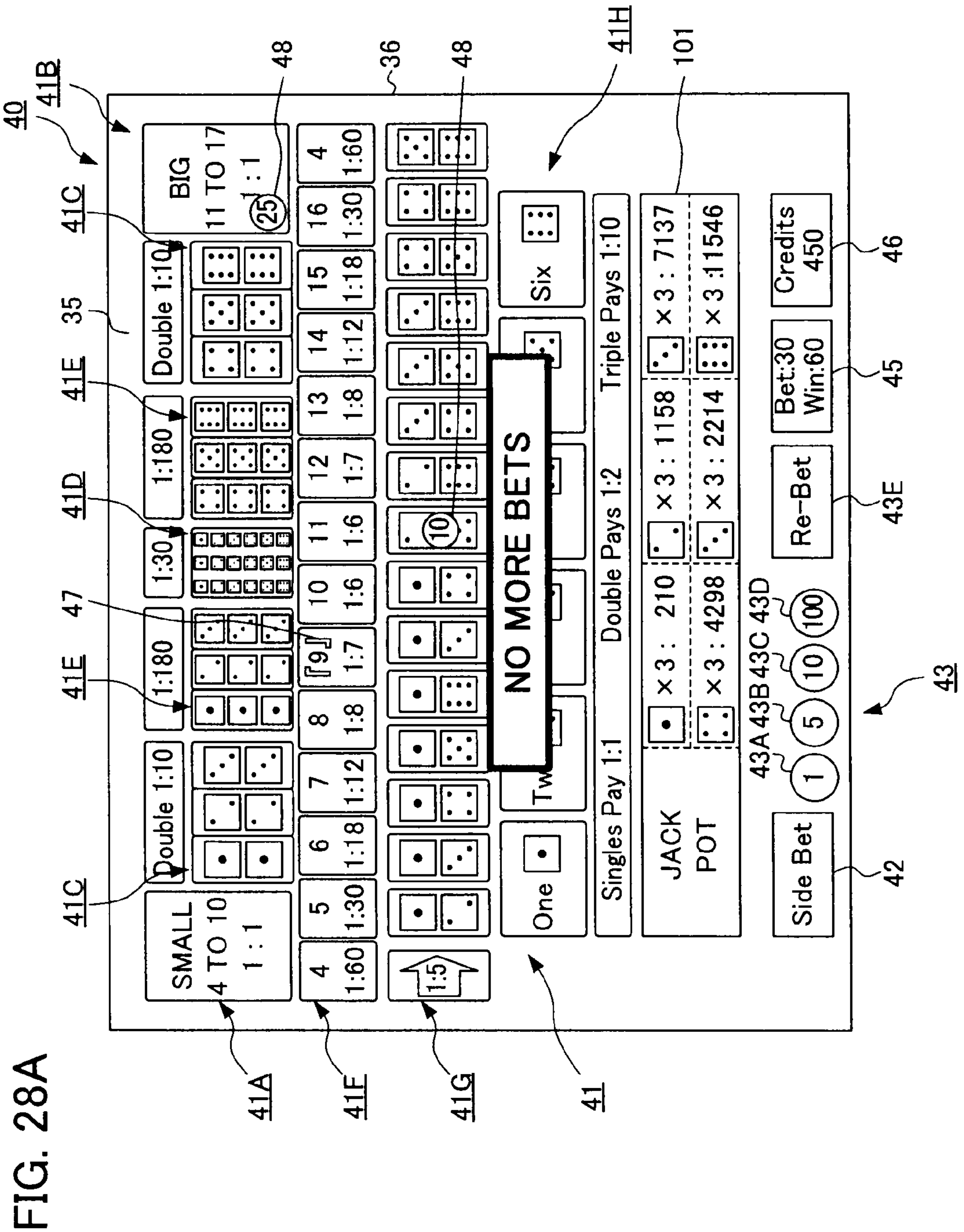

An image shown in FIG. 28A is configured to report to each station 4 that accepting of bets has ended. A player can recognize that the accepting of bets has ended by confirming that a message “NO MORE BETS” is displayed.

A display example on the image display unit 7 of each station 4 is described with reference to FIG. 29A.

Figure 29A:
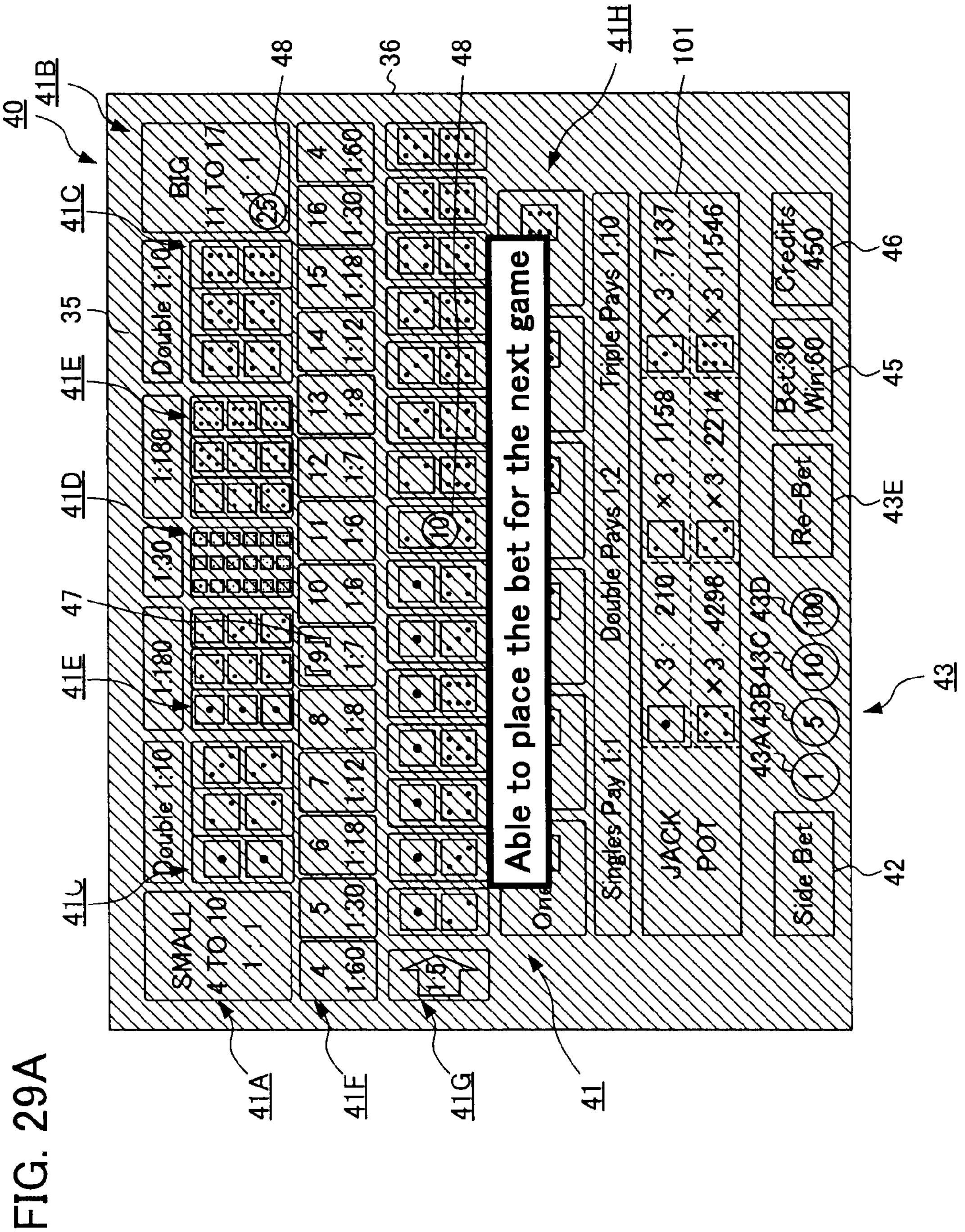

The image shown in FIG. 29A is configured to report to the station 4 in which a bet was not placed that a bet can be placed on a subsequent game. A player can recognize that a bet on the subsequent game is possible by confirming that a message “ABLE TO PLACE THE BET FOR THE NEXT GAME” is displayed.

Subsequently, with reference to FIGS. 30A to 34A, processing performed in the main control unit of a gaming machine according to the present embodiment is described.

Figure 30A:
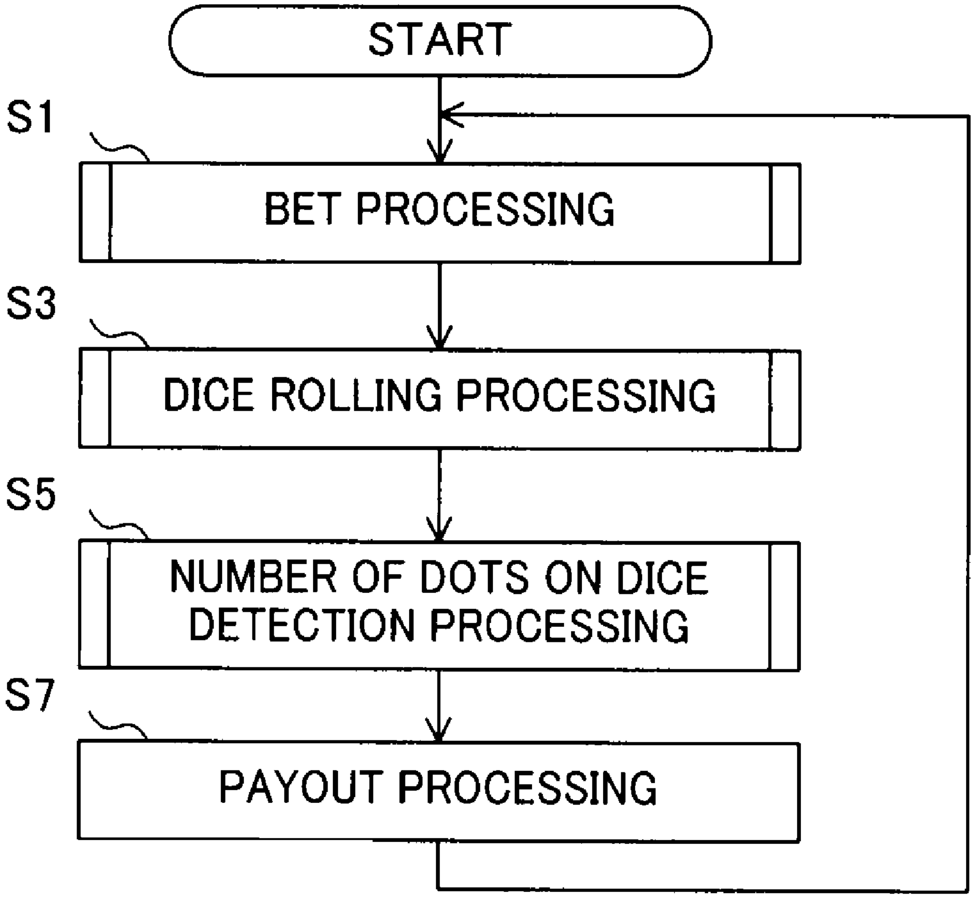
FIG. 30A is a flowchart showing dice game processing executed in a gaming machine according to the embodiment of the present invention.

FIG. 30A is a flowchart showing dice game execution processing. Initially, in Step S1, the CPU 81 executes bet processing, which is described later in FIG. 31A, and in Step S3, the CPU 81 executes dice rolling processing, which is described later in FIG. 33A. In Step S5, the CPU 81 executes number of dots on dice detection processing, which is described later in FIG. 34A and, in Step 7, executes payout processing corresponding to the number of dots, and then the flow returns to Step 1.

FIG. 31A is a flowchart showing bet processing.

In Step S11, the CPU 81 displays the bet start instruction image (see FIG. 25A) on the display screen 210*a* of the dealer used display 210. It should be noted that, whether or not the bet start instruction image is displayed may be determined according to a dealer’s level with reference to the instruction image display determination (see FIG. 17A).

Thus, according to the dealer’s level, it becomes possible to determine whether the bet start instruction image is displayed on the display screen 210*a* of the dealer used display 210.

In Step S13, the CPU 81 determines whether the bet start instruction signal has been received from the touch panel 211 disposed on the dealer used display 210. In the case of a NO determination, the CPU 81 returns the processing to Step S13, and in the case of a YES determination, the CPU 81 advances the processing to Step S15.

In Step S15, the CPU 81 transmits the bet start signal to each of the stations 4. When the bet start signal is received, bet placement can be performed at each station 4.

In Step S17, the CPU 106 determines whether or not a predetermined time has elapsed. More specifically, the CPU 81 starts to measure a predetermined lapse of time t by the timer 131, compares the predetermined lapse of time t with a predetermined time T1 stored in the ROM 82, and determines whether the predetermined lapse of time t measured by the timer 131 has reached the predetermined time T1. In the case of a NO determination, the CPU 81 returns the processing to Step S17, and in the case of a YES determination, the CPU 81 advances the processing to Step S19.

In Step S19, the CPU 81 displays the bet end instruction image (see FIG. 27A) on the display screen 210*a* of the dealer used display 210. It should be noted that, whether or not the bet end instruction image is displayed may be determined according to a dealer's level with reference to the instruction image display determination (see FIG. 17A).

In Step S21, the CPU 81 determines whether the bet end instruction signal has been received from the touch panel 211 disposed on the dealer used display 210. In the case of a NO determination, the CPU 81 returns the processing to Step S21, and in the case of a YES determination, the CPU 81 advances the processing to Step S23.

In Step S23, the CPU 81 transmits the bet end signal to each station 4. When the bet end signal is received, bet placement cannot be accepted at each station 4, and then the CPU 111 inside the station control unit 110 displays an image which reports on the image display unit 7 that an accepting of bet placement has been terminated (FIG. 28A).

In Step S25, the CPU 81 receives bet information from each station 4. The bet information relates to a normal bet input and a side bet input performed at each station 4. In addition, the bet information includes information indicating whether bet placement has been performed or not which is included in the bet existence determination table (FIG. 18A). Upon terminating the processing of Step S25, the CPU 81 terminates the bet processing.

With the bet processing of the present embodiment, even an inexperienced dealer can perform start operations for bet placement and end operations according to instructional images.

FIG. 32A is a flowchart showing subsequent game bet processing.

The subsequent game bet processing is started by the CPU 81 and executed parallel to the dice rolling processing in FIG. 30A when the bet processing described in FIG. 31A is terminated. Therefore, placing a bet on the subsequent game becomes possible even during the dice rolling after termination of the bet processing.

In Step S31, the CPU 81 determines whether bet placement has been performed for each station 4. More specifically, the CPU 81 distinguishes stations at which bet placement has been performed from stations at which bet placement has not been performed with reference to the bet existence determination table (FIG. 18A).

In Step S33, the CPU 81 transmits a bet start signal for a subsequent game to the stations 4 at which bet placement has not been performed. When the station 4 receives the bet start signal for a subsequent game, the CPU 111 inside the station control unit 110 displays an image which reports that bet placement for a subsequent game is possible (FIG. 29A) on the image display unit 7.

Thus, even during a game, a player who has not participated in the game can place a bet on a subsequent game.

In Step S35, the CPU 81 determines whether or not a predetermined time has elapsed. More specifically, the CPU 81 starts to measure a predetermined lapse of time t by the timer 131, compares the predetermined lapse of time t with a predetermined time T2 stored in the ROM 82, and determines whether the predetermined lapse of time t measured by the timer 131 has reached the predetermined time T2. In the case of a NO determination, the CPU 81 returns the processing to Step S35, and in the case of a YES determination, the CPU 81 advances the processing to Step S37.

In Step S37, the CPU 81 transmits a bet end signal to the station 4 at which the bet start signal for a subsequent game has been received. When the station 4 receives the bet end signal, the player cannot place a bet on a subsequent game, and the CPU 81 terminates acceptance of bet placement for a subsequent game. Upon terminating the process in Step S37, the CPU 81 terminates the subsequent game bet processing.

FIG. 33A is a flowchart showing dice rolling processing.

In Step S41, the CPU 81 extracts an oscillation pattern (combinations of oscillation modes) data from the ROM 82. More specifically, the CPU 81 refers to an oscillation mode data table (see FIG. 19A) and extracts the oscillation pattern data at random.

In Step S43, the CPU 81 extracts a rendered effect corresponding to an oscillation mode from the ROM 82. More specifically, the CPU 81 refers to the rendered effect table (see FIG. 20A) and extracts rendered effect data corresponding to an oscillation mode based on an oscillation pattern data thus extracted in Step S41.

In Step S45, the CPU 81 oscillates the playing board 3*a* and performs a rendered effect. More specifically, the CPU 81 oscillates the playing board 3*a* by controlling the oscillation motor 300 based on the oscillation pattern data thus extracted in Step S41, and performs a rendered effect with sounds and/or lights based on rendered effect data corresponding to an oscillation mode.

Thus, since a rendered effect corresponding to an oscillation mode of the playing board 3*a* is performed, games do not become monotonous and interest therein can be improved. Furthermore, since an oscillation pattern is randomly determined, games do not become monotonous and interest therein can be improved.

In Step S47, the CPU 81 ceases oscillation of the playing board 3*a*. More specifically, the CPU 81 ceases the oscillation of the playing board 3*a* by stopping the oscillation motor 300. Upon terminating the processing in Step S47, the CPU 81 terminates the dice rolling processing.

Figure 34A:
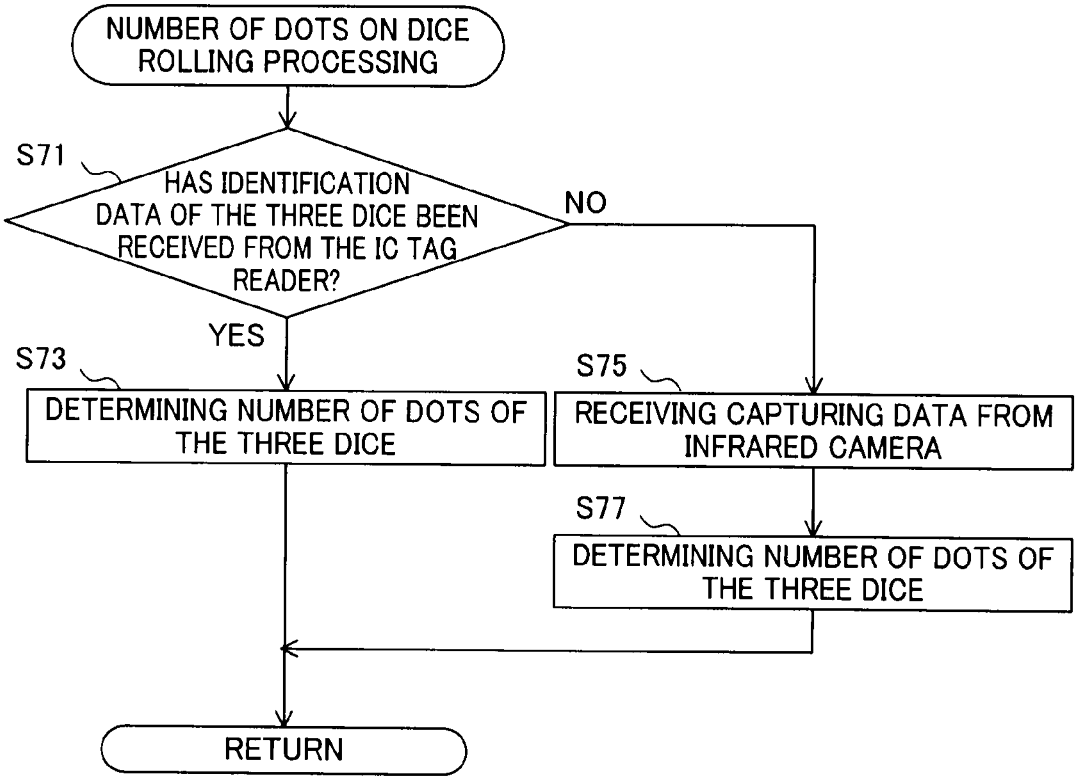
FIG. 34A is a flowchart showing dot detection processing executed in a gaming machine according to the embodiment of the present invention.

FIG. 34A is a flowchart showing number of dots on dice detection processing.

In Step S71, the CPU 81 determines whether identification data of the three dice has been received from the IC tag reader 16. In the case of a YES determination, the CPU 81 advances the processing to Step S73, and in the case of a NO determination, the CPU 81 advances the processing to Step S75. More specifically, the CPU 81 determines whether there are three sets of identification data, which are identification data 1 to 3, in the IC tag data table (see FIG. 21A) received from the IC tag reader 16.

In Step S73, the CPU 81 determines the number of dots on the three dice. More specifically, the CPU 81 determines the number of dots of the three dice by analyzing the identification data 1 to 3. For example, in a case where the identification data is data as shown in FIG. 21A, the number of dice of which type is red is "six", the number of dice of which type is white is "three", and the number of dice of which type is black is "five". Upon finishing the processing in Step S73, the CPU 81 terminates the number of dots detection processing.

In Step S75, the CPU 81 receives imaging data from the infrared camera. More specifically, the CPU 81 receives the infrared camera imaging data table (see FIG. 22A) for each of the dice 70*a*, 70*b*, and 70*c*, from the infrared camera 15

In Step S77, the CPU 81 determines numbers of dots on the dice. More specifically, the CPU 81 determines positions of the dice on the playing board 3*a* based on the infrared camera imaging data table (see FIG. 22A), determines types (colors) of the dice based on the infrared camera imaging data table (see FIG. 22A) and the dot pattern data classification table (see FIG. 23A), and determines numbers of the dice based on the infrared camera imaging data table (see FIG. 22A) and the number of dots-dot pattern data table (see FIG. 24A). This processing is executed for the three dice 70*a*, 70*b*, and 70*c*. Upon terminating the processing in Step S77, the CPU 81 terminates the number of dots detection processing.

Thus, even in a case where, for example, a die is inclined and the number of dots thereof cannot be identified by the IC tag reader 16, since the number of dots can be determined using the infrared camera 15, the accuracy of detection and identification of numbers of dots can be improved.

Descriptions regarding the present embodiment have been provided above. Although a case has been described in which the number of dice 70 is three according to the present embodiment, the number of in the present invention is not limited to three and, for example, the number of the dice may be five. In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can modified appropriately. Moreover, it should be understood that the advantages described in association with the embodiments are merely a listing of most preferred advantages, and that the advantages of the present invention are by no means restricted to those described in connection with the embodiments.

Embodiments of the present invention will be described below with reference to the accompanying drawings.

Figure 1B:
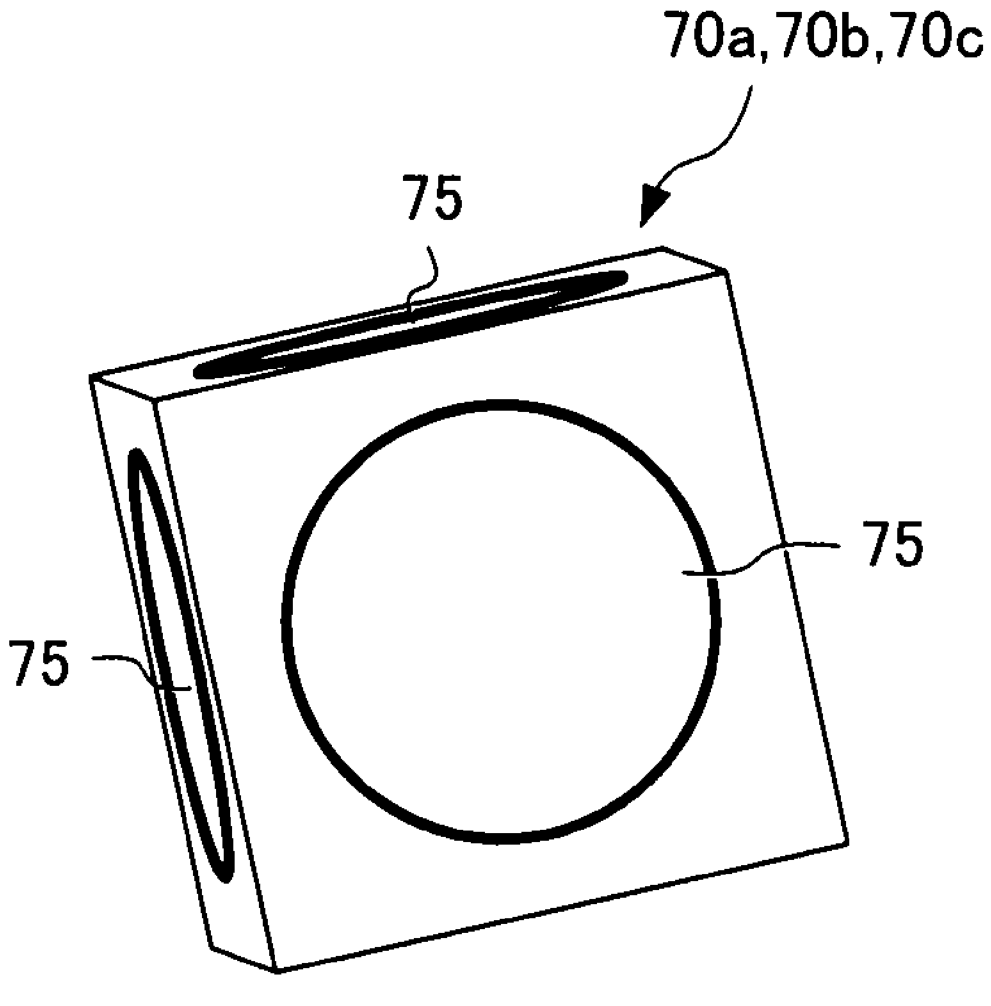
FIG. 1B shows an image in which a die according to the embodiment of the present invention that has come to rest at a tilt on a playing board, is imaged substantially in the vertically upward direction by an infrared camera.

Although described later in detail, as shown in FIG. 1B, in a case in which dice 70 come to rest leaning, when an infrared camera 15 images the dice 70, a plurality of faces thereon is imaged. Therefore, it is necessary to judge which face determination of the number of dots is based on. Thus, in an embodiment of the present invention, the infrared camera 15 transmits imaging data of a face having the largest dimension when imaged to CPU 81. The CPU 81 determines the number of dots on the dice 70 based on the imaging data thus received.

Figure 2B:
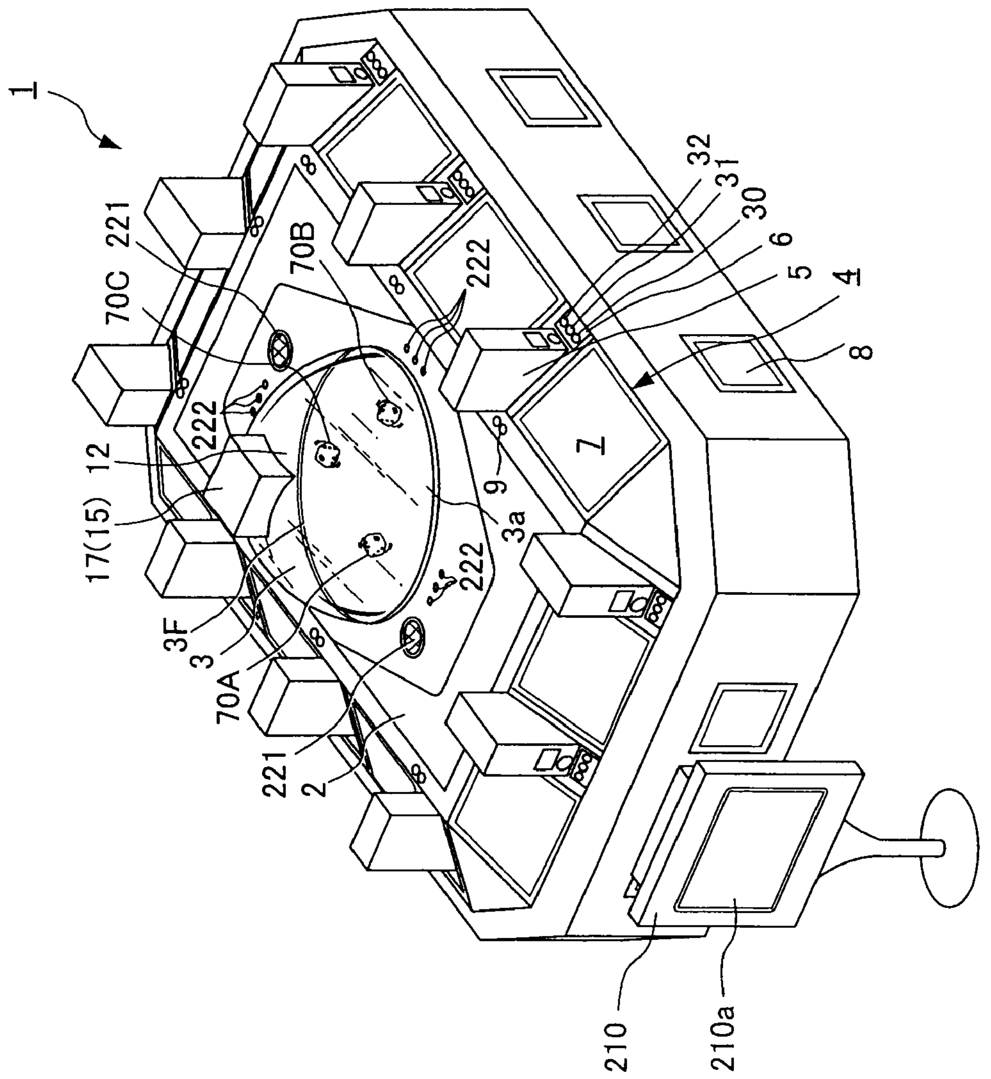
FIG. 2B is a perspective view of a gaming machine according to the embodiment of the present invention.
Figure 3B:
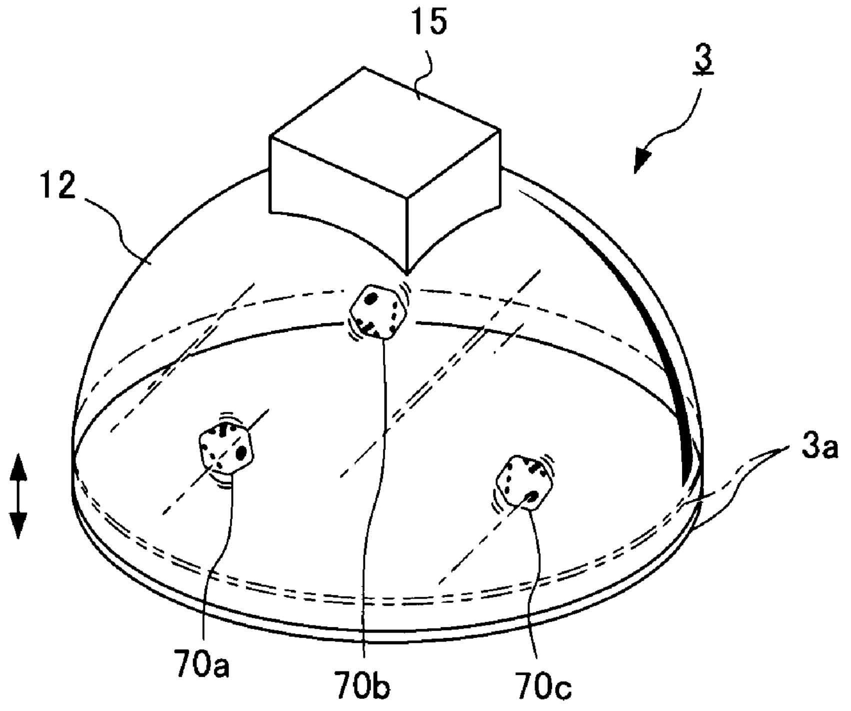
FIG. 3B is an enlarged view of a playing unit of the gaming machine shown in FIG. 2B.

FIG. 2B is a perspective view schematically showing an example of a gaming machine according to the embodiment of this invention. FIG. 3B is an enlarged view of a playing unit of the gaming machine shown in FIG. 2B. As shown in FIG. 2B, a gaming machine 1 according to the present embodiment includes a housing 2 as a main body portion, a playing unit 3 that is provided substantially at the center of the top face of the housing 2 and in which a plurality of dice 70 are rolled and stopped, a plurality of stations 4 disposed so as to surround the playing unit 3, and a dealer used display 210 that is positioned so as not to be visually recognizable by a player seated at each station 4. The station 4 includes an image display unit 7. The player seated at each station 4 can participate in a game by predicting numbers of dots on the dice 70 and performing a normal bet input and a side bet input.

The gaming machine 1 includes a housing 2 as a main body portion, a playing unit 3 that is provided substantially at the center of the top face of the housing 2 and in which a plurality of dice 70 are rolled and stopped, and a plurality of stations 4 (ten in this embodiment) disposed so as to surround the playing unit 3.

The station 4 include a game media receiving device 5 into which game media such as medals to be used for playing the game are inserted, a control unit 6, which is configured with multiple control buttons by which a player enters predetermined instructions, and an image display unit 7, which displays images relating to a bet table. The player may participate in a game by operating the control unit 6 or the like while viewing the image displayed on the image display unit 7.

A payout opening 8, from which a player's game media are paid out, are provided on the sides of the housing 2 on which each station 4 is provided. In addition, a speaker 9, which can output sound, is disposed on the upper right of the image display unit 7 on each of the stations 4.

A control unit 6 is provided on the side part of the image display unit 7 on each of the stations 4. As viewed from a position facing the station 4, in order from the left side are provided a select button 30, a payout (cash-out) button 31, and a help button 32.

The select button 30 is a button that is pressed when confirming a bet operation after the bet operation is complete. Furthermore, in a case other than the bet operation, the button is pressed when a player confirms an input performed.

The payout button 31 is a button which is usually pressed at the end of a game, and when the payout button 31 is pressed, game media corresponding to credits that the player has acquired is paid out from the payout opening 8.

The help button 32 is a button that is pressed in a case where a method of operating the game is unclear, and upon the help button 32 being pressed, a help screen showing various kinds of operation information is displayed immediately thereafter on the image display unit 7.

The playing unit 3 is configured so as to allow a plurality of dice to roll and stop. The present embodiment is configured to use three dice 70 (dice 70*a*, 70*b*, and 70*c*) at the playing unit 3.

A speaker 221 and a lamp 222 are disposed around the playing unit 3. The speaker 221 performs rendered effects by outputting sounds while the dice 70 are being rolled. The lamp 222 performs rendered effects by emitting lights while the dice 70 are being rolled.

The playing unit 3 includes a playing board 3*a*, which is formed to be a circular shape, to roll and then stop the dice 70. An IC tag reader 16, which is described later in FIGS. 6B to 9B, are provided below the playing board 3*a*.

Since the playing board 3*a* is formed to be substantially planar, as shown in FIG. 3B, the dice 70 are rolled by oscillating the playing board 3*a* substantially in the vertical direction with respect to the horizontal direction of the playing board 3*a*. Then, the dice 70 are stopped after the oscillation of the playing board 3*a* ceases. The playing board 3*a* is oscillated by a CPU 81 (described later) driving an oscillating motor 300.

Furthermore, as shown in FIG. 3B, the playing unit 3 is covered with a cover member 12 of which the entire upper area is made of a transparent acrylic material formed in a hemispherical shape, and regulates the rolling area of the dice 70. In the present embodiment, an infrared camera 15 is provided at the top of the cover member 12 to detect numbers of dots and the like (such as positions of the dice 70 on the playing board 3*a*, types of the dice 70, and numbers of dots of the dice 70) of the dice 70. Furthermore, the cover member 12 is covered with a special film (not shown) which blocks infrared radiation. In this way when the numbers of dots of the dice 70 on which an infrared absorption ink has been applied is detected with the infrared camera 15, false detection can be prevented that arises, for example, in a case where a blink rate of a light irradiated from a circumference of the playing unit 3 is fast.

Figure 4B:
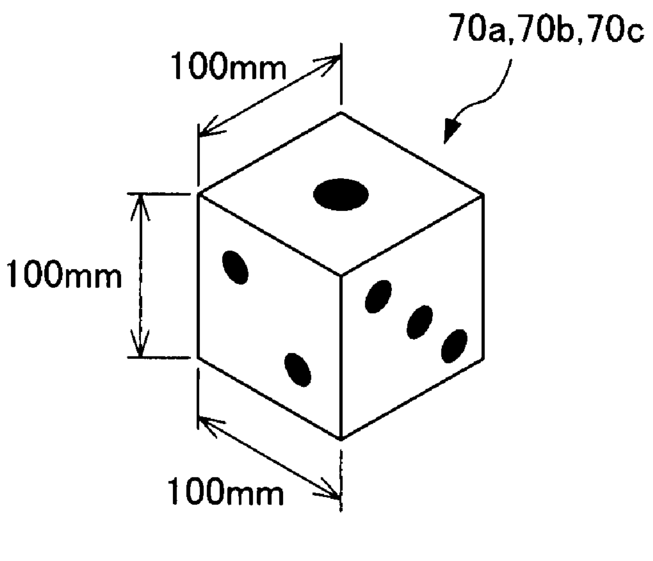
FIG. 4B is an external perspective view of a die according to the embodiment of the present invention.

FIG. 4B is an external perspective view of a die 70. As shown in FIG. 4B, the die 70 is a cube of which the length of a side is 100 mm.

Figure 5B:
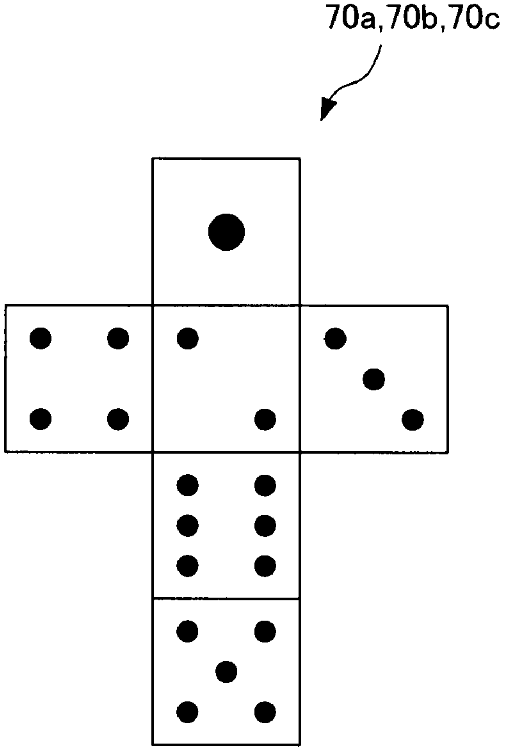
FIG. 5B is a development view of a die according to the embodiment of the present invention.

FIG. 5B is a development view of the die 70. As shown in FIG. 5B, the combinations of two faces opposing each other are "1 and 6", "2 and 5", and "3 and 4". FIGS. 6B to 9B show IC tag readable areas by an IC tag reader 16 disposed below the playing board 3*a*.

Here, a way of reading information stored in the IC tag by the IC tag reader 16 is described below.

The IC tag reader 16 is a non-contact type IC tag reader. For example, it is possible to read information stored in the IC tag by RFID (Radio Frequency Identification). The RFID system performs near field communication that reads and writes data stored in semi-conductor devices by an induction field or radio waves in a non-contact manner. In addition, since this technology is known conventionally and is described in Japanese Unexamined Patent Application Publication No. H8-21875, an explanation thereof is abbreviated.

In the present embodiment, a plurality of IC tags is read by a single IC tag reader 16. Under the abovementioned RFID system, an anti-collision function can be employed which can read a plurality of IC tags by a single reader. The anti-collision function includes FIFO (first in first out) type, multi-access type, and selective type, and communicates with a plurality of the IC tags sequentially. The FIFO type is a mode to communicate with a plurality of the IC tags sequentially in the order that each IC tag enters an area in which an antenna can communicate therewith. The multi-access type is a mode that is able to communicate with all the IC tags, even if there is a plurality of the IC tags simultaneously in the area in which an antenna can communicate with the IC tags. The selective type is a mode that is able to communicate with a specific IC tag among a plurality of the IC tags in the area in which an antenna can communicate therewith. By employing the abovementioned modes, it is possible to read a plurality of the IC tags with a single IC tag reader. In addition, reading the IC tags may not only be done by the non-contact type, but also a contact type. In addition, the IC tag reader is not limited thereto, and anything that is appropriately designed with the object of being read may be employed.

In the present embodiment, a readable area of the IC tag reader 16 is 10 mm in substantially a vertical direction from substantially an entire horizontal face on the playing board 3*a*.

Figure 6B:
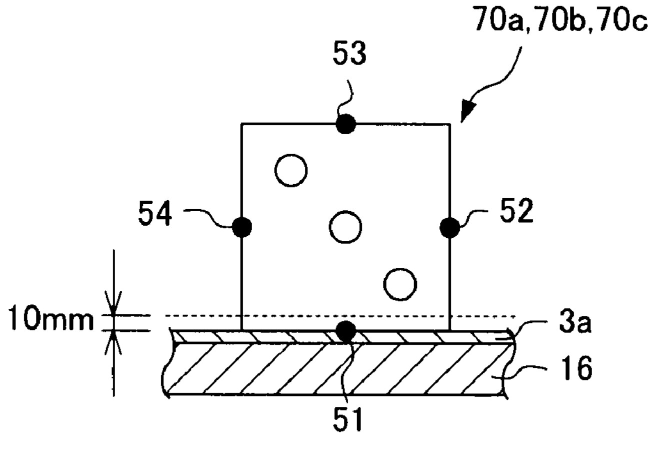

With reference to FIG. 6B, a face of the die 70 (for example, a face of which the number of dots is six) is in contact with the playing board 3*a*. Furthermore, the IC tag is embedded substantially at the center of each face of the die 70 (the IC tags for the faces on which the numbers of dots are "3" and "4" are not shown). An IC tag 51 is embedded substantially at the center of a face on which the number of dots is six. An IC tag 52 is embedded substantially at the center of a face on which the number of dots is five. An IC tag 53 is embedded substantially at the center of a face on which the number of dots is one. An IC tag 54 is embedded substantially at the center of a face on which the number of dots is two.

Here, only the IC tag 51 exists in the readable area of the IC tag reader 16. Therefore, the number of dots (in this case, "one") of a face, opposing the face on which the IC tag 51 is embedded, is determined as the number of dots of the die 70.

Furthermore, since the number of dots of a face, opposing a face on which an IC tag is embedded, is determined as the number of dots of the die 70, "one" is stored, as data of the number of dots, in the IC tag 51 on the face of which the number of dots is "six". "Two" is stored, as data of the number of dots, in the IC tag 52 on the face of which the number of dots is "five". "Six" is stored, as data of the number of dots, in the IC tag 53 on the face of which the number of dots is "one". "Five" is stored, as data of the number of dots, in the IC tag 54 on the face of which the number of dots is "two". "Three" is stored, as data of the number of dots, in the IC tag (not shown) on the face of which the number of dots is "four". Finally, "four" is stored, as data of the number of dots, in the IC tag (not shown) on the face of which the number of dots is "three".

Furthermore, as described above, since a side of the die 70 is 10 mm, it is not physically possible for an IC tag reader 16 to detect more than one IC tag with respect to one die.

Figure 7B:
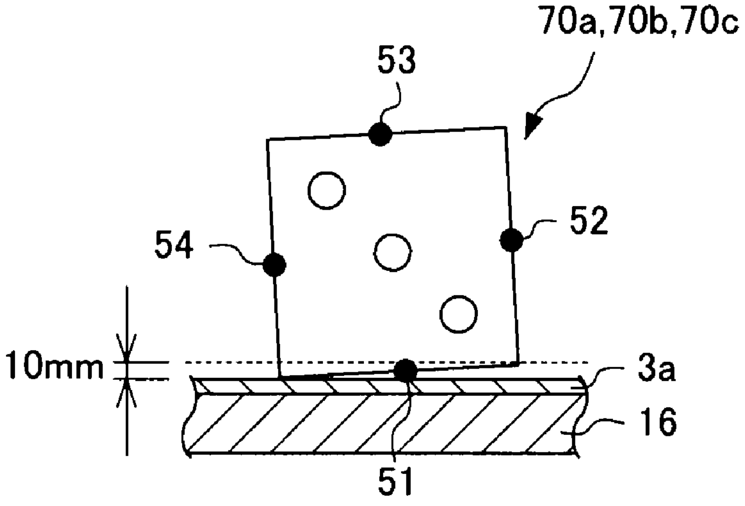

With reference to FIG. 7B, a die 70 is inclined. However, since the IC tag 51 still exists in the readable area of the IC tag reader 16, the number of dots of the die 70 is determined as "one".

Figure 8B:
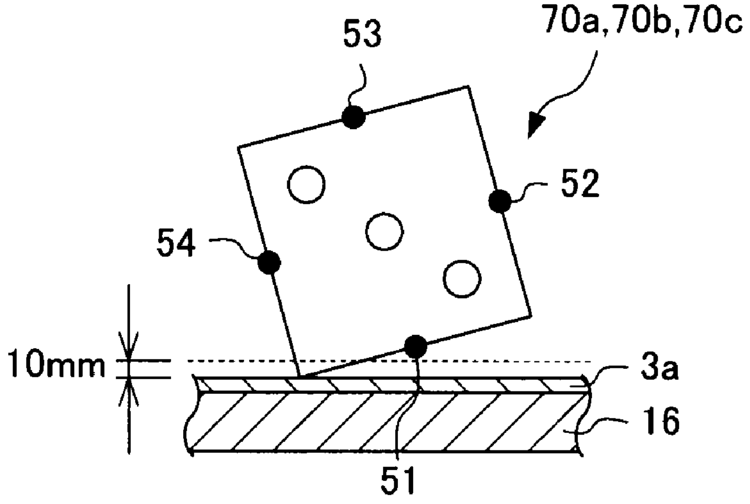

With respect to FIG. 8B, the die 70 is inclined at a greater angle than the case shown in FIG. 7B. Then, since there is no IC tag which exists in the readable area of the IC tag reader 16, the IC tag reader 16 cannot detect the number of dots of the die 70.

Figure 9B:
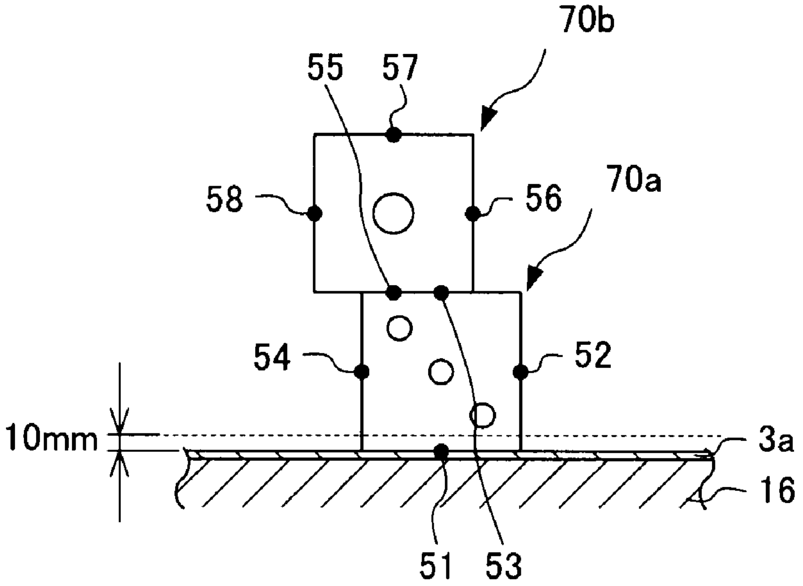

With reference to FIG. 9B, the die 70*b* is superimposed on the die 70*a*. In this case, neither of the IC tags 55, 56, 57, and 58, which are embedded in the die 70*b*, exists in the readable area of the IC tag reader 16. Therefore, in this case, the IC tag reader 16 cannot detect the number of dots of the die 70*b*.

Figure 10B:
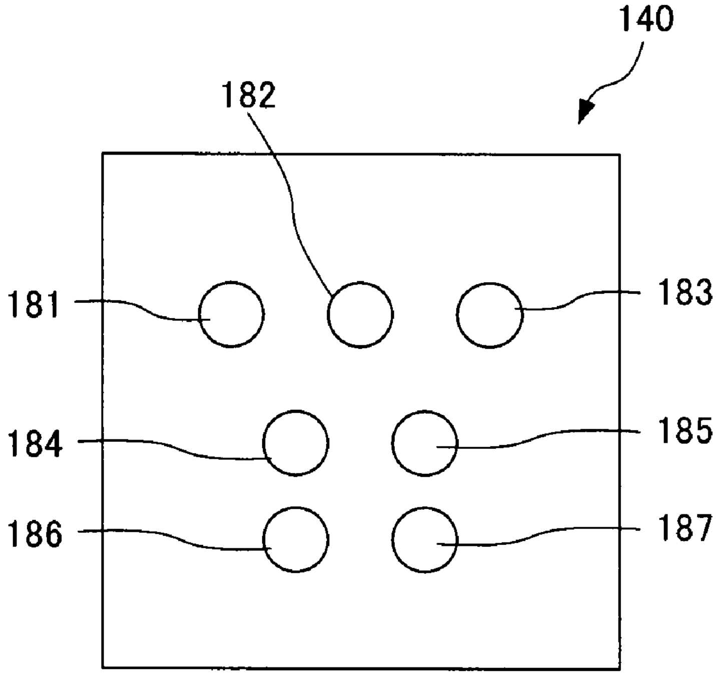
FIG. 10B shows a sheet attached to each face of a die according the embodiment of the present invention.

FIG. 10B shows a sheet 140 attached to each face of the die 70.

As shown in FIG. 10B, on each face of the die 70, the sheet 140, to which infrared absorption ink is applied to identify the number of dots and the type of the die 70, is provided so as to be covered by a sheet on which the number of dots is printed. According to FIG. 10B, the infrared absorption ink can be applied to dots 181, 182, 183, 184, 185, 186, and 187.

The number of dots of the die 70 can be identified by a combination of the dots to which the infrared absorption ink is applied among the dots 184, 185, 186, and 187. In addition, the type of the die 70 can be identified by a combination of the dots to which the infrared absorption ink is applied among the dots 181, 182, and 183.

Figure 11B:
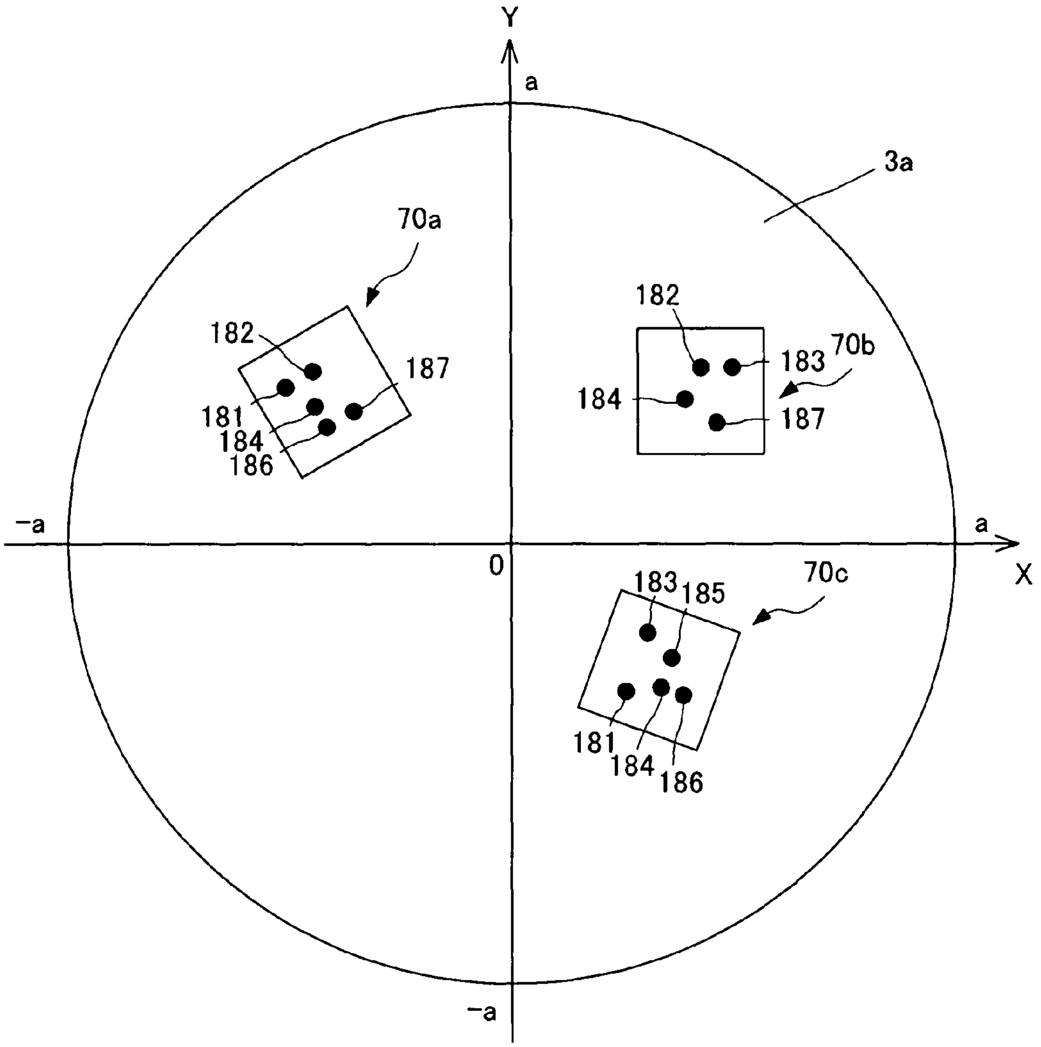
FIG. 11B is an image showing a state in which a die according to the embodiment of the present invention is imaged substantially in the vertically upward direction by an infrared camera.

FIG. 11B shows an image in which the dice 70, which comes to rest on the playing board 3*a*, are imaged substantially in the vertically upward direction using an infrared camera 15.

With reference to FIG. 11B, dots to which the infrared absorption ink is applied on each of the dice 70*a*, 70*b*, and 70*c* are imaged in black. The type and the number of dots for each of the dice 70*a*, 70*b*, and 70*c* are determined based on a combination of the dots to which the ink is applied. In addition, the playing board 3*a* is formed in a disc shape having a radius a, and each position of the dice 70*a*, 70*b*, and 70*c* is detected as an x component and y component on an x-y coordinate.

Figure 12B:
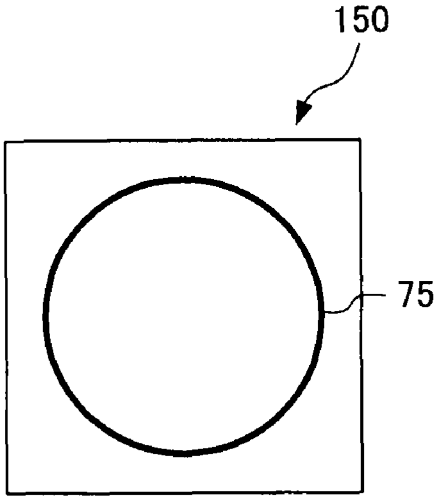
FIG. 12B shows a sheet attached to each face of a die according the embodiment of the present invention.

FIG. 12B shows a sheet 150 which is attached to each face of the dice 70.

As shown in FIG. 12B, a circular profile 75 having a certain area on each face of the dice 70 in common is depicted by way of applying the infrared absorption ink on each face of the dice 70. The sheet 150 on which the circular profile 75 is depicted is provided so as to be covered by the above-mentioned sheet 140.

Figure 13B:
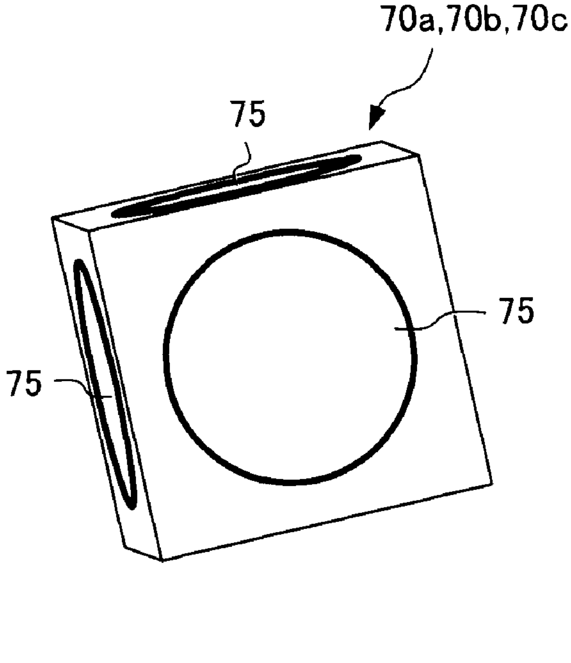
FIG. 13B shows an image in which a die according to the embodiment of the present invention that has come to rest at a tilt on a playing board, is imaged substantially in the vertically upward direction by an infrared camera.

FIG. 13B shows an image in which the die 70, which comes to rest at a tilt on a playing board 3*a*, is imaged substantially in the vertically upward direction using the infrared camera 15.

With reference to FIG. 13B, three faces of the die 70 are imaged. Therefore, it is necessary to distinguish the number of dots of which face is correct. Consequently, the number of dots having the largest dimension among the three faces is determined as the face that should be read. In a case of this distinction, the CPU (not shown) in the infrared camera 15 calculates the areas of the circular profiles 75 thus imaged, and distinguishes the number of dots of the face on which the circular profile 75 having the largest area among the areas thus calculated is printed as the correct number of dots.

Figure 14B:
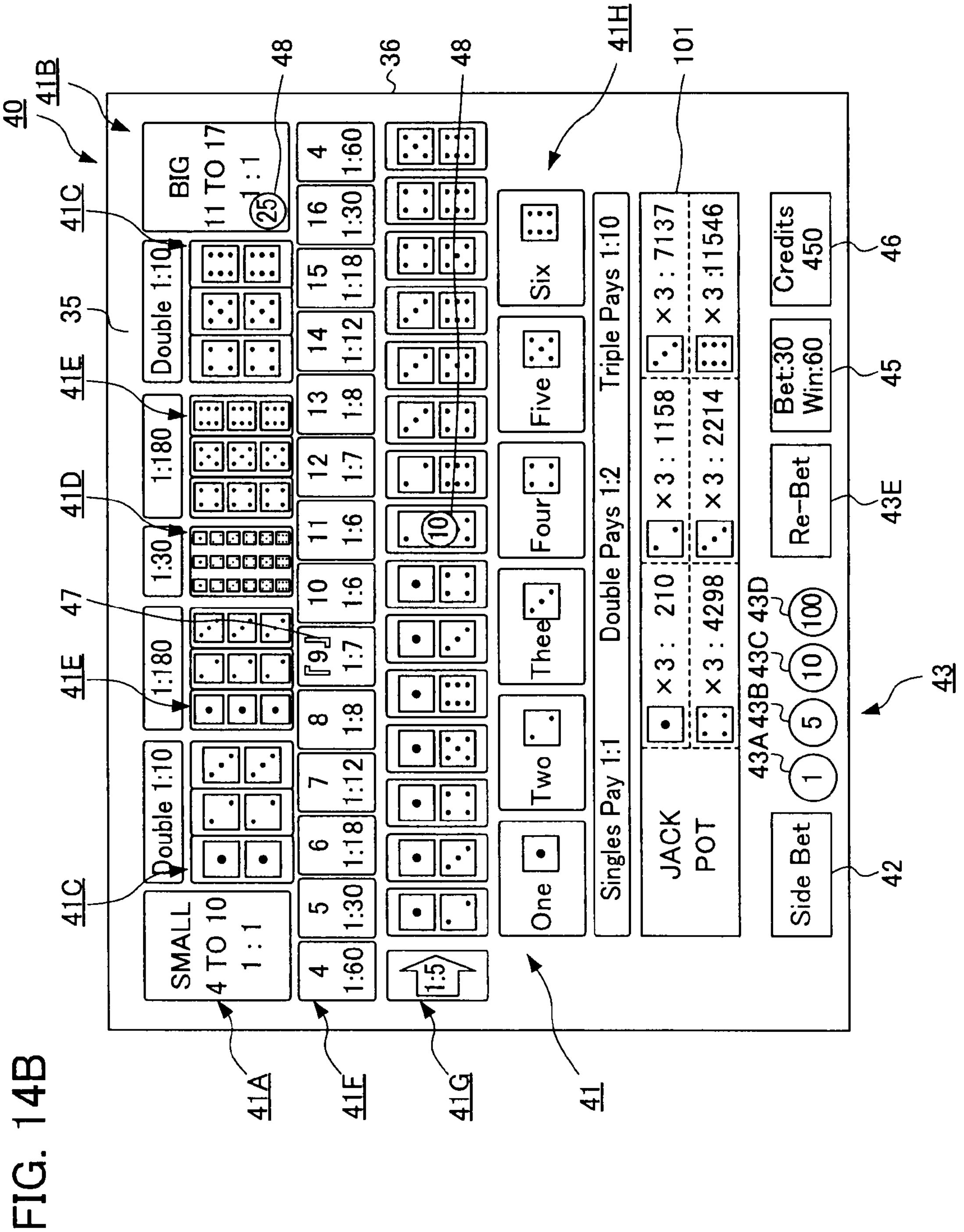
FIG. 14B shows an example of a display screen according to the embodiment of the present invention.

FIG. 14B shows an example of a display screen displayed on an image display unit. As shown in FIG. 14B, an image display unit 7 is a touch-panel type of liquid crystal display, on the front surface of which a touch panel 35 is attached, allowing a player to perform selection such as of icons displayed on a liquid crystal screen 36 by contacting the touch panel 35, e.g., with a finger.

A table-type betting board (a bet screen) 40 for predicting the number of dots of the dice 70 is displayed in a game at a predetermined timing on the image display unit 7.

A detailed description is now provided regarding the bet screen 40. On the bet screen 40 are displayed a plurality of normal bet areas 41 and a side bet area 42. The plurality of normal bet areas 41 includes a normal bet area 41A, a normal bet area 41B, a normal bet area 41C, a normal bet area 41D, a normal bet area 41E, a normal bet area 41F, a normal bet area 41G, and a normal bet area 41H. By contacting the touch panel 35, e.g., with a finger, the normal bet area 41 is designated, and by displaying chips in the normal bet area 41 thus designated, a normal bet operation is performed. Furthermore, by contacting the touch panel 35, e.g., with a finger, the side bet area 42 is designated, and by displaying chips in the side bet area 42 thus designated, a side bet operation is performed.

A unit bet button 43, a re-bet button 43E, a payout result display unit 45, and a credit amount display unit 46 are displayed at the right side of the side bet area 42 in order from the left side.

The unit bet button unit 43 is a group of buttons that are used by a player to bet chips on the normal bet area 41 and the side bet area 42 designated by the player. The unit bet button unit 43 is configured with four types of buttons including a 1 bet button 43A, a 5 bet button 43B, a 10 bet button 43C, and a 100 bet button 43D. It should be noted that in the case of an incorrect bet operation, the player can start a bet operation again by touching a re-bet button 43E.

Firstly, the player designates the normal bet area 41 or the side bet area 42 using a cursor 47 by way of contacting the touch panel 35, e.g., with a finger. At this time, contacting the 1 bet button 43A, e.g., with a finger, allows for betting one chip at a time (number of chips to be bet increases one by one in the order of 1, 2, 3, every time the 1 bet button 43A is contacted, e.g., by a finger). Similarly, when contacting the 5 bet button 43B, e.g., with a finger, five chips at a time can be bet (number of chips to be bet increases five by five in the order of 5, 10, 15, every time the 5 bet button 43B is contacted, e.g., by a finger). Similarly, when contacting the 10 bet button 43C, e.g., with a finger, ten chips at a time can be bet (number of chips to be bet increases ten by ten in the order of 10, 20, 30, every time the 10 bet button 43C is contacted, e.g., by a finger). Similarly, when contacting the 100 bet button 43D, e.g., with a finger, a hundred chips at a time can be bet (number of chips to be bet increases hundred by hundred in the order of 100, 200, 300, . . . every time the 100 bet button 43D is contacted, e.g. by a finger). The number of chips bet up to the current time is displayed as a chip mark 48, and the number displayed on the chip mark 48 indicates the number of bet chips.

The number of bet chips and payout credit amount for a player in a previous game are displayed in the payout result display unit 45. The number calculated by subtracting the number of bet chips from the payout credit amount is a newly acquired credit amount for the player in the previous game.

The credit amount display unit 46 displays the credit amount which the player possesses. The credit amount decreases according to the number of bet chips (1 credit amount for 1 chip) when the player bets chips. If the bet chips are entitled to an award and credits are paid out, the credit amount increases in accordance with the number of paid out chips. It should be noted that the game is over when the player's credit amount becomes zero.

The normal bet area 41 in the bet screen 40 is described next. The normal bet areas 41A and 41B are portions where the player places a bet on a predicted sum of dots to appear on the dice 70A to 70C. In other words, the player selects the normal bet area 41A if the predicted sum falls in a range of 4 to 10, or the normal bet area 41B if the predicted sum falls in a range of 11 to 17. Odds are set to 1:1 (2 chips are paid out for 1 chip bet).

The normal bet area 41C is a portion where the player places a bet, predicting that two dice 70 have the same number of dots. In other words, the player wins an award if one of the combinations occurs, such as (1, 1), (2, 2), (3, 3), (4, 4), (5, 5), and (6, 6), and the odds are set to 1:10.

The normal bet area 41D is a portion where the player places a bet, predicting that all three dice have the same number of dots. In other words, the player wins an award if one of the combinations occurs, such as (1, 1, 1), (2, 2, 2), (3, 3, 3), (4, 4, 4), (5, 5, 5), and (6, 6, 6), and the odds are set to 1:30.

The bet area 41E is a portion where the player places a bet on a predicted number of dots to appear commonly on all three dice. In other words, the player places a bet on one of the combinations of (1, 1, 1), (2, 2, 2), (3, 3, 3), (4, 4, 4), (5, 5, 5), or (6, 6, 6), and the odds are set to 1:180.

The normal bet area 41F is where the player places a bet, predicting a total, a summation of dots to appear on the three dice. Odds are set according to the occurrence frequency of the total. For example, if the total is 4 or 17, odds are set to 1:60; if the total is 5 or 16, odds are set to 1:30; if the total is 6 or 15, odds are set to 1:18; if the total is 7 or 14, odds are set to 1:12; if the total is 8 or 13, odds are set to 1:8; if the total is 9 or 12, odds are set to 1:7; and if the total is 10 or 11, odds are set to 1:6.

The bet area 41G is a portion where the player places a bet on predicted dots to appear on the two dice selected from the three, and the odds are set to 1:5.

The normal bet area 41H is a region where the player places a bet on the number of dots to appear on the dice 70, and the odds are set according to the number of dots of the dice 70 matching the predicted number of dots.

Figure 15B:
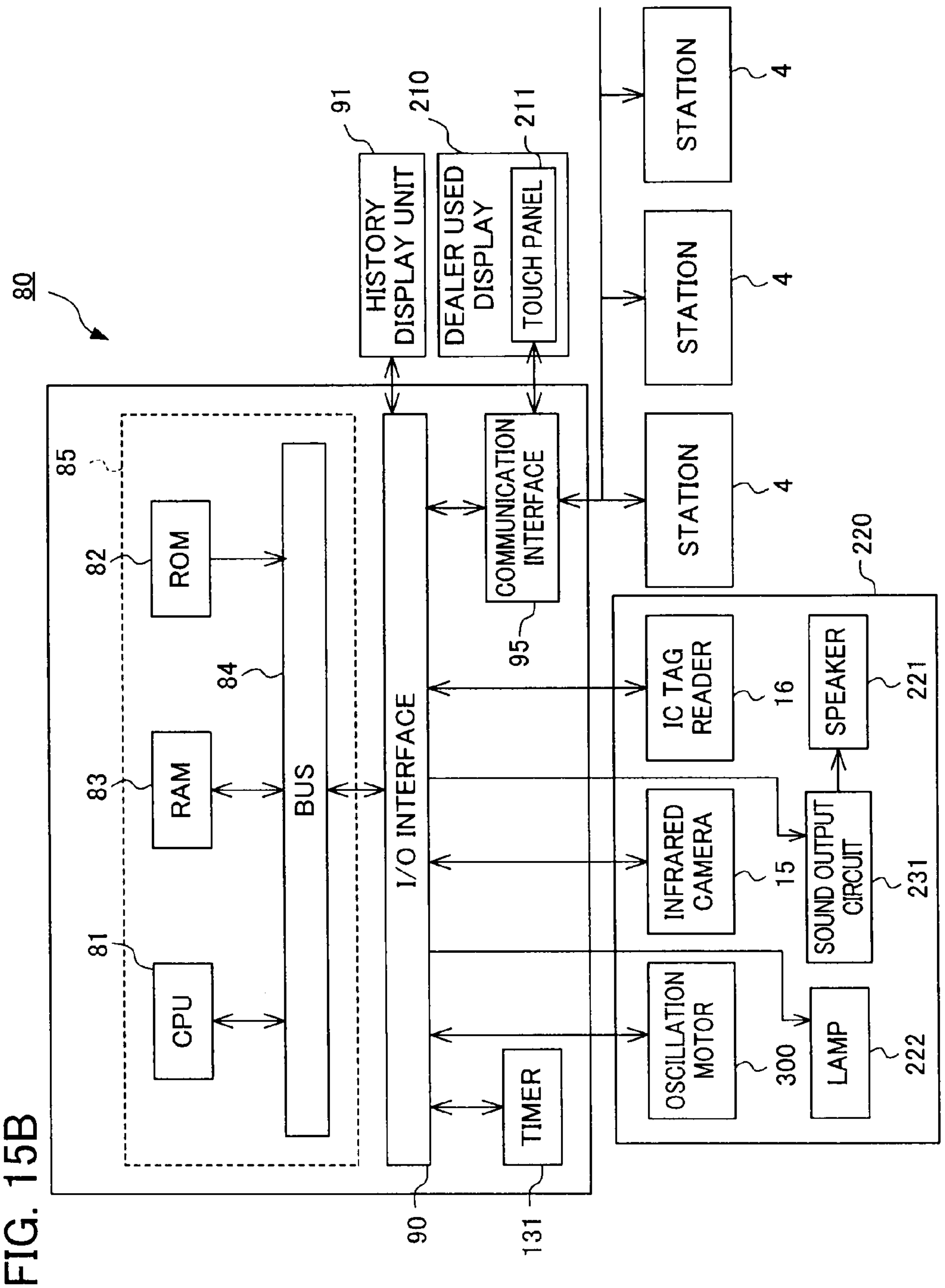
FIG. 15B is a block diagram showing the internal configuration of the gaming machine shown in FIG. 2B.

FIG. 15B is a block diagram showing the internal configuration of the gaming machine shown in FIG. 2B. A main control unit 80 of the gaming machine 1 includes a microcomputer 85, which is configured with a CPU 81, ROM 82, RAM 83, and a bus 84 that transfers data therebetween.

The CPU 81 is connected with an oscillating motor 300 via an I/O interface 90. Furthermore, the CPU 81 is connected with a timer 131, which can measure time via the I/O interface 90. In addition, the CPU 81 is connected with a lamp 222 via the I/O interface 90. The lamp 222 emits various colors of light for performing various types of rendered effects, based on output signals from the CPU 81. Furthermore, the CPU 81 is connected with a speaker 221 via the I/O interface 90 and a sound output circuit 231. The speaker 221 emits various sound effects for performing various types of rendered effects, based on output signals from the sound output circuit 231. Furthermore, the I/O interface 90 is connected with the abovementioned infrared camera 15 and/or the IC tag reader 16, thereby transmitting and receiving information in relation to the number of dots of the three dice 70, which comes to rest on the playing board 3*a*, between the infrared camera 15 and/or the IC tag reader 16.

Here, the oscillating motor 300, the infrared camera 15, the IC tag reader 16, the lamp 222, the sound output circuit 231, and the speaker 221 are provided within a single composite unit 220.

In addition, via a communication interface 95 connected to the I/O interface 90, the main control unit 80 transmits and receives data such as bet information, payout information, and the like to and from each station 4, as well as data such as bet start instruction images, bet start instruction signals, and the like to and from the dealer used display 210.

Furthermore, the I/O interface 90 is connected with a history display unit 91, and the main control unit 80 transmits and receives information in relation to the number of dots on the die, to and from the history display unit 90.

ROM 82 in the main control unit 80 is configured to store a program for implementing basic functions of the gaming machine 1; more specifically, a program for controlling various devices which drive the playing unit 3, a program for controlling each station 4, and the like, as well as a payout table, data indicating a predetermined time T, data indicating a specific value TT, and the like.

RAM 83 is memory, which temporarily stores various types of data calculated by CPU 81, and, for example, temporarily stores data bet information transmitted from each station 4, information on respective number of dots that appear on the dice 70 transmitted from the infrared camera 15 and/or the IC tag reader 16, data relating to the results of processing executed by CPU 81, and the like. A jackpot storage area is provided in the RAM 83. In the jackpot storage area, the data indicating the number of playing media stored cumulatively is stored so as to correspond to each number of dots of matching dice. The data is provided to the station 4 at a predetermined timing, and a jackpot image is displayed.

The CPU 81 controls the oscillating motor 300, which oscillates the playing unit 3, based on data and a program stored in the ROM 82 and the RAM 83, and oscillates the playing board 3*a* of the playing unit 3. Furthermore, after oscillation of the playing board 3*a* ceases, a control processing associated with game progression, such as confirmation processing for confirming the number of dots on each of the dice 70 resting on the playing board 3*a*.

In addition to the control processing described above, the CPU 81 has a function of executing a game by transmitting and receiving data to and from each station 4 so as to control each station 4. More specifically, the CPU 81 accepts bet information transmitted from each station 4. Furthermore, the CPU 81 performs win determination processing based on the number of dots on the dice 70 and the bet information transmitted from each station 4, and calculates the amount of an award paid out in each station 4 with reference to the payout table stored in the ROM 82.

Figure 16B:
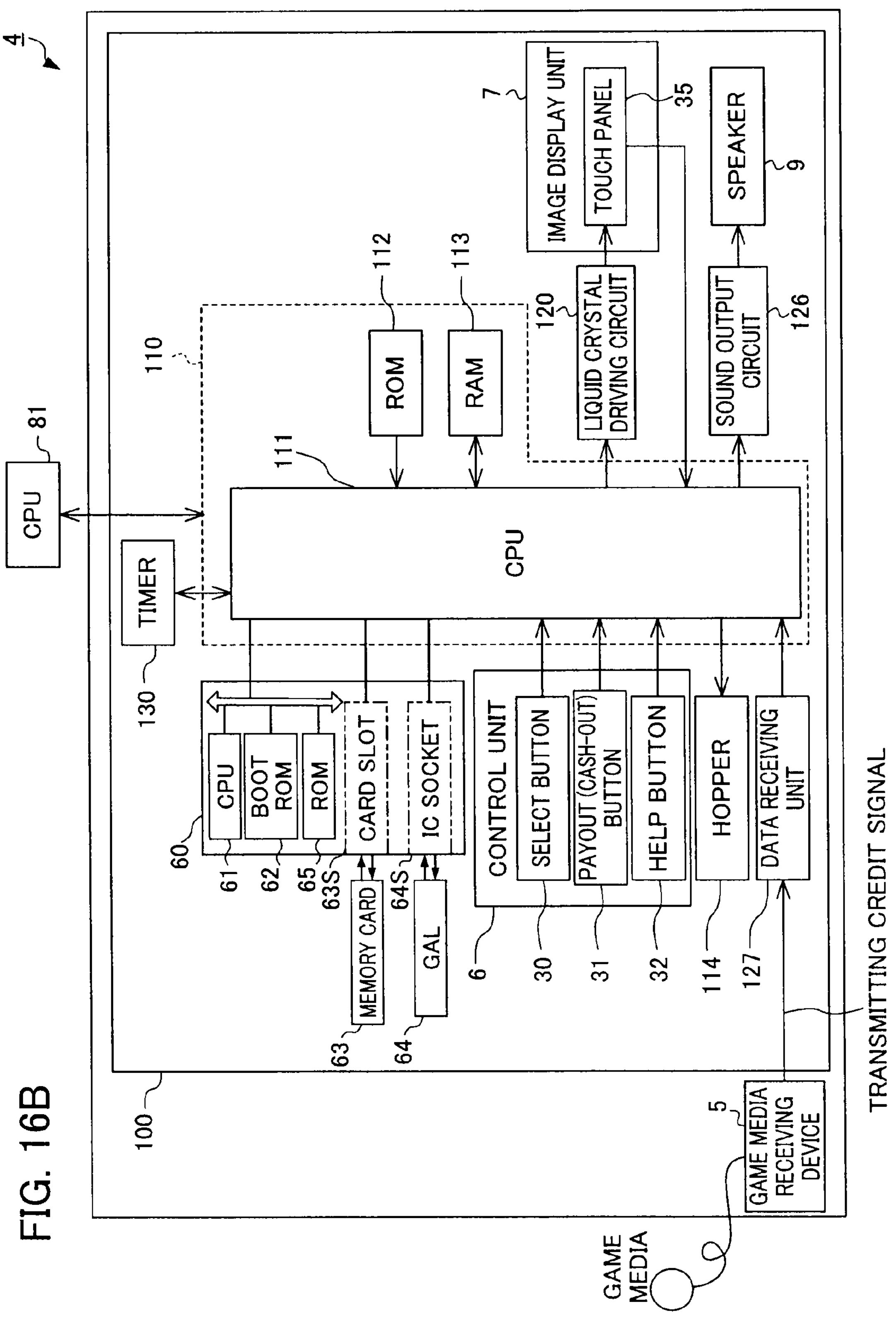
FIG. 16B is a block diagram showing the internal configuration of the station shown in FIG. 2B.

FIG. 16B is a block diagram showing the internal configuration of the station shown in FIG. 2B. The station 4 includes a main body 100 in which an image display unit 7 and the like are provided, and a game media receiving device 5, which is attached to the main body 100. The main body 100 further includes a station control unit 110 and several peripheral devices.

The station control unit 110 includes a CPU 111, ROM 112, and RAM 113.

ROM 112 stores a program for implementing basic functions of the station 4, other various programs needed to control the station 4, a data table, and the like.

Moreover, a decision button 30, a payout button 31, and a help button 32 provided in the control unit 6 are connected to the CPU 111, respectively. The CPU 111 controls the execution of various corresponding operations in accordance with manipulation signals, which are generated in response to each button pressed by a player. More specifically, the CPU 111 executes various processing, based on input signals transmitted from the control unit 6 in response to a player's operation which has been inputted, and the data and programs stored in the ROM 112 and RAM 113. Subsequently, the CPU 111 transmits the results to the CPU 81 in the main control unit 80.

In addition, the CPU 111 in the main control unit 80 receives instruction signals from the CPU 81, and controls peripheral devices which configure the station 4. The CPU 111 performs various kinds of processing based upon the input signals supplied from the control unit 6 and the touch panel 35, and the data and the programs stored in the ROM 112 and the RAM 113. Then, the CPU 111 controls the peripheral devices which configure the station 4 based on the results of the processing. It should be noted that the mode whereby processing is performed is set for each processing depending on the content of the processing. For example, the former approach is applied to payout processing of game media for respective numbers of dots to appear on the dice, and the latter approach is applied to bet operation processing by a player.

Furthermore, a hopper 114, which is connected to the CPU 111, pays out a predetermined amount of game media through the payout opening 8, receiving the instruction signals from the CPU 111.

Moreover, the image display unit 7 is connected to the CPU 111 via a liquid crystal driving circuit 120. The liquid crystal driving circuit 120 includes program ROM, image ROM, an image control CPU, work RAM, a video display processor (VDP), video RAM, and the like. Here, the program ROM stores an image control program with respect to the display functions of the image display unit 7, and various kinds of selection tables. The image ROM stores dot data for creating an image to be displayed on the image display unit 7, and dot data for displaying a jackpot image, for example. In addition, the image control CPU determines an image to be displayed on the image display unit 7, selected from the dot data previously stored in the image ROM according to the image control program previously stored in the program ROM based on parameters specified by the CPU 111. The work RAM is configured as a temporary storage means when executing the image control program by the image control CPU. The VDP forms an image corresponding to the display contents determined by the image control CPU and outputs the resulting image on the image display unit 7. It should be noted that the video RAM is configured as a temporary storage device used by the VDP for creating an image.

As mentioned above, the touch panel 35 is attached to the front side of the image display unit 7, and the information related to operation on the touch panel 35 is transmitted to the CPU 111. The touch panel 35 detects an input operation by the player on a bet screen 40 and the like. More specifically, selection of the normal bet area 41 and the side bet area 42 in the bet screen 40, manipulation of the bet button unit 43 and the like, are performed by touching the touch panel 35, and the information thereof is transmitted to the CPU 111. Then, a player's bet information is stored in the RAM 113 based on the information stored. Furthermore, the bet information is transmitted to the CPU 81 in the main control unit 80, and stored in a bet information storage area in the RAM 83.

Moreover, a sound output circuit 126 and a speaker 9 are connected to the CPU 111. The speaker 9 emits various sound effects for performing various kinds of rendered effects, based on output signals from the sound output circuit 126. In addition, the game media receiving device 5, into which game media such as coins or medals are inserted, is connected to the CPU 111 via a data receiving unit 127. The data receiving unit 127 receives credit signals transmitted from the game media receiving device 5, and the CPU 111 increases a player's credit amount stored in the RAM 113 based on the credit signals transmitted.

A timer 130, which can measure time, is connected to the CPU 111.

A gaming board 60 includes a CPU (Central Processing Unit) 61, ROM 65 and boot ROM 62, a card slot 63S compatible with a memory card 63, and an IC socket 64S compatible with a GAL (Generic Array Logic) 64, which are connected to one another via an internal bus.

The memory card 63 comprises nonvolatile memory such as compact flash (trademark) or the like, which stores a game program and a game system program.

Furthermore, the card slot 63S has a configuration that allows the memory card 63 to be detachably inserted, and is connected to the CPU 111 via an IDE bus. Such an arrangement allows the kinds or content of the game provided by the station 4 to be changed by performing the following operation. More specifically, the memory card 63 is first extracted from the card slot 63S, and another game program and another game system program are written to the memory card 63. Then, the memory card 63 thus rewritten is inserted into the card slot 63S. In addition, the kinds or content of the games provided by the station 4 can be changed by replacing the memory card 63 storing a game program and a game system program with another memory card 63 storing another game program and game system program. The game program includes a program for advancing a game and the like. The game program also includes a program related to image data and sound data outputted during a game.

The GAL 64 is one type of PLD that has a fixed OR array structure. The GAL 64 includes multiple input ports and output ports and, upon receiving predetermined data via each input port, outputs output data that corresponds to the input data via the corresponding output port. In addition, an IC socket 64S has a structure that allows the GAL 64 to be detachably mounted, and is connected to the CPU 111 via the PCI bus.

The CPU 61, the ROM 65, and the boot ROM 62, which are connected to one another via the internal bus, are connected to the CPU 111 via the PCI bus. The PCI bus performs signal transmission between the CPU 111 and the gaming board 60, as well as supplying electric power from the CPU 111 to the gaming board 60. The ROM 65 stores country identification information and an authentication program. The boot ROM 62 stores a preliminary authentication program, a program (boot code) which instructs the CPU 61 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e. the procedure for authenticating the game program and the game system program. The preliminary authentication program is a program for authenticating the aforementioned authentication program. The preliminary authentication program is defined to follow the procedure for verifying that the authentication program has not been forged, i.e. the procedure for authenticating the authentication program (authentication procedure).

An instruction image display determination table is described with reference to FIG. 17B.

Figure 31B:
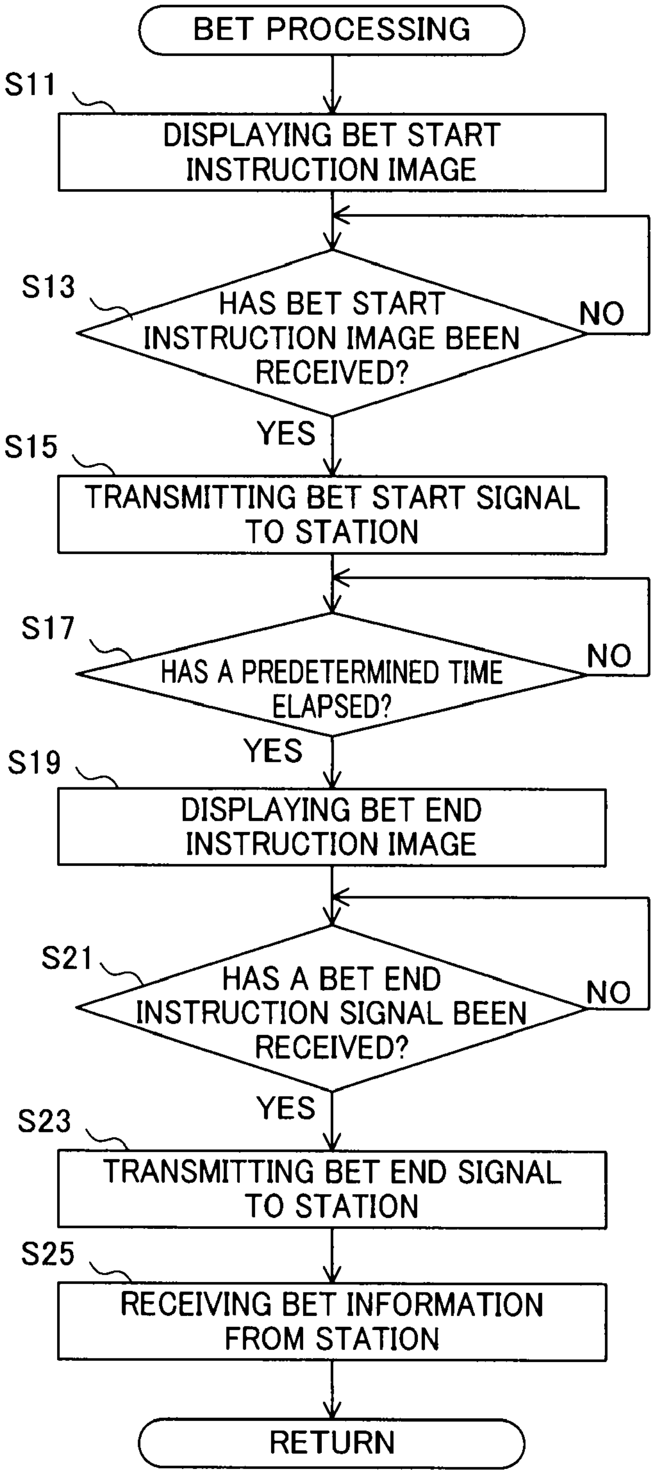
FIG. 31B is a flowchart showing bet processing executed in a gaming machine according to the embodiment of the present invention.

In Steps S11 and S19 of FIG. 31B, the instruction image display determination table is referred to by the CPU 81 upon determining whether a bet start instruction image or a bet end instruction image is displayed on the display screen 210*a* of the dealer used display 210.

According to this table, "X" is data for indicating that the bet start instruction image and the like is not displayed on the display screen 210*a*, and "O" is data for indicating that the bet start instruction image and the like is displayed on the display screen 210*a*. For example, in a case in which a dealer belongs to an intermediate level, the bet start instruction image is not displayed on the display screen 210*a*, but the bet end instruction image is displayed on the display screen 210*a*. In addition, this table is stored in the ROM 82.

The bet existence determination table is described with reference to FIG. 18B.

Figure 32B:
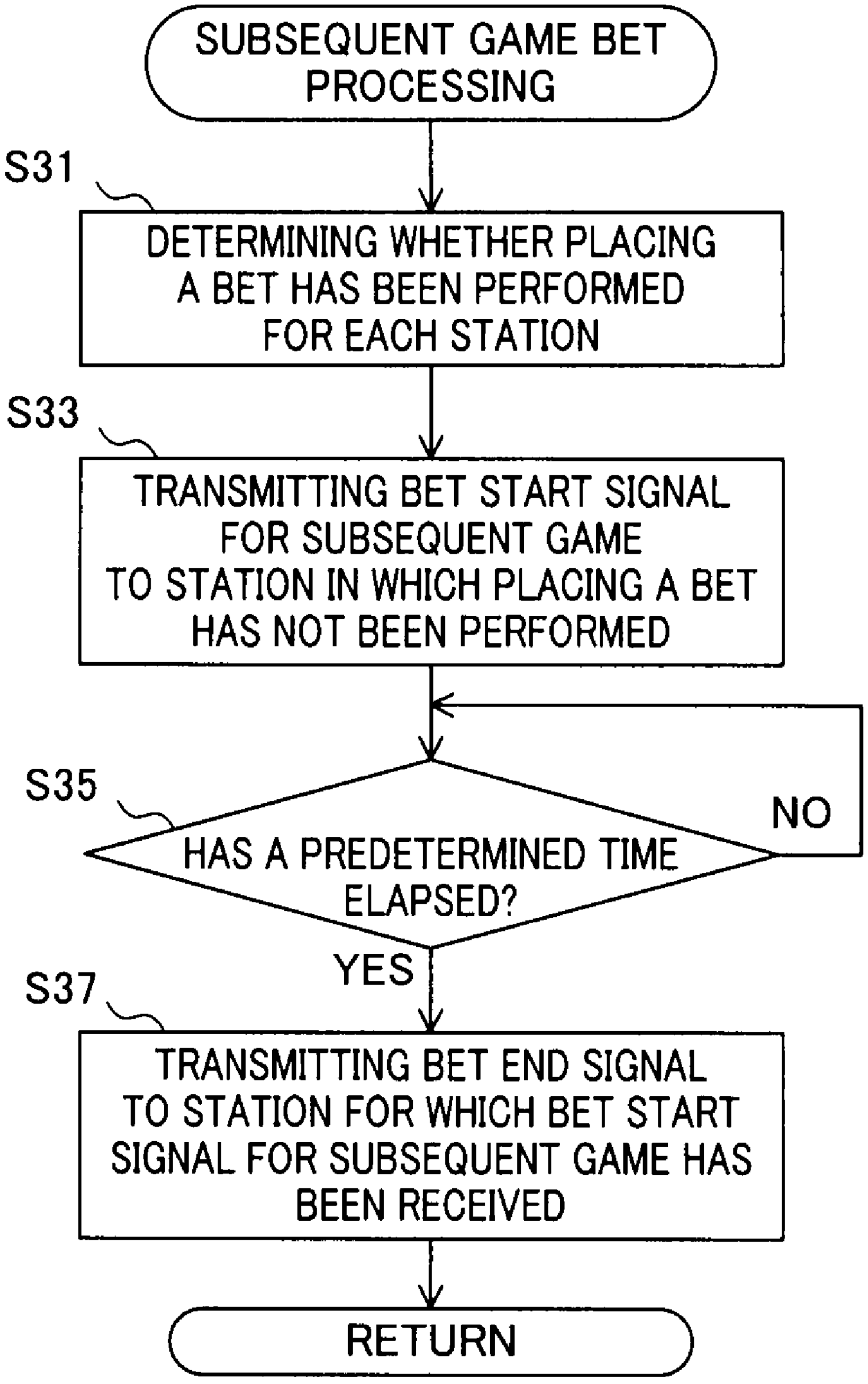
FIG. 32B is a flowchart showing subsequent game bet processing executed in a gaming machine according to the embodiment of the present invention.

The CPU 81 refers to this bet existence determination table upon determining for each station 4 whether a bet operation is performed at each station 4 in Step S31 of FIG. 32B.

Data indicating whether the bet operation has been performed or not at each station number is stored in this table. "P" is data indicating that a bet operation was performed, and "A" is data indicating that a bet operation was not performed. In addition, this table is updated in every game, and stored in the RAM 83.

An oscillation mode data table is described with reference to FIG. 19B.

The CPU 81 refers to this oscillation mode data table upon determining combination patterns of the oscillation modes of the playing board 3*a*. In addition, this table is stored in the ROM 82.

According to this table, in a case of a pattern 3, the roll of dice 70 is performed in the order of a small oscillation for six seconds, a large oscillation for four seconds, and a subtle oscillation for five seconds. Here, the order of oscillation amplitude of the playing board 3*a* is equal to large oscillation>small oscillation>subtle oscillation. It should be noted that the oscillation speed for the large oscillation, the small oscillation, and the subtle oscillation are all the same speed. Furthermore, the small oscillation is enough to be able to roll a die, the large oscillation is enough to jump a die, and the subtle oscillation is enough to level off a die that comes to rest at a tilt.

A rendered effect table is described with reference to FIG. 20B.

Figure 33B:
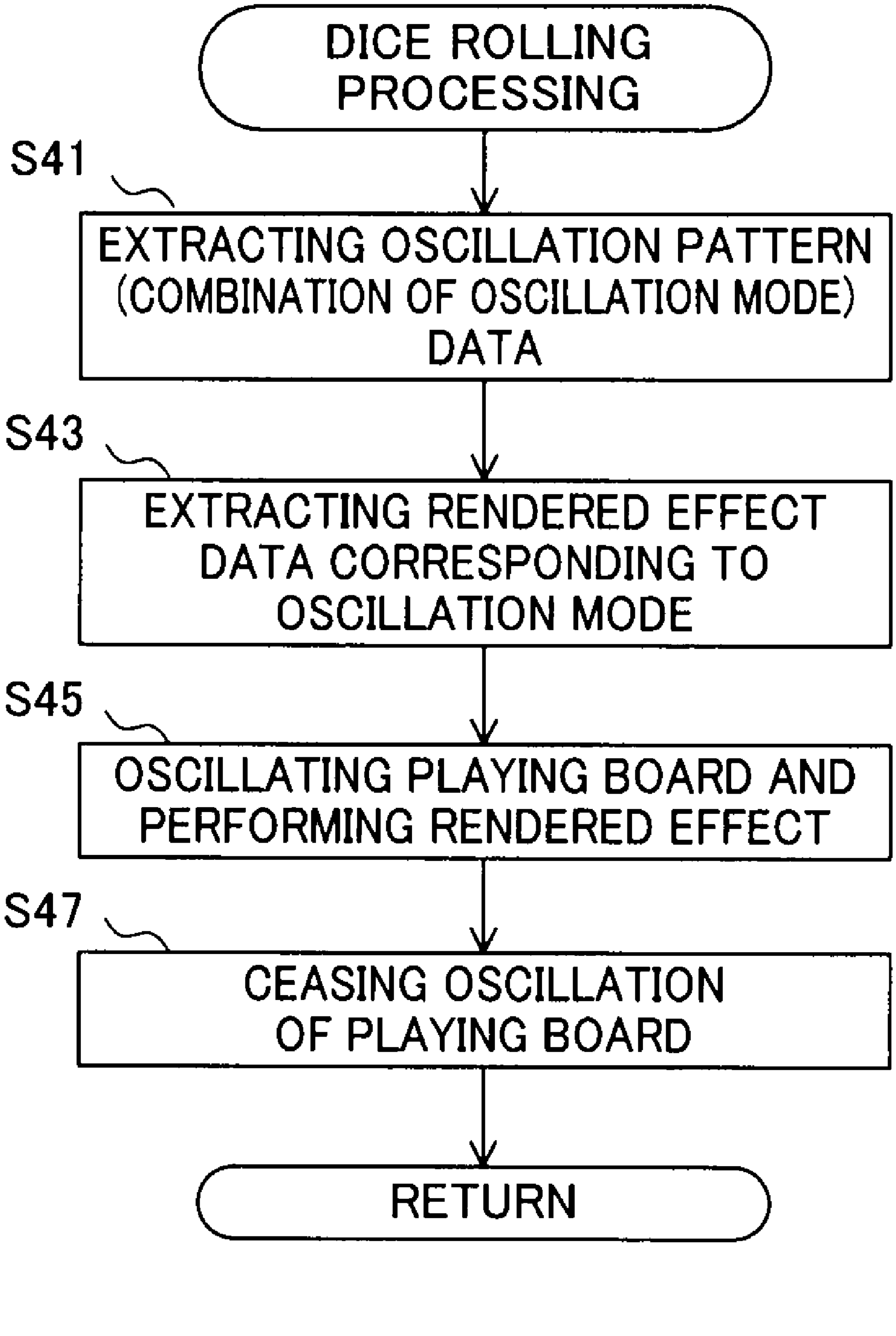
FIG. 33B is a flowchart showing dice rolling processing executed in a gaming machine according to the embodiment of the present invention.

The CPU 81 refers to this rendered effect table upon determining rendered effect data in response to an oscillation pattern of the playing board 3*a* in Step S43 of FIG. 33B. In addition, this table is stored in the ROM 82.

According to this table, oscillation modes correspond to sound types and, for example, in the case of a large oscillation, "sound 2" is determined. For example, in the case of "sound 2", the sound indicating that a die jumps is outputted from the speaker 221.

It should be noted that, by way of associating an oscillation mode with a certain type of emitted light, rendered effects with a light emitting mode associated with an oscillation mode may be performed by lighting or flashing of the lamp 222.

An IC tag data table is described with reference to FIG. 21B.

The IC tag data table is a table showing data as identification data 1 to 3 which is created by the CPU 81 based on the results of the type of dice and the number of dots on the dice, when information stored in IC tags embedded in the dice 70*a*, 70*b*, and 70*c* is detected by the IC tag reader 16.

According to this table, for example, when an IC tag embedded in each die is detected in the order of 70*c*, 70*a*, and 70*b*, by the IC tag reader 16, the die 70*c* is associated with identification data 1 of which the type is "red" and the number of dots is "six", the die 70*a* is associated with identification data 2 of which the type is "white" and the number of dots is "three", and the die 70*b* is associated with identification data 3 of which the type is "black" and the number of dots is "five".

On the other hand, when three dice are not detected, for example, in a case where only two dice are detected, identification data is created for only 2 sets, identification data 1 and 2.

In addition, the data table is transmitted from the IC tag reader 16 to the CPU 81, and then the CPU 81 receives it to analyze the number of dots on a die and the like.

An infrared camera imaging data table is described with reference to FIG. 22B.

The infrared camera imaging data table is a data table showing dot patterns of the infrared absorption inks applied to the dice 70 and location data of the dice 70 on the playing board 3*a*.

For example, regarding the die 70*a* shown in FIG. 11B, in the infrared camera imaging data table, the CPU (not shown) inside the infrared camera 15 stores −50 for X and 55 for Y as location data, stores "O" for 181, 182, 184, 186, and 187, to which the infrared absorption inks are being applied, and stores "X" for 183 and 185, which are not being applied. The same is true of the dice 70*b* and 70*c*.

On the other hand, as shown in FIG. 13B, in a case where a plurality of faces of the dice 70 is imaged, the number of dots cannot be specified uniquely. In this case, the CPU (not shown) inside the infrared camera 15 calculates the area of the profiles 75 on the plurality of faces thus imaged, and generates the infrared camera imaging data table based on the dot patterns on the face that has a maximum area.

Therefore, even if the dice 70 come to rest at a tilt and a plurality of faces of the dice 70 is imaged, the number of dots can be specified uniquely.

In addition, this data table is transmitted from the infrared camera 15 to the CPU 81, and then the CPU 81 receives it to analyze the number of dots on a die and the like.

A dot pattern data classification table is described with reference to FIG. 23B.

According to this table, colors as the classification for the dice 70 are set so as to correspond to dot combinations to which the infrared absorption ink is applied, among the abovementioned dots 181 to 183 in FIG. 10B. "O" indicates that the infrared absorption ink is applied to the dot, and "X" indicates that the infrared absorption ink is not applied to the dot.

For example, in a case where the infrared camera imaging data table described in FIG. 22B is transmitted to the CPU 81, the CPU 81 determines the classification of the dice 70 as "red" by comparing the infrared camera imaging data table with the dot pattern data classification table.

A number of dots-dot pattern data table is described with reference to FIG. 24B.

According to this table, numbers as the number of dots on the dice 70 are set so as to correspond to dot combinations to which the infrared absorption ink is applied, among the abovementioned dots 184 to 187 in FIG. 10B. "O" indicates that the infrared absorption ink is applied to the dot, and "X" indicates that the infrared absorption ink is not applied to the dot.

For example, in a case where the infrared camera imaging data table shown in FIG. 22B is transmitted from the infrared camera 15 to the CPU 81, the CPU 81 determines the number of dots on the dice 70 as "five" by comparing the infrared camera imaging data table thus received with the dot pattern data classification table.

Figure 25B:
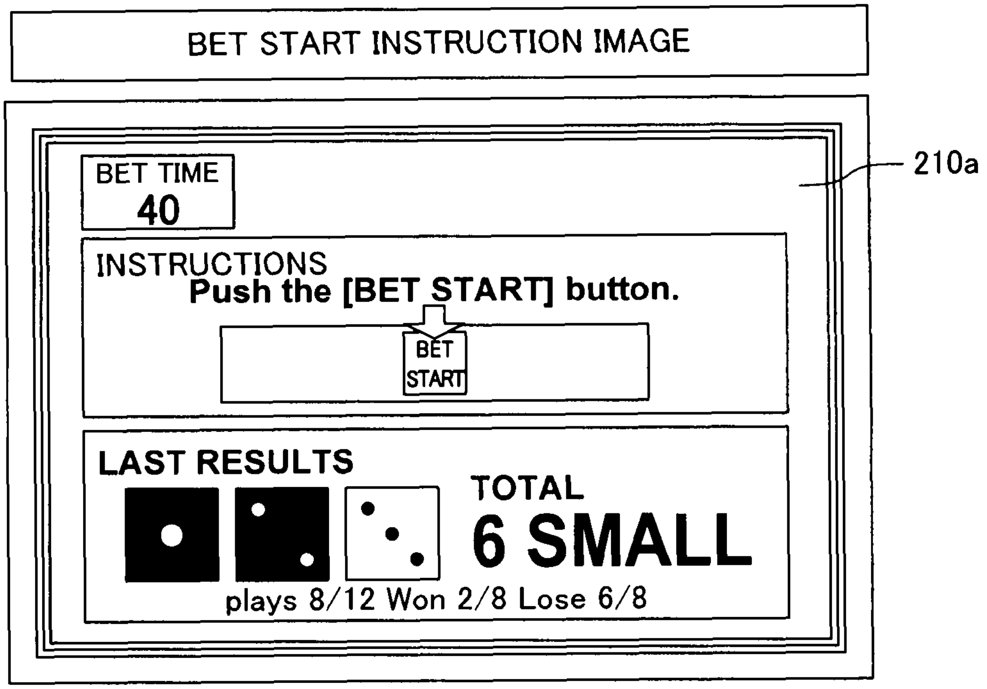

A bet start instruction image is described with reference to FIG. 25B.

The bet start instruction image is displayed by the CPU 81 on the display screen 210*a* of the dealer used display 210 before the CPU 81 accepts a bet from each station 4.

This bet start instruction image instructs a dealer to touch a "bet start" button. When a touch panel 211 detects that the dealer has touched the "bet start" button, the touch panel 211 transmits a bet start instruction signal to the CPU 81 via a communication interface 95.

A bet end not recommended image is described with reference to FIG. 26B.

This bet end not recommended image is displayed by the CPU 81 on the display screen 210*a* of the dealer used display 210 while the CPU 81 accepts a bet from each station 4. This bet end not recommended image instructs the dealer not to touch a "bet end" button.

Figure 27B:
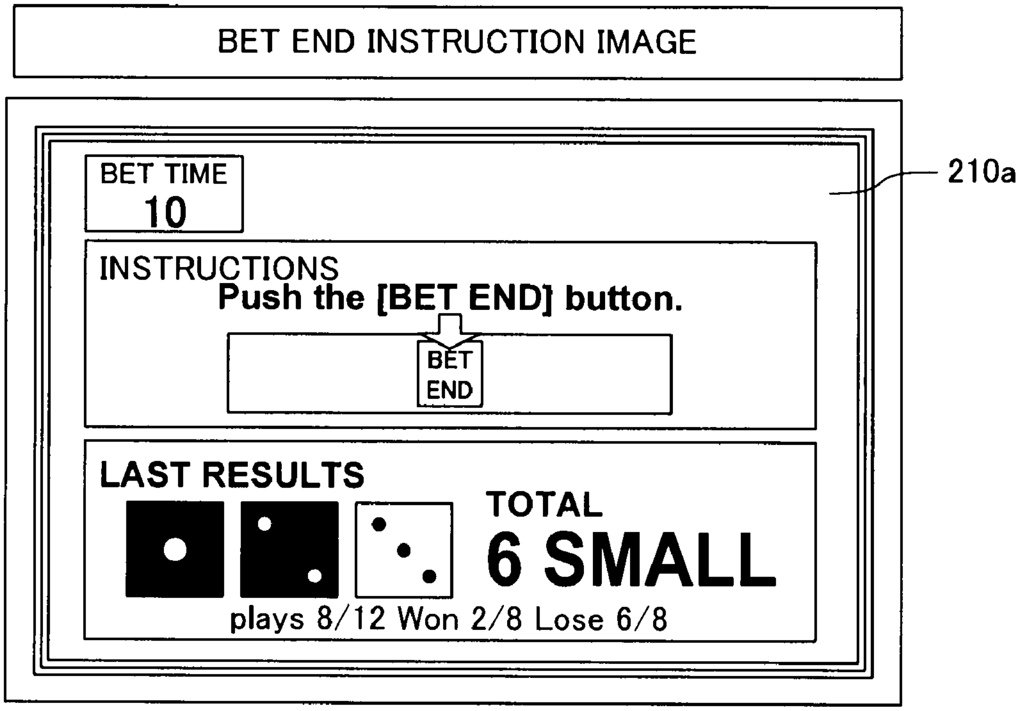

A bet end instruction image is described with reference to FIG. 27B.

The bet end instruction image is displayed by the CPU 81 on the display screen 210*a* of the dealer used display 210 after elapse of a predetermined time from when the CPU 81 starts accepting a bet from each station 4.

This bet end instruction image instructs the dealer to touch the "bet end" button. When the touch panel 211 detects that the dealer has touched the "bet end" button, the touch panel 211 transmits a bet end instruction signal to the CPU 81 via the communication interface 95.

A display example on the image display unit 7 of each station 4 is described with reference to FIG. 28B.

Figure 28B:
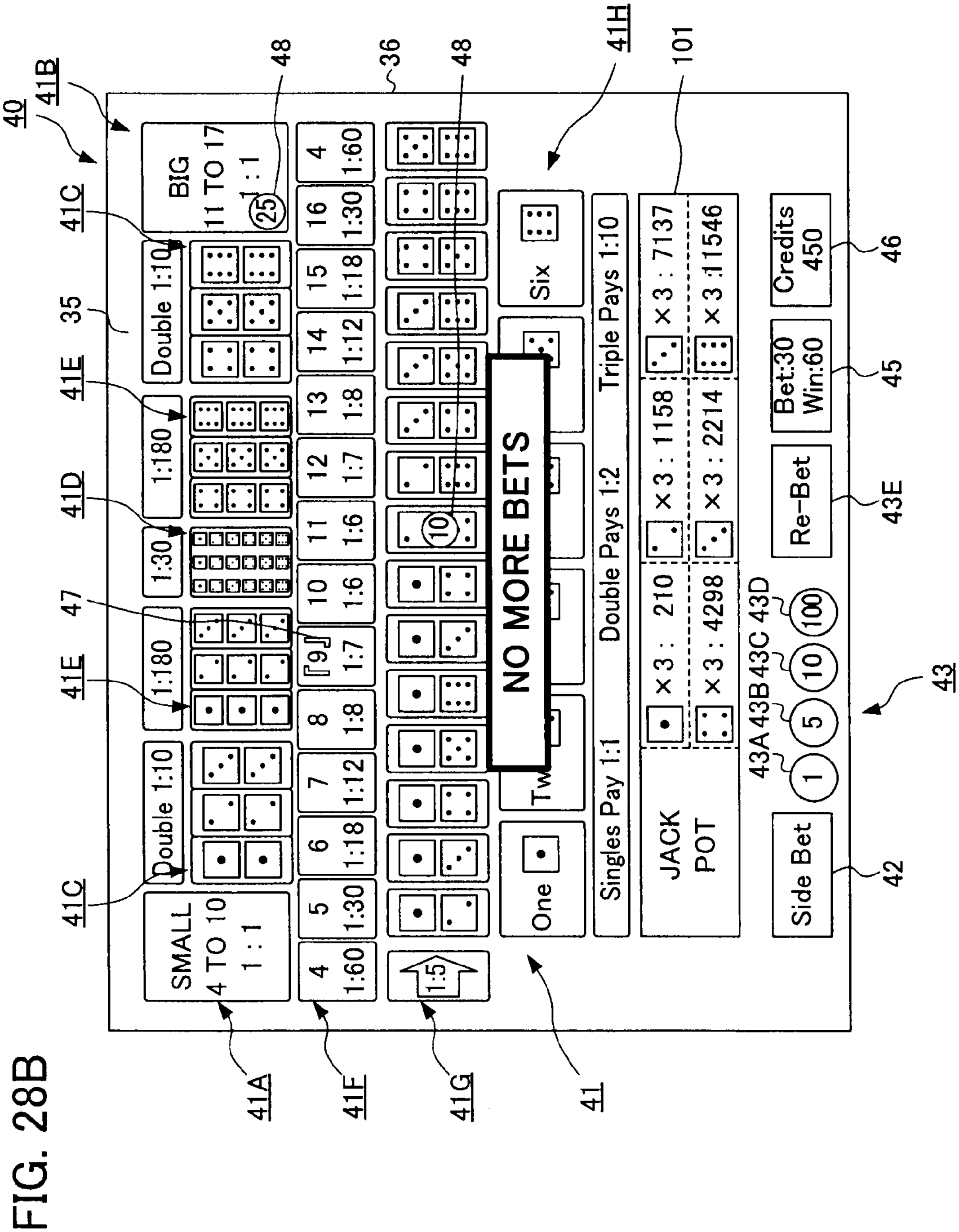

An image shown in FIG. 28B is configured to report to each station 4 that accepting of bets has ended. A player can recognize that the accepting of bets has ended by confirming that a message "NO MORE BETS" is displayed.

A display example on the image display unit 7 of each station 4 is described with reference to FIG. 29B.

Figure 29B:
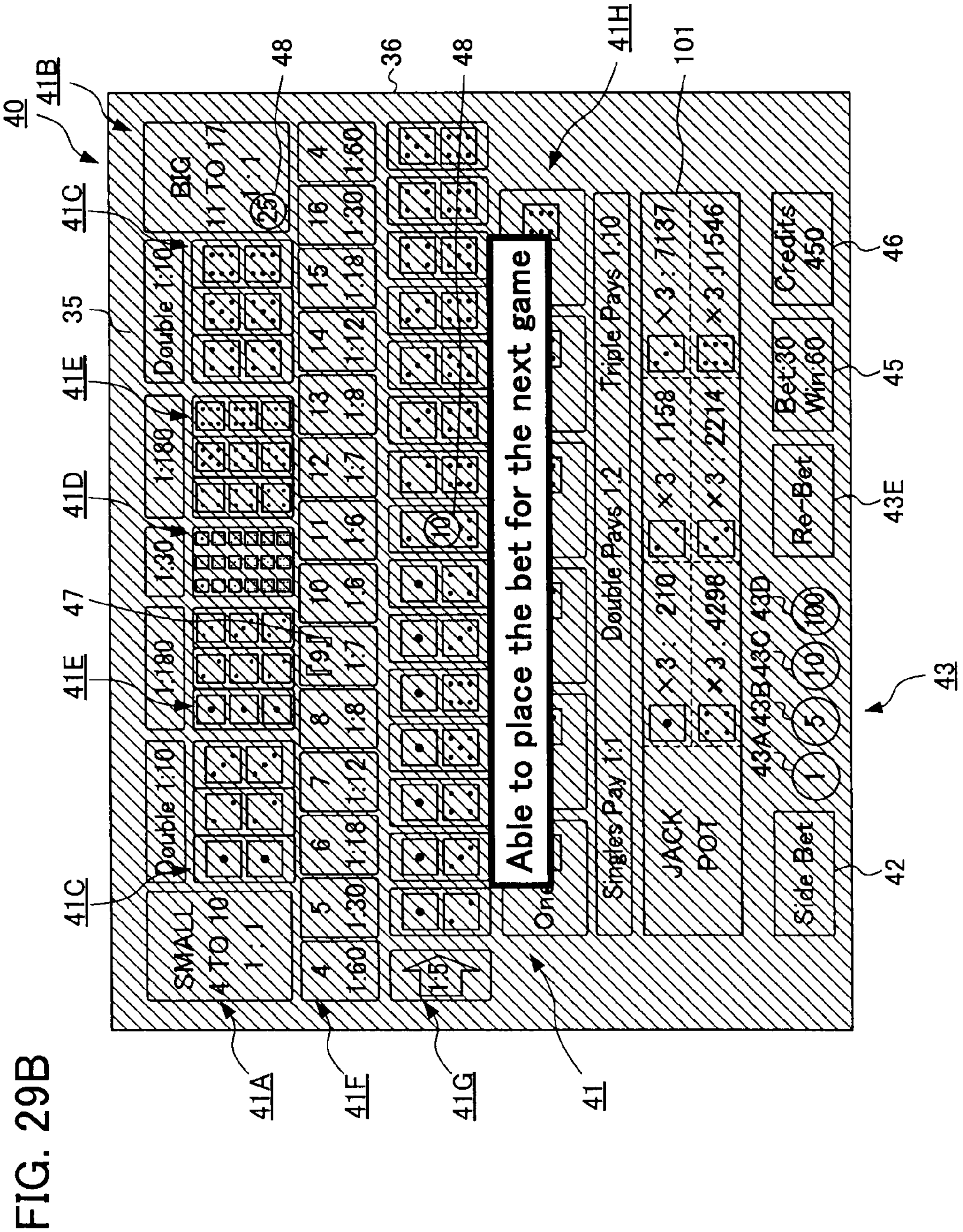

The image shown in FIG. 29B is configured to report to the station 4 in which a bet was not placed that a bet can be placed on a subsequent game. A player can recognize that a bet on the subsequent game is possible by confirming that a message "ABLE TO PLACE THE BET FOR THE NEXT GAME" is displayed.

Subsequently, with reference to FIGS. 30B to 34B, processing performed in the main control unit of a gaming machine according to the present embodiment is described.

Figure 30B:
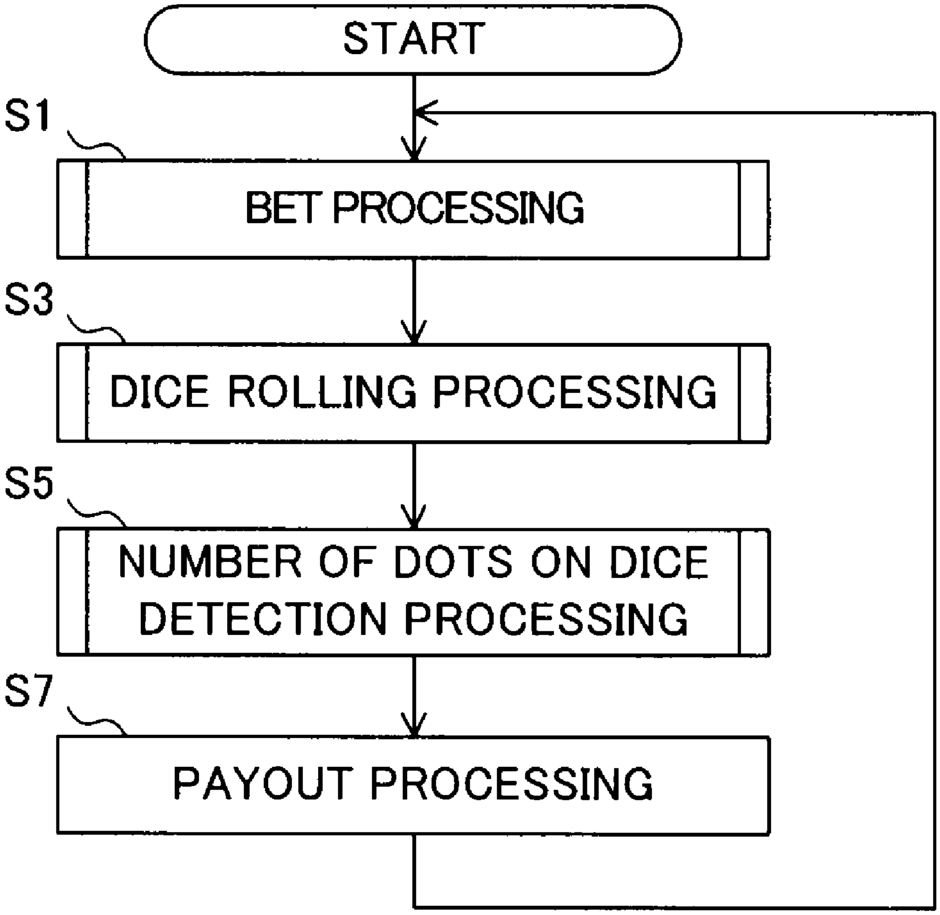
FIG. 30B is a flowchart showing dice game processing executed in a gaming machine according to the embodiment of the present invention.

FIG. 30B is a flowchart showing dice game execution processing. Initially, in Step S1, the CPU 81 executes bet processing, which is described later in FIG. 31B, and in Step S3, the CPU 81 executes dice rolling processing, which is described later in FIG. 33B. In Step S5, the CPU 81 executes number of dots on dice detection processing, which is described later in FIG. 34B and, in Step 7, executes payout processing corresponding to the number of dots, and then the flow returns to Step 1.

FIG. 31B is a flowchart showing bet processing.

In Step S11, the CPU 81 displays the bet start instruction image (see FIG. 25B) on the display screen 210*a* of the dealer used display 210. It should be noted that, whether or not the bet start instruction image is displayed may be determined according to a dealer's level with reference to the instruction image display determination (see FIG. 17B).

Thus, according to the dealer's level, it becomes possible to determine whether the bet start instruction image is displayed on the display screen 210*a* of the dealer used display 210.

In Step S13, the CPU 81 determines whether the bet start instruction signal has been received from the touch panel 211 disposed on the dealer used display 210. In the case of a NO determination, the CPU 81 returns the processing to Step S13, and in the case of a YES determination, the CPU 81 advances the processing to Step S15.

In Step S15, the CPU 81 transmits the bet start signal to each of the stations 4. When the bet start signal is received, bet placement can be performed at each station 4.

In Step S17, the CPU 106 determines whether or not a predetermined time has elapsed. More specifically, the CPU 81 starts to measure a predetermined lapse of time t by the timer 131, compares the predetermined lapse of time t with a predetermined time T1 stored in the ROM 82, and determines whether the predetermined lapse of time t measured by the timer 131 has reached the predetermined time T1. In the case of a NO determination, the CPU 81 returns the processing to Step S17, and in the case of a YES determination, the CPU 81 advances the processing to Step S19.

In Step S19, the CPU 81 displays the bet end instruction image (see FIG. 27B) on the display screen 210*a* of the dealer used display 210. It should be noted that, whether or not the bet end instruction image is displayed may be determined according to a dealer's level with reference to the instruction image display determination (see FIG. 17B).

In Step S21, the CPU 81 determines whether the bet end instruction signal has been received from the touch panel 211 disposed on the dealer used display 210. In the case of a NO determination, the CPU 81 returns the processing to Step S21, and in the case of a YES determination, the CPU 81 advances the processing to Step S23.

In Step S23, the CPU 81 transmits the bet end signal to each station 4. When the bet end signal is received, bet placement cannot be accepted at each station 4, and then the CPU 111 inside the station control unit 110 displays an image which reports on the image display unit 7 that an accepting of bet placement has been terminated (FIG. 28B).

In Step S25, the CPU 81 receives bet information from each station 4. The bet information relates to a normal bet input and a side bet input performed at each station 4. In addition, the bet information includes information indicating whether bet placement has been performed or not which is included in the bet existence determination table (FIG. 18B). Upon terminating the processing of Step S25, the CPU 81 terminates the bet processing.

With the bet processing of the present embodiment, even an inexperienced dealer can perform start operations for bet placement and end operations according to instructional images.

FIG. 32B is a flowchart showing subsequent game bet processing.

The subsequent game bet processing is started by the CPU 81 and executed parallel to the dice rolling processing in FIG. 30B when the bet processing described in FIG. 31B is terminated. Therefore, placing a bet on the subsequent game becomes possible even during the dice rolling after termination of the bet processing.

In Step S31, the CPU 81 determines whether bet placement has been performed for each station 4. More specifically, the CPU 81 distinguishes stations at which bet placement has been performed from stations at which bet placement has not been performed with reference to the bet existence determination table (FIG. 18B).

In Step S33, the CPU 81 transmits a bet start signal for a subsequent game to the stations 4 at which bet placement has not been performed. When the station 4 receives the bet start signal for a subsequent game, the CPU 111 inside the station control unit 110 displays an image which reports that bet placement for a subsequent game is possible (FIG. 29B) on the image display unit 7.

Thus, even during a game, a player who has not participated in the game can place a bet on a subsequent game.

In Step S35, the CPU 81 determines whether or not a predetermined time has elapsed. More specifically, the CPU 81 starts to measure a predetermined lapse of time t by the timer 131, compares the predetermined lapse of time t with a predetermined time T2 stored in the ROM 82, and determines whether the predetermined lapse of time t measured by the timer 131 has reached the predetermined time T2. In the case of a NO determination, the CPU 81 returns the processing to Step S35, and in the case of a YES determination, the CPU 81 advances the processing to Step S37.

In Step S37, the CPU 81 transmits a bet end signal to the station 4 at which the bet start signal for a subsequent game has been received. When the station 4 receives the bet end signal, the player cannot place a bet on a subsequent game, and the CPU 81 terminates acceptance of bet placement for a subsequent game. Upon terminating the process in Step S37, the CPU 81 terminates the subsequent game bet processing.

FIG. 33B is a flowchart showing dice rolling processing.

In Step S41, the CPU 81 extracts an oscillation pattern (combinations of oscillation modes) data from the ROM 82. More specifically, the CPU 81 refers to an oscillation mode data table (see FIG. 19B) and extracts the oscillation pattern data at random.

In Step S43, the CPU 81 extracts a rendered effect corresponding to an oscillation mode from the ROM 82. More specifically, the CPU 81 refers to the rendered effect table (see FIG. 20B) and extracts rendered effect data corresponding to an oscillation mode based on an oscillation pattern data thus extracted in Step S41.

In Step S45, the CPU 81 oscillates the playing board 3*a* and performs a rendered effect. More specifically, the CPU 81 oscillates the playing board 3*a* by controlling the oscillation motor 300 based on the oscillation pattern data thus extracted in Step S41, and performs a rendered effect with sounds and/or lights based on rendered effect data corresponding to an oscillation mode.

Thus, since a rendered effect corresponding to an oscillation mode of the playing board 3*a* is performed, games do not become monotonous and interest therein can be improved. Furthermore, since an oscillation pattern is randomly determined, games do not become monotonous and interest therein can be improved.

In Step S47, the CPU 81 ceases oscillation of the playing board 3*a*. More specifically, the CPU 81 ceases the oscillation of the playing board 3*a* by stopping the oscillation motor 300. Upon terminating the processing in Step S47, the CPU 81 terminates the dice rolling processing.

Figure 34B:
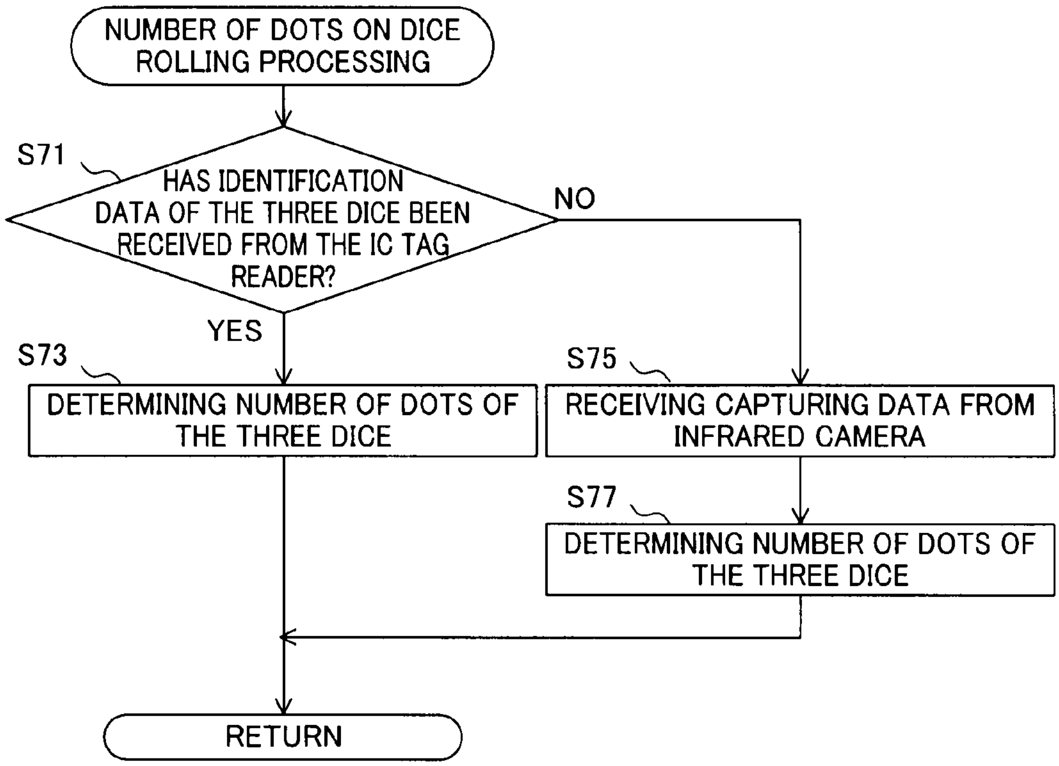
FIG. 34B is a flowchart showing dot detection processing executed in a gaming machine according to the embodiment of the present invention.

FIG. 34B is a flowchart showing number of dots on dice detection processing.

In Step S71, the CPU 81 determines whether identification data of the three dice has been received from the IC tag reader 16. In the case of a YES determination, the CPU 81 advances the processing to Step S73, and in the case of a NO determination, the CPU 81 advances the processing to Step S75. More specifically, the CPU 81 determines whether there are three sets of identification data, which are identification data 1 to 3, in the IC tag data table (see FIG. 21B) received from the IC tag reader 16.

In Step S73, the CPU 81 determines the number of dots on the three dice. More specifically, the CPU 81 determines the number of dots of the three dice by analyzing the identification data 1 to 3. For example, in a case where the identification data is data as shown in FIG. 21B, the number of dice of which type is red is "six", the number of dice of which type is white is "three", and the number of dice of which type is black is "five". Upon finishing the processing in Step S73, the CPU 81 terminates the number of dots detection processing.

In Step S75, the CPU 81 receives imaging data from the infrared camera. More specifically, the CPU 81 receives the infrared camera imaging data table (see FIG. 22B) for each of the dice 70*a*, 70*b*, and 70*c*, from the infrared camera 15

In Step S77, the CPU 81 determines numbers of dots on the dice. More specifically, the CPU 81 determines positions of the dice on the playing board 3*a* based on the infrared camera imaging data table (see FIG. 22B), determines types (colors) of the dice based on the infrared camera imaging data table (see FIG. 22B) and the dot pattern data classification table (see FIG. 23B), and determines numbers of the dice based on the infrared camera imaging data table (see FIG. 22B) and the number of dots-dot pattern data table (see FIG. 24B). This processing is executed for the three dice 70*a*, 70*b*, and 70*c*. Upon terminating the processing in Step S77, the CPU 81 terminates the number of dots detection processing.

Thus, even in a case where, for example, a die is inclined and the number of dots thereof cannot be identified by the IC tag reader 16, since the number of dots can be determined using the infrared camera 15, the accuracy of detection and identification of numbers of dots can be improved.

Descriptions regarding the present embodiment have been provided above. Although a case has been described in which the number of dice 70 is three according to the present embodiment, the number of in the present invention is not limited to three and, for example, the number of the dice may be five.

In the present embodiment, although the controller of the present invention is described for a case of being configured from a CPU 81 which the main controller 80 includes and a CPU 111 which the station 4 includes, the controller of the present invention may be configured by only a single CPU.

Although embodiments of the present invention are described above, they are merely exemplified specific examples, and the present invention is not particularly limited thereto. Specific configurations such as each means can modified be appropriately. Moreover, it should be understood that the advantages described in association with the embodiments are merely a listing of most preferred advantages, and that the advantages of the present invention are by no means restricted to those described in connection with the embodiments.

What is claimed is:

1. A gaming machine comprising:

a playing unit in which a plurality of dice rolls and comes to rest;

a sensor that identifies a position, classification, and number of dots for each of the plurality of dice on the playing unit by capturing the plurality of dice so as to convert to capturing data;

memory that stores the position, classification, and number of dots for each of the plurality of dice for each game; and a controller that executes processing of:

(a) driving the sensor and receiving from the sensor the capturing data converted by the sensor;

(b) determining the position, classification, and number of dots for each of the plurality of dice based on the capturing data thus received;

(c) storing the position, classification, and number of dots for each of the plurality of dice thus determined for each game in the memory; and (d) comparing the position, classification, and number of dots for each of the plurality of dice stored in the memory in a previous game with a position, classification, and number of dots for each of the plurality of dice stored in the memory in a present game.

2. The gaming machine according to claim 1, wherein the controller performs processing of interrupting the present game in a case in which the position, classification, and number of dots for each of the plurality of dice in the previous game matches those in the present game as a result of comparison in the processing (d).

3. The gaming machine according to claim 1, further comprising a display for displaying an image relating to a game, wherein the controller performs processing of displaying, in a case in which the position, classification, and number of dots for each of the plurality of dice in the previous game matches those in the present game as a result of comparison in the processing (d), an indication thereof on the display.

4. The gaming machine according to claim 2, wherein the controller performs processing of interrupting the present game in a case in which the position, classification, and number of dots for each of the plurality of dice in the previous game are the same as the position, classification, and number of dots for each of the plurality of dice in the present game, respectively.

5. The gaming machine according to claim 3, wherein the controller performs processing of displaying, in a case in which the position, classification, and number of dots for each of the plurality of dice in the previous game are the same as the position, classification, and number of dots for each of the plurality of dice in the present game, respectively, the indication thereof on the display.

6. A gaming machine comprising:

a playing unit that is substantially level and on which a plurality of dice rolls and comes to rest, wherein the dice include a region of identical area on each of the plurality of faces;

a sensor that executes processing of:

(a-1) imaging the dice in a substantially vertical direction with respect to the playing unit;

(a-2) calculating an imaged area of the region corresponding to each of the plurality of faces thus imaged;

(a-3) recognizing a face having the largest area among the plurality of faces; and (a-4) converting an identification pattern of a number of dots on the face having the largest area to imaging data and a controller that executes processing of:

(b-1) driving the sensor and receiving from the sensor the imaging data converted by the sensor; and (b-2) determining the number of dots of the dice based on the imaging data thus received.

* * * * *